United States Patent [19]
Elrod et al.

[11] Patent Number: 5,341,155
[45] Date of Patent: Aug. 23, 1994

[54] METHOD FOR CORRECTION OF POSITION LOCATION INDICATOR FOR A LARGE AREA DISPLAY SYSTEM

[75] Inventors: Scott A. Elrod, Redwood City; Brent B. Welch, Mountain View; David Goldberg, Palo Alto, all of Calif.

[73] Assignee: Xerox Corporation, Stamford, Conn.

[21] Appl. No.: 864,271

[22] Filed: Apr. 6, 1992

Related U.S. Application Data

[63] Continuation-in-part of Ser. No. 608,439, Nov. 2, 1990.

[51] Int. Cl.⁵ .............................................. G09G 3/02
[52] U.S. Cl. ...................................... 345/179; 345/156
[58] Field of Search ............... 340/707, 712, 706, 709; 178/18, 19; 345/179, 180, 182, 173, 175, 177, 156, 157, 158

[56] References Cited

U.S. PATENT DOCUMENTS

| | | | |
|---|---|---|---|
| 3,885,096 | 5/1975 | Inuiya | 340/709 |
| 4,295,198 | 10/1981 | Copeland et al. | 364/515 |
| 4,456,787 | 6/1984 | Schlosser et al. | 178/19 |
| 4,514,688 | 4/1985 | Whetstone | 324/208 |
| 4,575,581 | 3/1986 | Langberg | 178/18 |
| 4,650,926 | 3/1987 | Nakamura et al. | 178/18 |
| 4,678,869 | 7/1987 | Kable | 178/19 |
| 4,679,241 | 7/1987 | Lukis | 178/18 |
| 4,737,773 | 4/1988 | Kobayashi | 340/707 |

FOREIGN PATENT DOCUMENTS

| | | | |
|---|---|---|---|
| 074703A2 | 3/1983 | European Pat. Off. | G06K 11/06 |
| 0230228 | 11/1985 | Japan | 340/707 |
| WO9101543 | 2/1991 | PCT Int'l Appl. | G09G 1/28 |
| WO9205483 | 4/1992 | PCT Int'l Appl. | G06F 3/033 |

Primary Examiner—Ulysses Weldon
Assistant Examiner—Doon Chow
Attorney, Agent, or Firm—R. Christine Jacobs

[57] ABSTRACT

In a large area display system, multiple persons may work together with multiple input devices for supplying and receiving information in an interactive system with a single large area display. The large area display system comprises a screen wherein computer generated information is projected upon one side of the screen, and users interact with the computer from the opposite side of the the screen. Data coordinates for an input device corresponding to a pseudo image sensed by the receiving subsystem electronics are provided to the controlling computer. The input data coordinates from the pseudo image are normalized for variations due to frequency dependence and electronic drift. The normalized data coordinates are looked up in a calibration table to account for distortion in the pseudo image detection electronics. Screen coordinates corresponding to pixel locations on the large area screen are found by interpolation from the data From the calibration table. The calibration table is prepared off-line, based on a bicubic spline interpolating function which is then compressed using a delta compression scheme. During on-line operation of the system, screen coordinates are looked-up directly from the compressed table. The screen coordinates are then jitter smoothed to provide a smooth path of response closely conforming to original input locations. The jitter smoothing method uses an exponential function based on the magnitude of the change in the position of the input.

13 Claims, 15 Drawing Sheets

METHOD FOR CORRECTION OF POSITION LOCATION INDICATOR FOR A LARGE AREA DISPLAY SYSTEM

CROSS REFERENCE TO RELATED APPLICATIONS

This application is a continuation-in-part application of U.S. patent application Ser. No. 07/608,439 of S. A. Elrod et al., entitled "POSITION AND FUNCTION INPUT SYSTEM FOR A LARGE AREA DISPLAY," filed Nov. 2, 1990.

BACKGROUND OF THE INVENTION

The present invention relates to the input subsystem of an electronic large area writing system. More specifically, the invention relates to techniques for correcting input location information to produce a position location indicator on an interactive system, wherein multiple persons may work together for supplying and receiving information with a single large area display. The invention incorporates improved methods for correcting a position location indicator by normalizing input data over frequency and electronic signal drift, and calibrating the input and screen data, and correcting the position location indicator for jitter in the movement of the input device.

In a collaborative working environment, several users may wish to view and manipulate displayed information simultaneously. It is desirable to provide a large area display system measuring several feet across (both horizontally and vertically) comprising a large area rear-projection display system and a position detecting receiving system based upon a position sensing integrating detector. Each of the multiple users would manipulate input devices which could be used simultaneously and independently for controlling its related position location indicator on the display in order to position a cursor, select an item from a menu, draw upon the display screen, or perform any number of standard functions. In this way the actions of each user would be readily visible to all the members of the group who would interact together much as they would relative to a chalkboard or whiteboard.

Computer systems generally incorporate a position location indicator for providing a visual indication to the user of selected data. A specific position location indicator, such as a pointer, may be moved by the user to any desired point on the display in order to locate a cursor for the entry of keystroke characters, to trace the locus of points as in drawing alphanumeric characters or other patterns, to invoke and manipulate a functional command such as paint or erase, to open a menu, to invoke a displayed command, or to invoke other interface functions. In each case the location of the pointer must be known, and in many applications the desired control function should be known as well.

A large area writing system is described, for example, in copending, coassigned U.S. patent application Ser. No. 07/863,650 (Attorney Docket No. D/90106Q) of S. A. Elrod et al., entitled "LARGE AREA ELECTRONIC WRITING SYSTEM," filed Apr. 3, 1992. An input system is described in copending, coassigned U.S. patent application Ser. No. 07/608,439 of S. A. Elrod et al., entitled "POSITION AND FUNCTION INPUT SYSTEM FOR A LARGE AREA DISPLAY," filed Nov. 2, 1990.

Pointer positioning in the above-described system is effected by a user-controlled light-emitting pen which projects a diffuse light spot upon a light-dispersive display screen. The receiving system electronics detects the centroid of the light spot and produces voltages which are related to the input location, and computes input data coordinates from these voltages. However, these coordinates are dependent upon the electronics response of the system and the frequency of the input device, and have a non-linear relationship to the screen coordinates of the display. Information concerning the input data coordinate location for the centroid of the light spot is relayed to the computer system, which determines the screen coordinates that correspond to the sensed input coordinates. The computer system then provides a position location indicator, such as a cursor in the display information, responsive to the input location information. It is an object of this invention to provide a method for correcting the position location indicator for the response of a large area display system to input location information.

SUMMARY OF THE INVENTION

In the present invention, one or more light-providing input devices is provided for simultaneously and independently entering position and function information into a large area electronic writing system comprising a large area viewing surface upon which a rear-projection display system displays image and position location indicator information generated by the electronic system. The system displays the image and position location information on an LCD panel which is rear-projected onto the large area viewing surface. The output illumination of each input device uniquely identifies the source and the function to be performed and is projected by the user as a modifiable light spot upon the display surface. Projected illumination from all of the input devices falls upon a receiving subsystem, which generates signals representative of the total optical input of each of the light spots in a pseudo image. This pseudo image has position sensing distortions due to frequency dependence, electronic signal drift, and non-linear sensing capability in the sensing electronics, so that the data coordinates produced for the pseudo image have a non-linear one-to-one correspondence with the pixel location in the display image of the position of the input light spot. It is an object of this invention to provide a method of correcting the position of a position location indicator in the large area display system in response to the pseudo image coordinates. The signals from the sensor are converted into pseudo image data coordinates representative of each light spot. The data coordinates are adjusted for frequency dependence and for signal drift due to the electronics of the system, and are then looked up in a compressed table of calibration data to determine screen coordinates which correspond to the data coordinates. The change in position of the screen coordinates is smoothed to eliminate jitter, and a position location indicator which closely conforms to the user input location is provided to the display system for projection upon the screen.

The technique of the present invention combines techniques which determine a corrected location for response to an input indicated by a light spot created by a light pen. An input position pseudo image sensed by the light detection electronics is converted from raw voltages to a pair of input data coordinates ($X_i$, $Y_i$) indicative of the input location pointed to by the light pen. The input data coordinates are adjusted to normalize ($X_v'$, $Y_v'$) for the indicated function frequency and for electronic signal drift over time. The normalized input data coordinates have a non-linear relationship to the coordinates of corresponding pixel locations on the screen. A compressed calibration table, formed at the beginning of operation of the system, is used by a table look-up function to determine the corresponding screen coordinates for a position indicated by the normalized input data coordinates. The table look-up finds the corresponding locations surrounding the input data coordinates, and interpolates to find screen coordinates ($X_s$, $Y_s$), which indicate a position on the screen corresponding to the light pen input location. The input position is then smoothed to reduce residual jitter, producing corrected display coordinates (x, y) for the position location indicator for the system.

One aspect of the invention is based on the recognition that the system electronics in a large area writing system are not ideal devices, and so the response to inputs may be affected by the frequency of the inputs, and may change over time. This problem can be solved by normalizing the output for slight differences due to frequency dependence and signal drift in the input electronics by determining normalization factors which adjust the position of the position location indicator to account for these differences.

A further aspect of the invention is based on the recognition that in the case of a large screen display input, it is desired to convert from a nonlinear grid of pseudo image data coordinate input values to linear screen coordinate values. This complication arises due to the fact that the conversion is between points created during calibration, and although screen coordinates for pixels of the display image are regular, the data coordinate readings are not equally spaced due to the non-linear response of the detector with respect to positions on the screen. This problem can be solved by computing a spline function to interpolate between input data coordinates of points with known screen coordinates. An additional problem arises in that while spline functions are good for interpolating between values specified on a regular two-dimensional input grid, such calculations are too slow for real-time use. Another aspect of the invention is based on the recognition that this problem may be solved by performing the spline function calculations off-line and storing values associated with the conversion from input data coordinates to screen coordinates in tabular form in memory to be looked up during real-time operation.

Another aspect of the invention is based on the recognition that for multiple pens, the memory requirements for a table of pen values in the X direction and pen values in the Y direction, for each pen, will require excessive amounts of memory. Storing the tables in the host computer's main memory would unacceptably increase the response time to the pen input since calibration is done by a digital signal processor (DSP) that is connected by a low bandwidth serial link to the host. This problem can be solved by compressing the calibration data such that each pen is represented by a single table that may be stored in memory local to the processor, and that X and Y values may be interleaved in the single table to simplify the look-up procedure in the compressed table.

A further aspect of the invention is based on the recognition that the motion responsive to an input of the pen should be adjusted or smoothed relative to the magnitude of the change in position, to reduce jitter in small movements. This problem is compounded by the recognition that a conventional time-based average smoothing function will introduce sluggishness in the response, and an amplitude-based filtering circuit may add additional complexity to the hardware of the system. This problem may be solved by multiplying the change in distance by a smoothing function based on an exponential function which is near zero for small movements, and approaches 1.0 as the magnitude of the distance change gets large, in order to keep the pen responsive.

The following description, the drawings, and the claims further set forth these and other objects, features and advantages of the invention.

Fig, 3(a) is a timing diagram associated with the sampling electronics.

Figure 4:
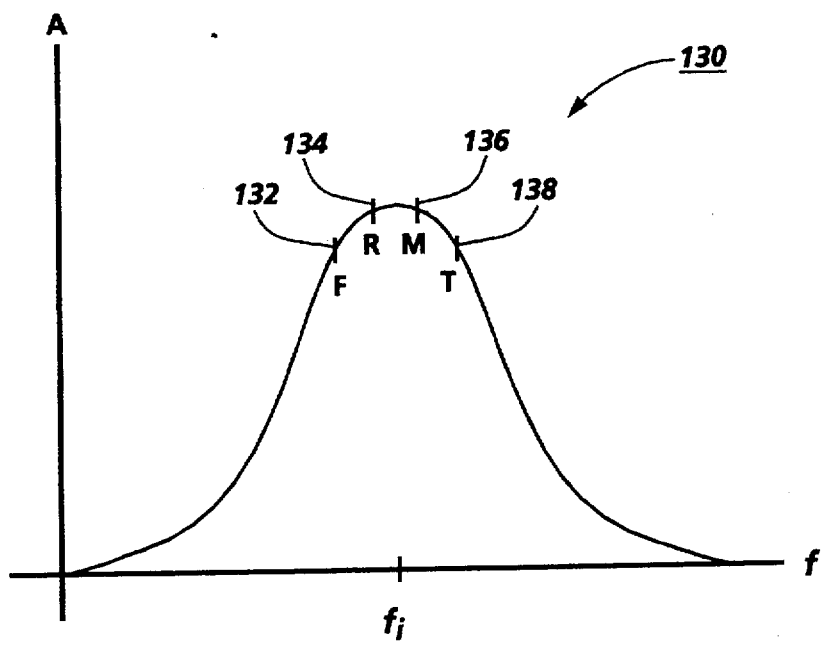

FIG. 4 shows a frequency band of frequencies passed by a narrowband filter for a single pen.

Figure 5:
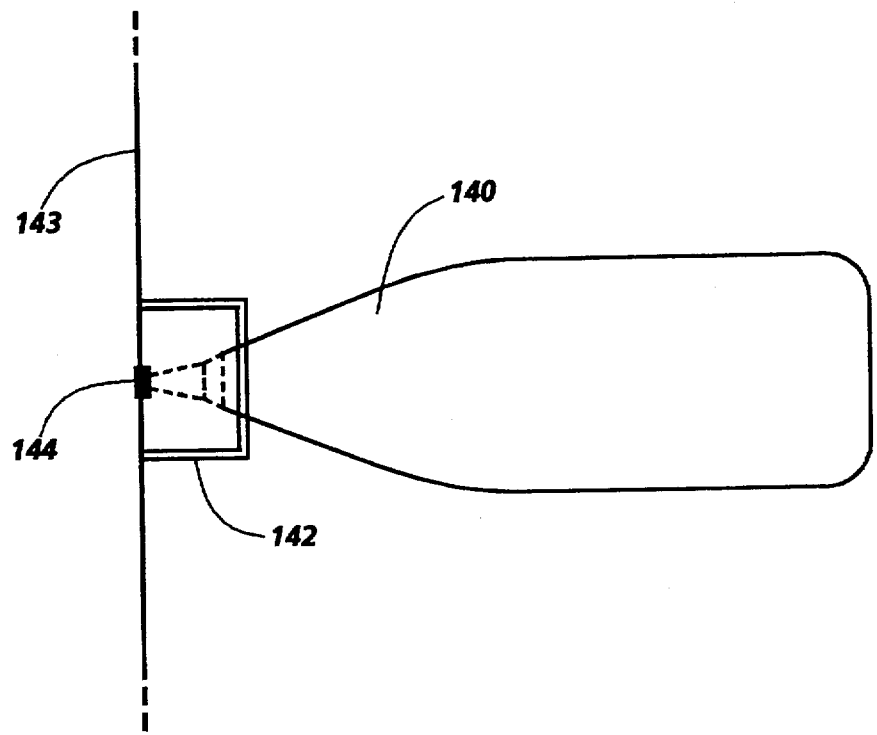

FIG. 5 shows a calibration pen that may be used to input normalization and calibration points.

Figure 6:
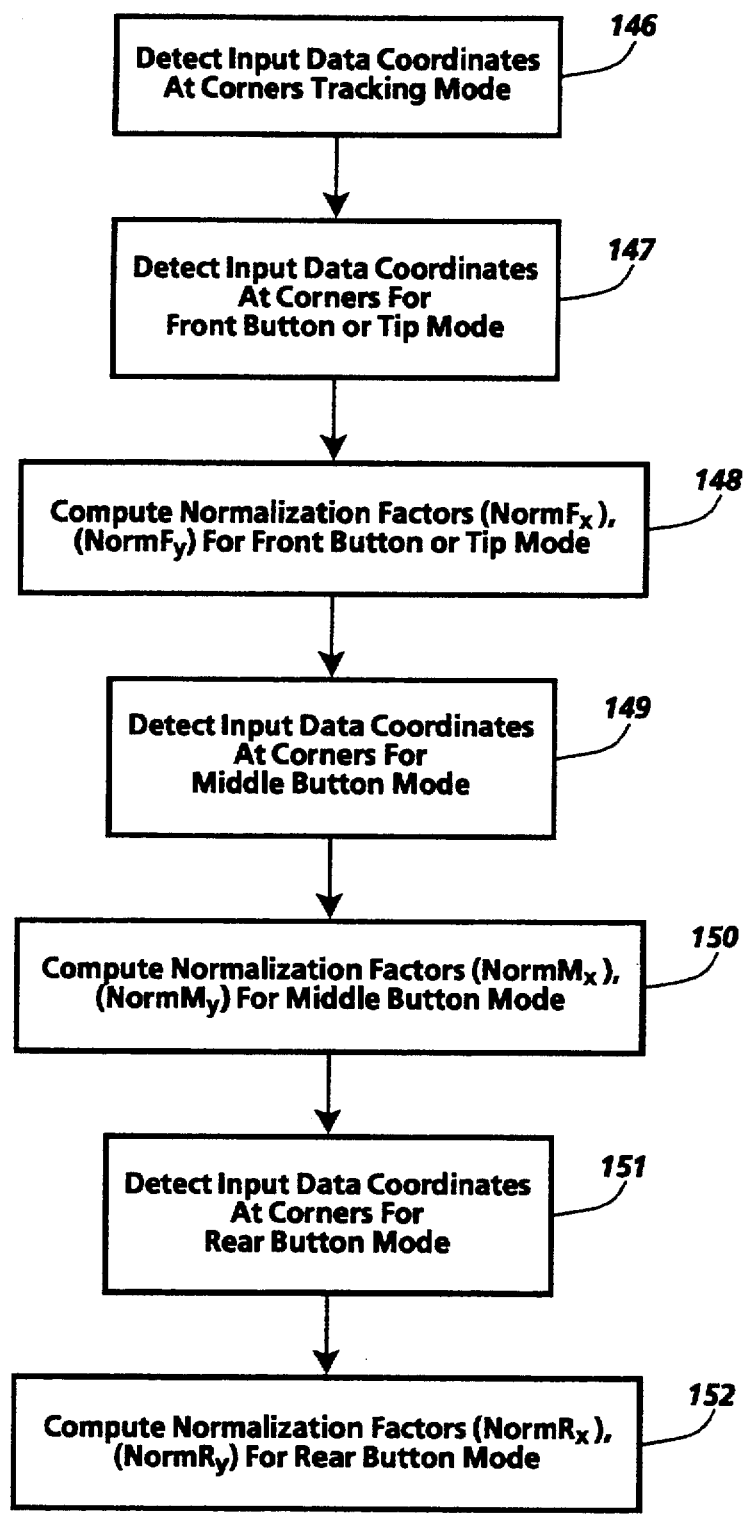

FIG. 6 shows a method for normalizing the output values for the frequencies indicative of different function inputs.

Figure 7:
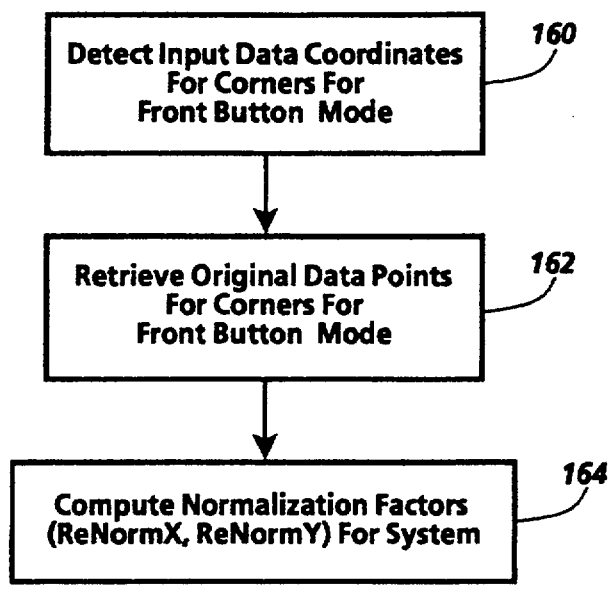

FIG. 7 shows a method for renormalizing the screen at a time after the initial normalization process.

Figure 8:
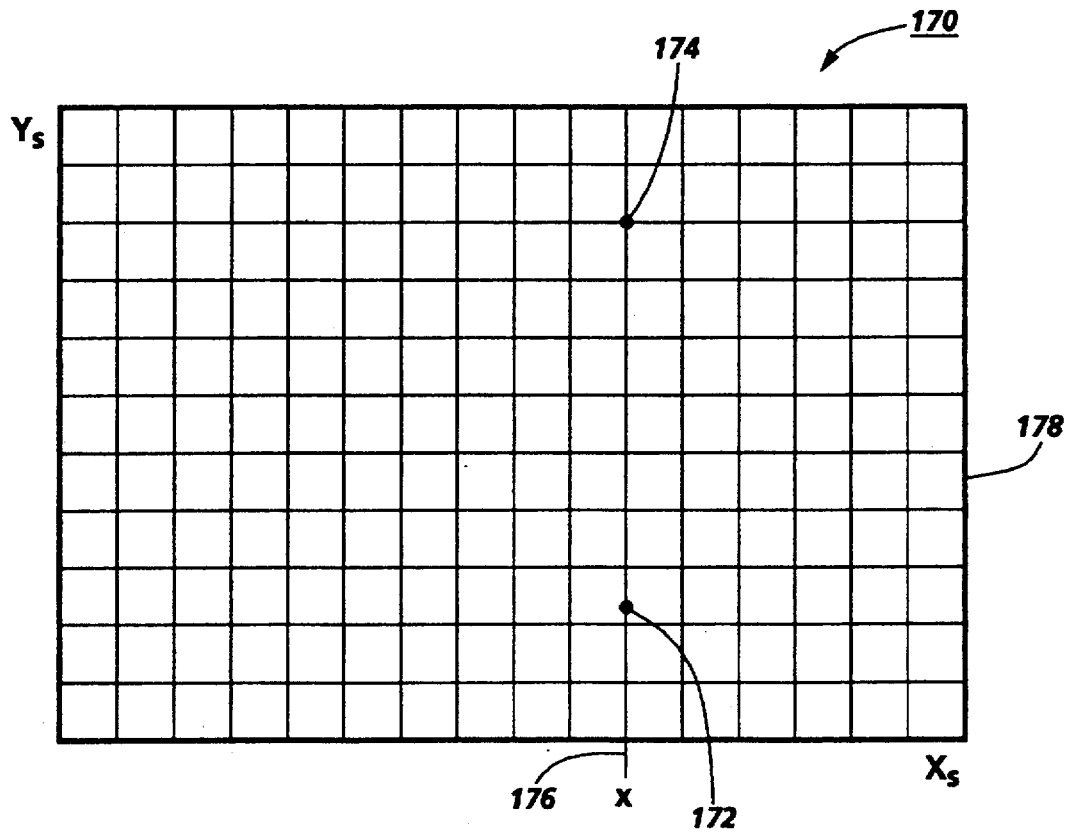

FIG. 8 shows a screen coordinate grid of lines of constant pixel coordinates.

Figure 9:
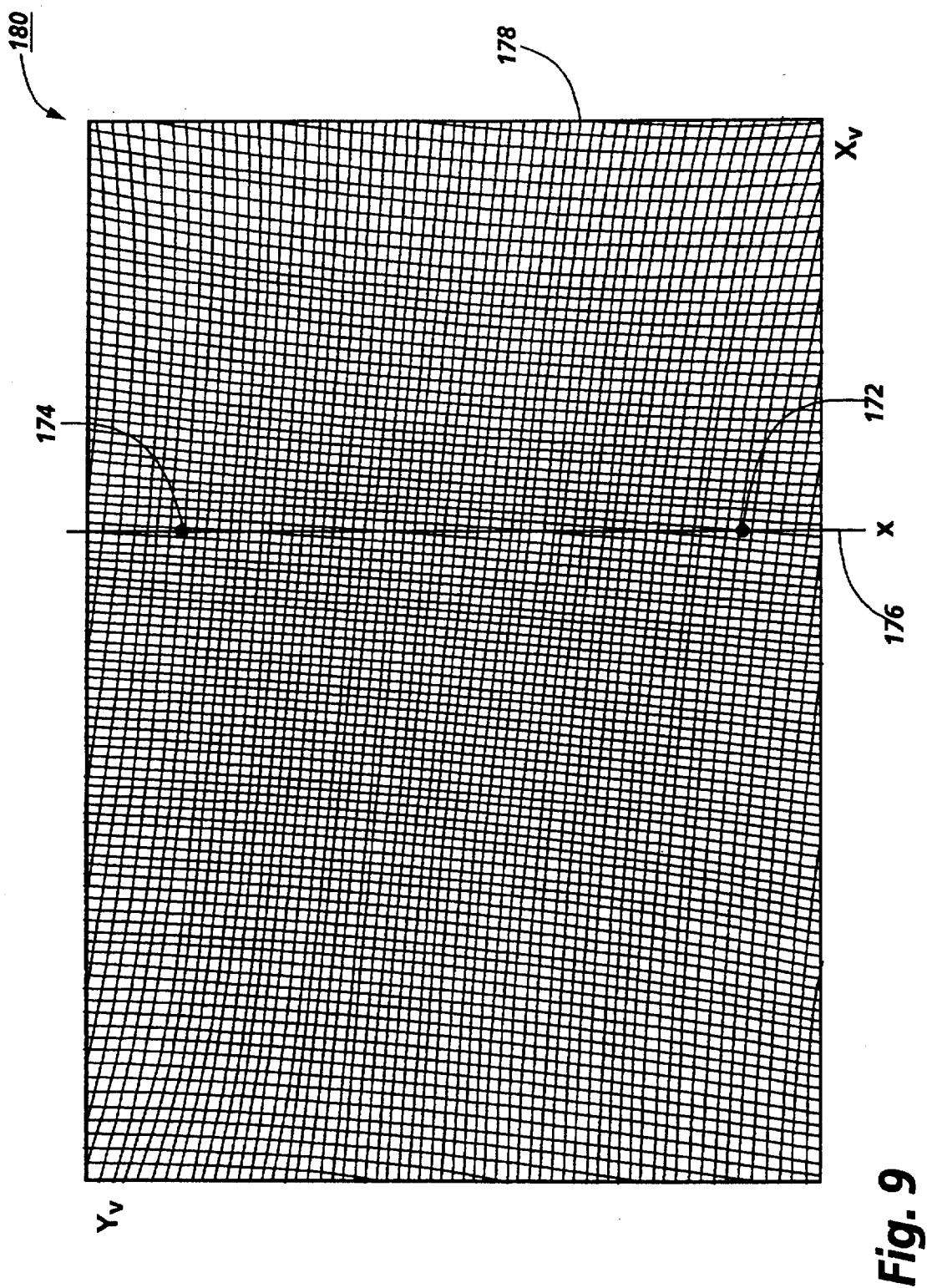

FIG. 9 shows a voltage grid of lines of constant voltage as detected by the sensor in the pseudo image.

Figure 10:
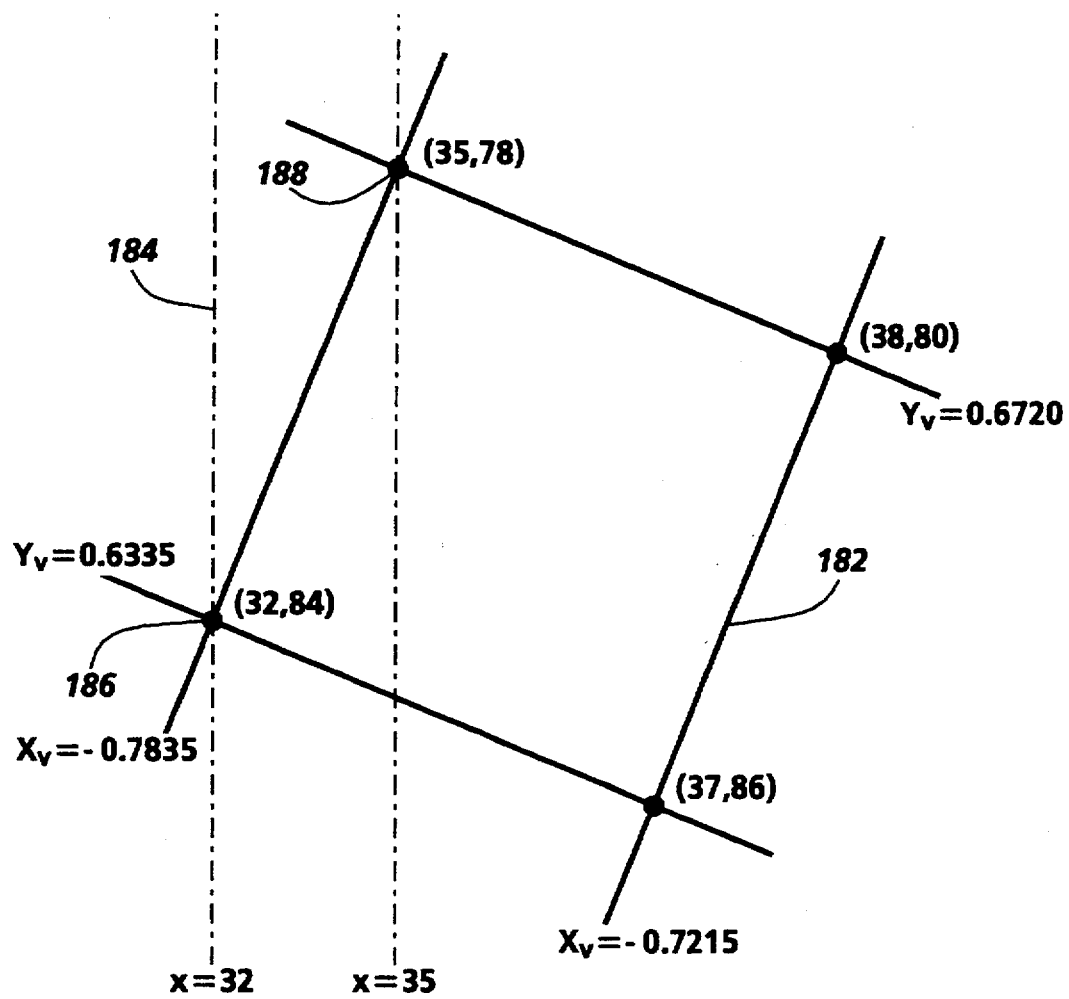

FIG. 10 illustrates the relationship between the two sets of dimensions for the system.

Figure 11:
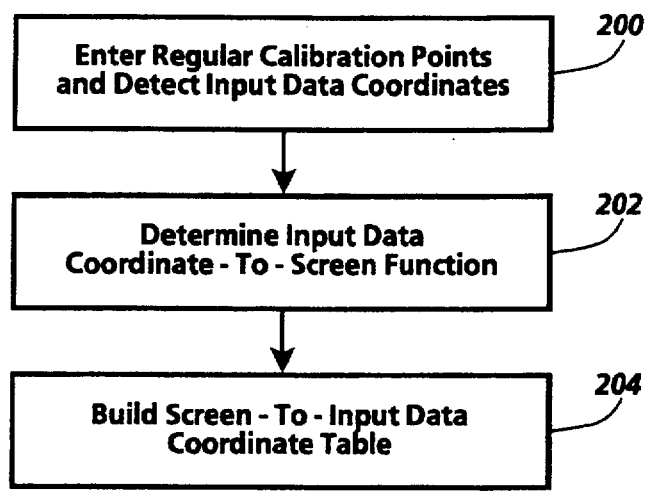

FIG. 11 shows a method for conversion to the screen coordinate grid from the voltage grid by calibrating the response to the system for a known set of input points.

Figure 12:
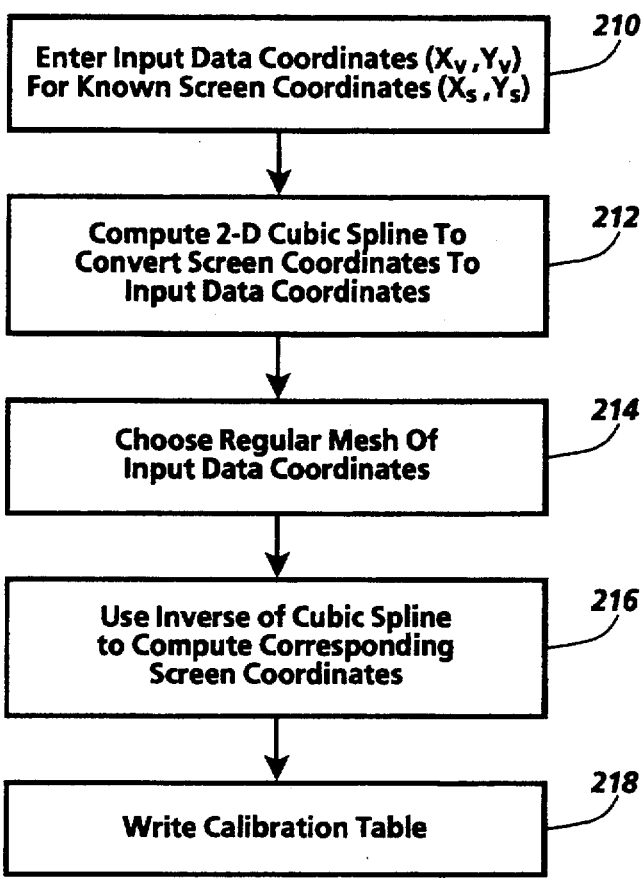

FIG. 12 shows the steps in building a table of calibration data.

Figure 13:
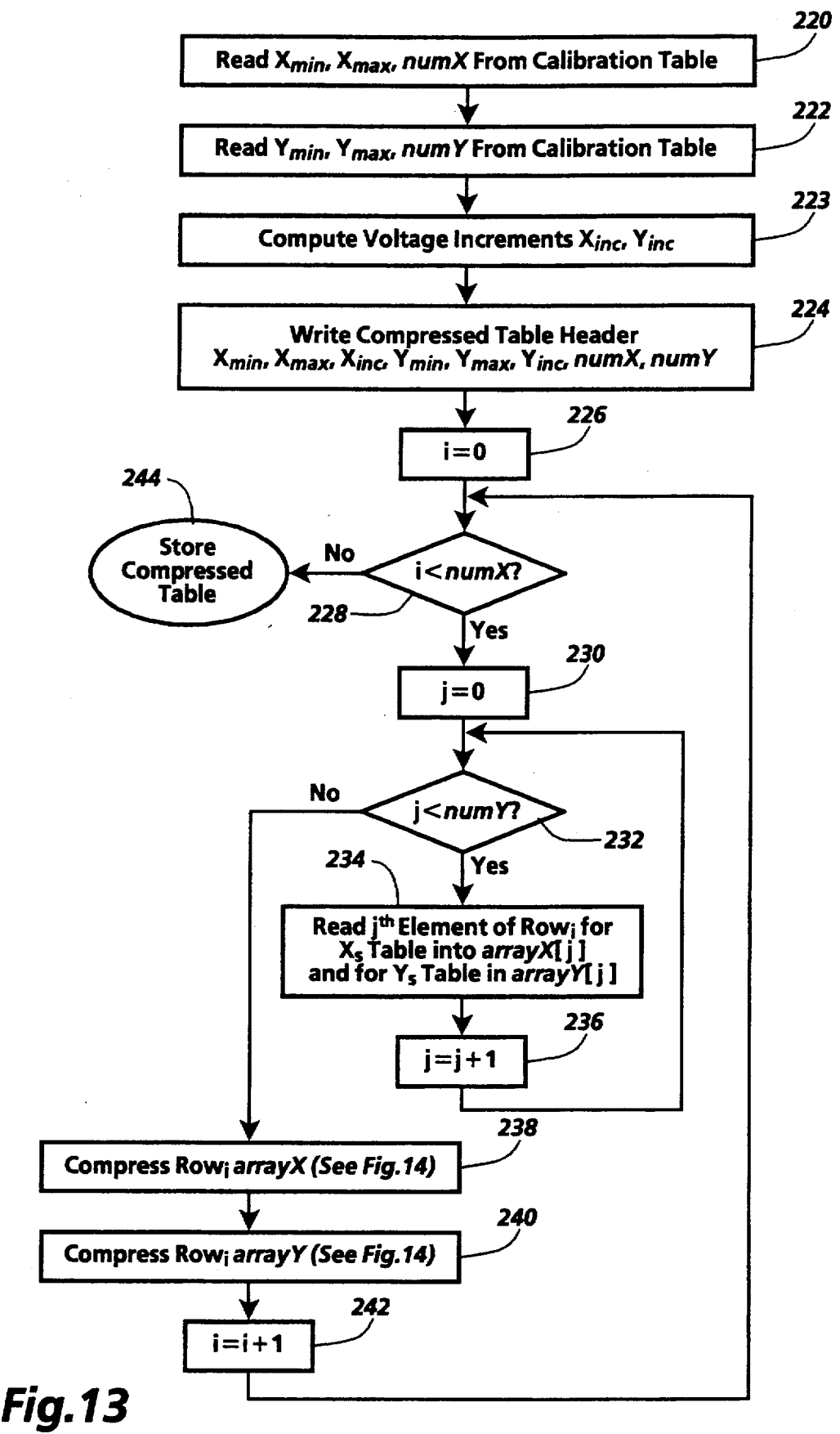

FIG. 13 shows the steps in compressing the values from the calibration table into a single table of X and Y rows for a pen.

Figure 14:
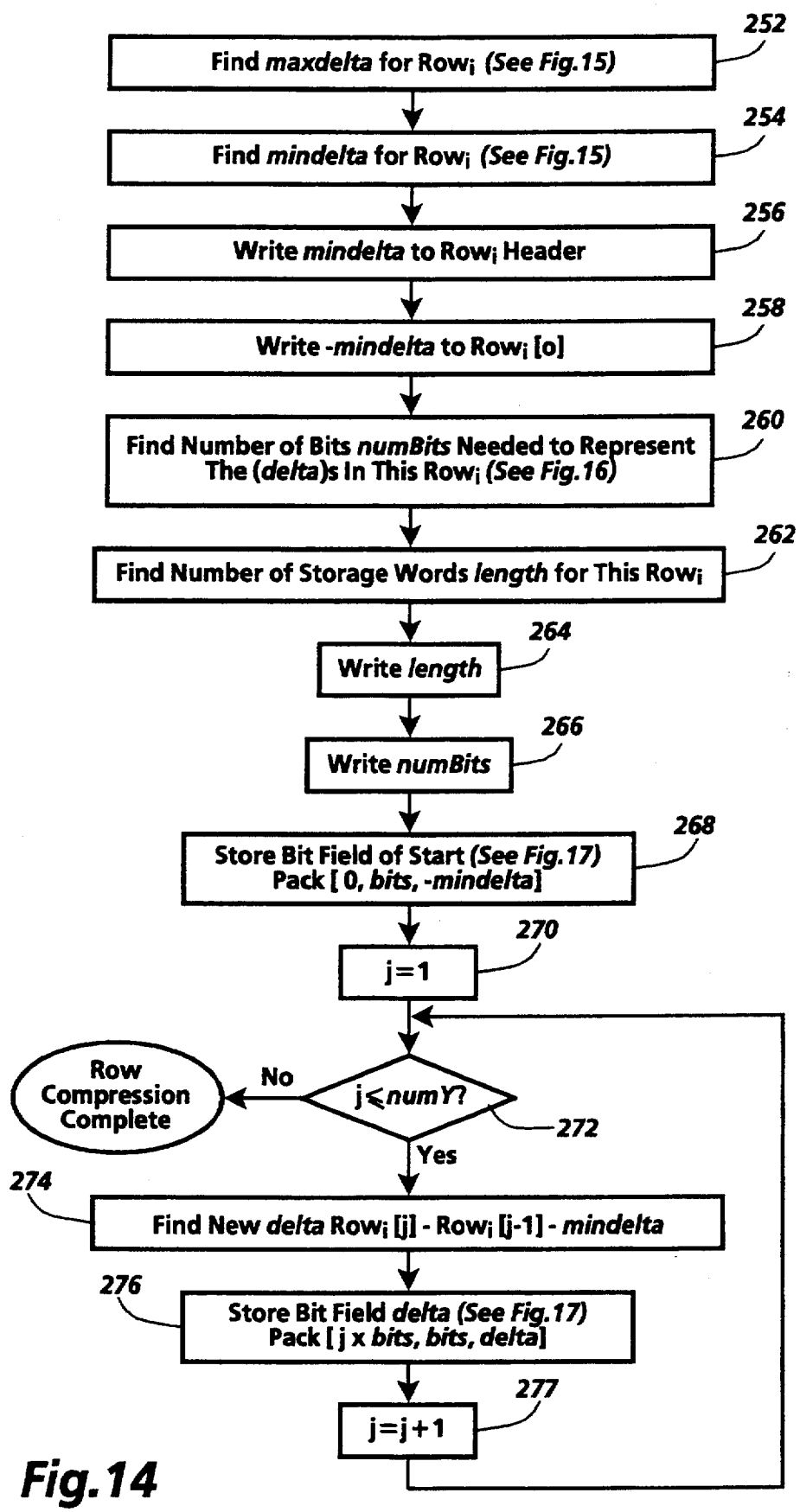

FIG. 14 shows the steps in compressing a row for the compressed calibration table.

Figure 15:
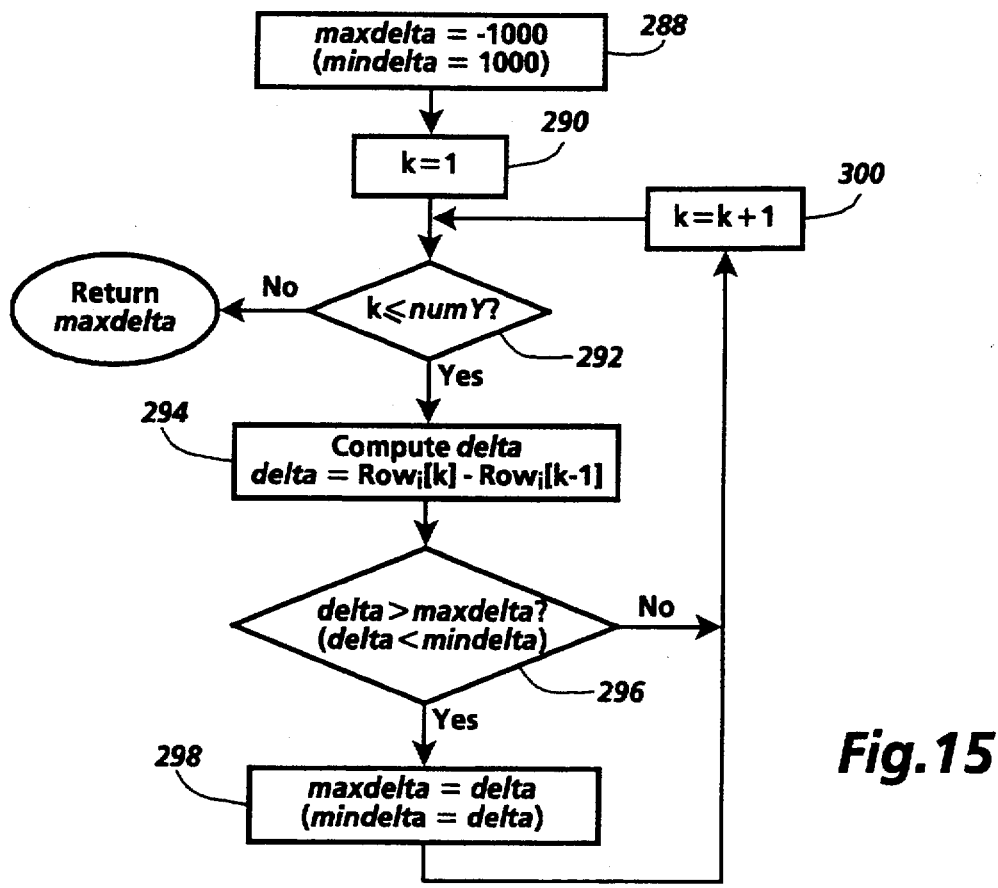

FIG. 15 shows the steps in finding maxdelta of a row.

Figure 16:
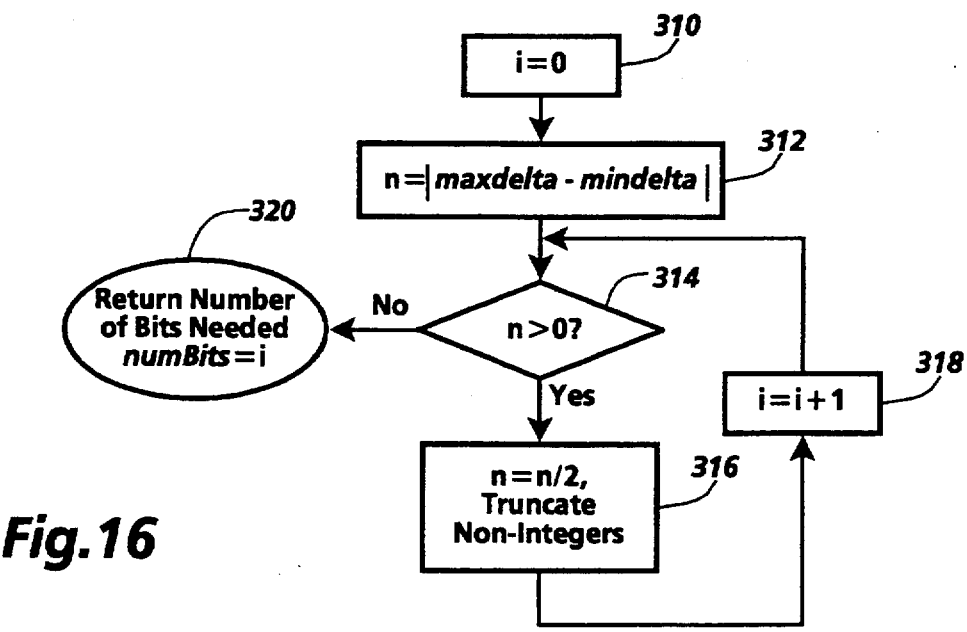

FIG. 16 shows the steps in finding the necessary number of bits to represent the deltas in a row.

Figure 17:
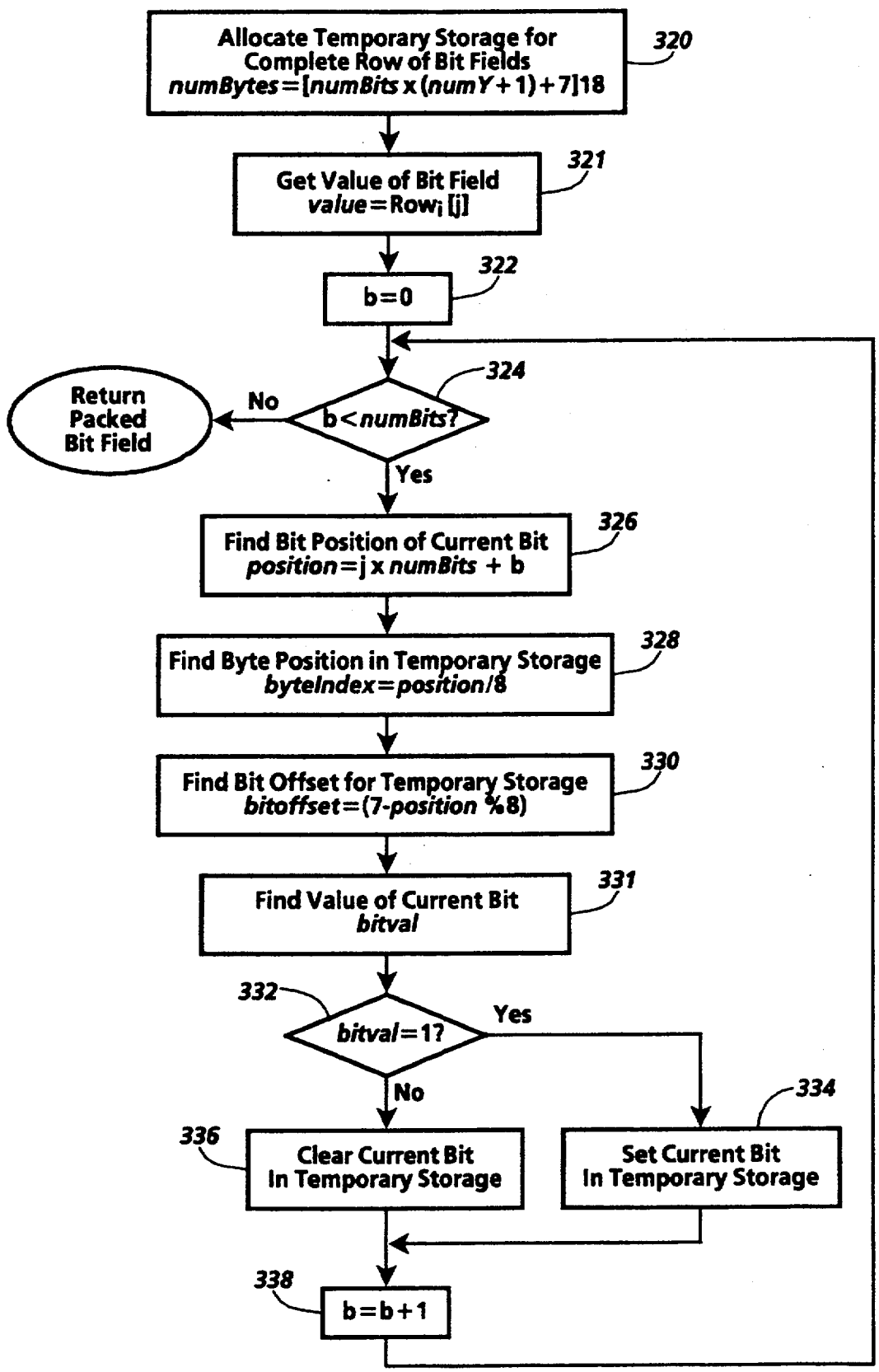

FIG. 17 shows the steps in packing a bit field into the compressed table.

Figure 18:
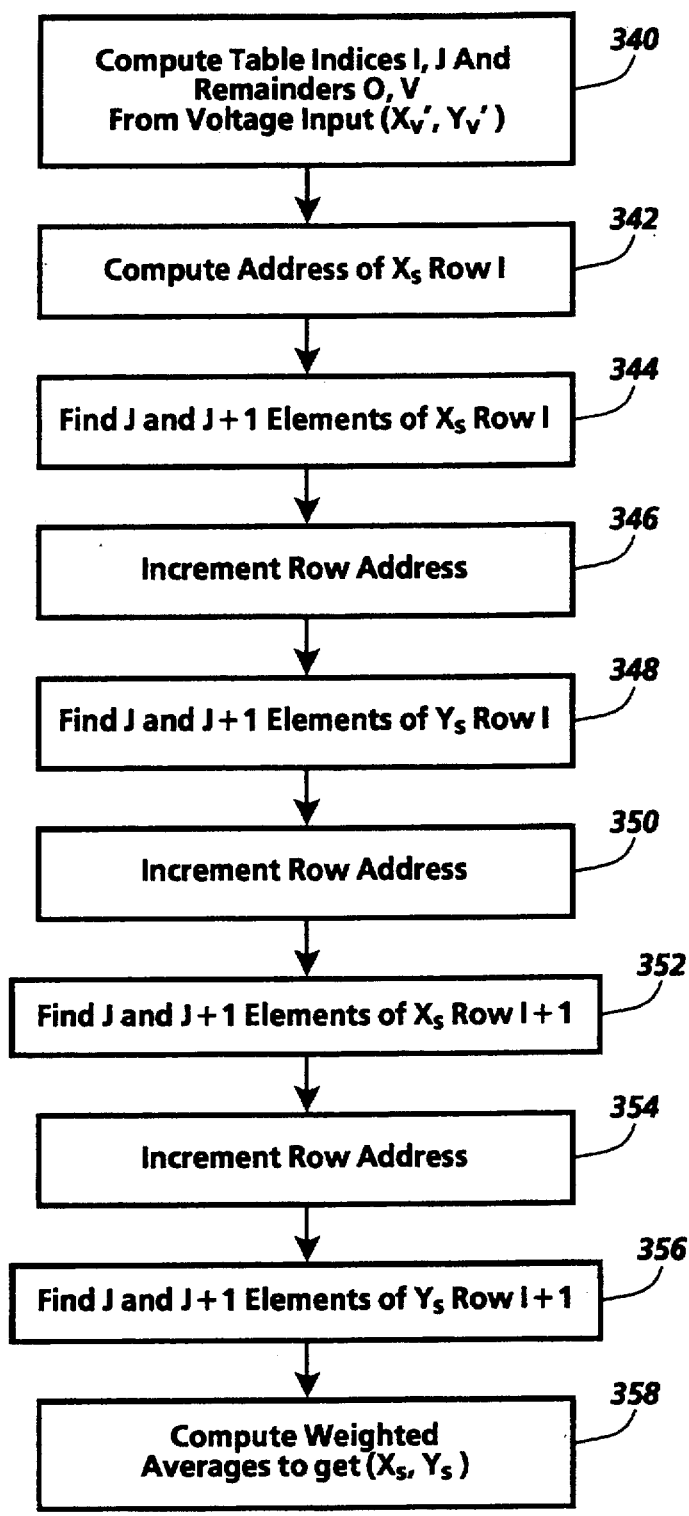

FIG. 18 shows the steps for the looking up and interpolating a screen position using the compressed table.

Figure 19:
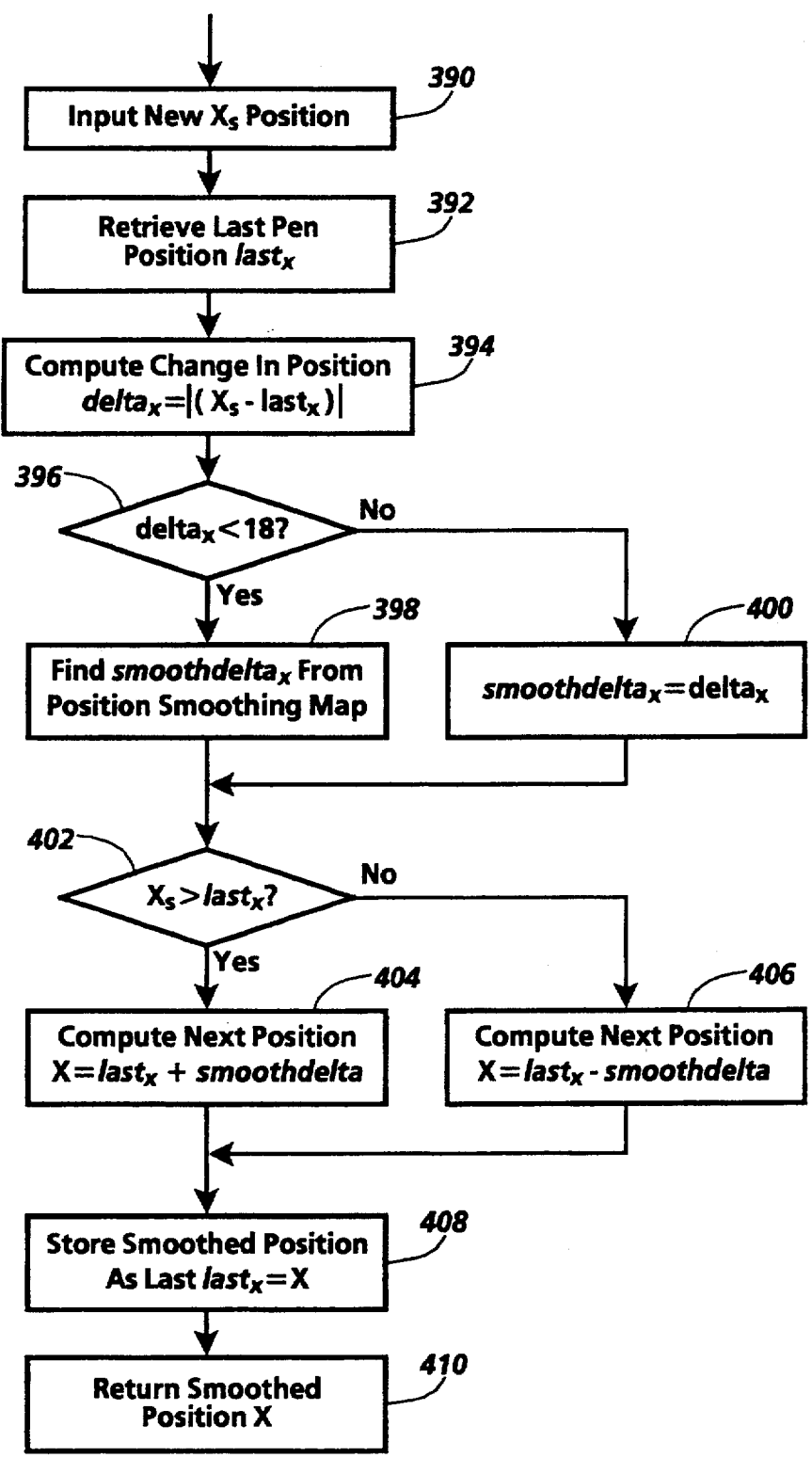

FIG. 19 shows the steps in jitter smoothing the response of the system.

DETAILED DESCRIPTION

A. General Features

Figure 1:
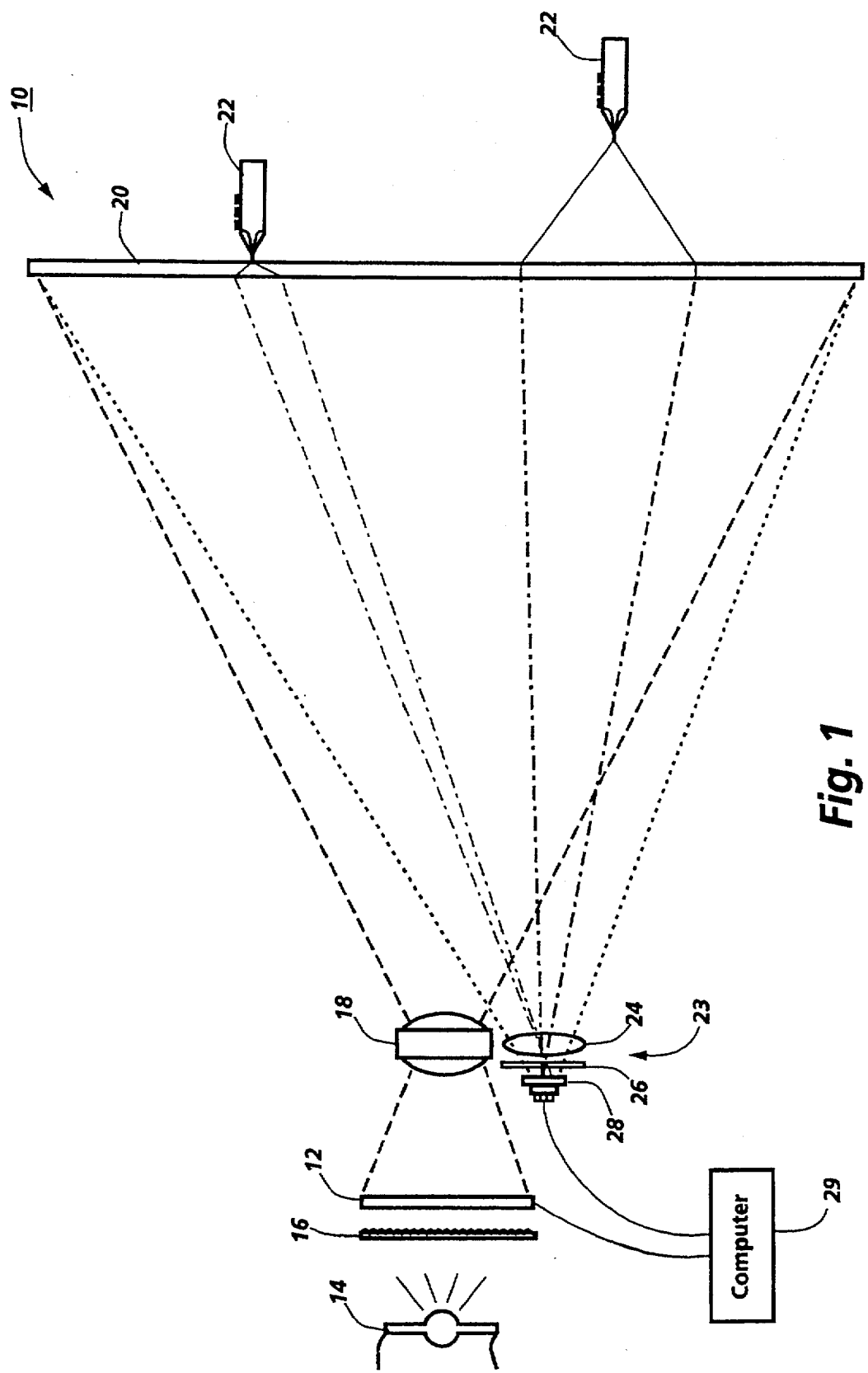
FIG. 1 shows a large area display terminal.

Turning now to the drawings, FIG. 1 shows a large area display terminal 10 in the form of a rear projection system comprising a one million pixel liquid crystal light valve panel 12, controlled by a computer 29, such as a SPARCStation-2 from Sun Microsystems, of Mountain View, Calif. The panel 12 is interposed between a high intensity projection lamp 14, focused by Fresnel lens 16, and a projection lens 18. The image is magnified about fivefold to illuminate, at about twenty spots per inch, a slightly convex curved (as viewed) display screen 20 having an area of about three feet by five feet.

One or more wireless light pens 22 (two shown) project a beam of light from a light source onto the front surface of the screen 20 at a location where the user desires to indicate a position location, such as a pointer. It would be practical either to maintain the light pen in contact with the surface being written upon, or to project the light spot from several feet away from the screen. It should be noted that as a remote pen projects a larger light spot, the effective zone of accurate usage gets closer to the center of the screen because too much light falls off the screen.

The user's feedback is generated by the electronic system and presented as a position location indicator on the display screen in response to the information obtained by the receiving subsystem 23. The position indicating feedback may take the form of a cursor located on the screen 20 at the pixel location (x, y) corresponding to the position location pointed to by the light pen. The position location indicator at (x, y) is displayed with the image.

The receiving subsystem 23 comprises a large curvature demagnification lens 24, which directs an image of the light spot falling upon the screen 20 from the user's light pen, through a filter 26 which blocks out spurious light and then focuses the spot upon a position sensing integrating detector 28, such as a photodiode.

Position sensing photodiode 28, is a continuous dual axis position sensor that provides both X and Y axis position information. It senses the centroid of a light spot and provides continuous analog outputs as the spot traverses the active area. Suitable electronic instrumentation allows the X and Y coordinates for each pen to be separated and displayed as a position location indicator upon the projection screen 20. The electronic instrumentation controlling the input pens is more fully described in the copending, coassigned U.S. patent application Ser. No. 07/608,439 of S. A. Elrod et al., entitled "POSITION AND FUNCTION INPUT SYSTEM FOR A LARGE AREA DISPLAY," incorporated herein by reference.

Figure 2:
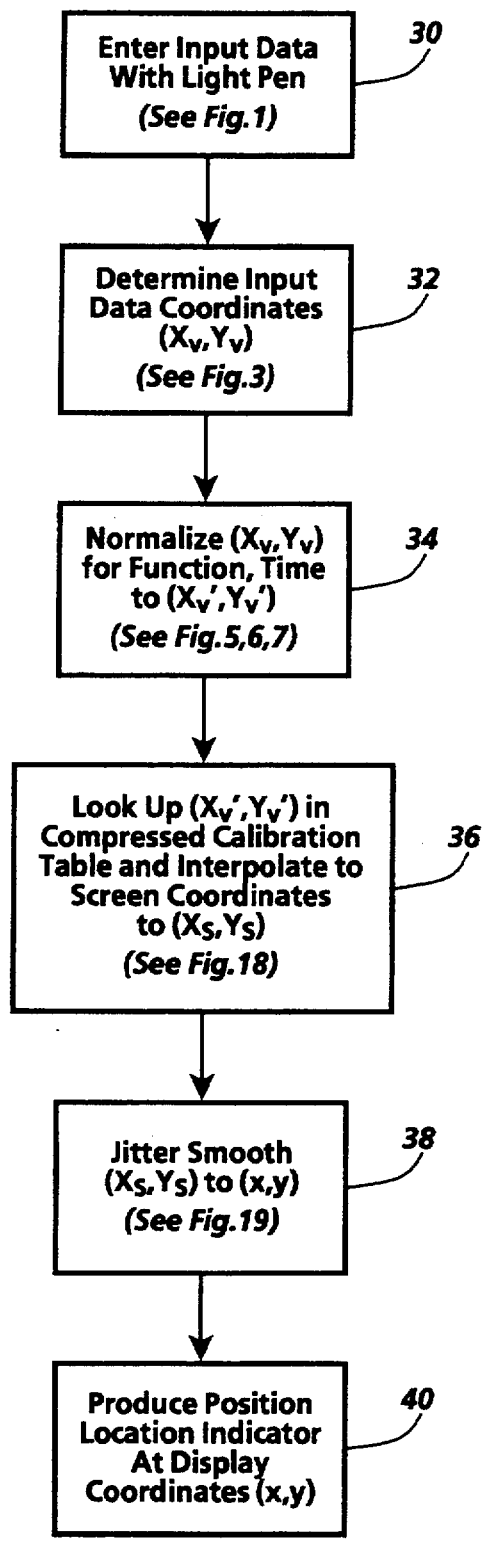
FIG. 2 describes an implementation using the general method of the invention in a large area writing system.

The flowchart of FIG. 2 describes a method [or improving the response to an input in a large area writing system, using the general method of the invention.

The step in box 30 enters data representing a location pointed to by the light pen, as shown by pen 22 in FIG. 1. The step in box 32 finds the input data coordinates of the screen ($X_v$, $Y_v$) at the input location, as described in FIG. 3. In the step in box 34, adjusts the input data coordinates to normalize for the function indicated, as described in relation to FIG. 6, and for drift over time, as described in relation to FIG. 7, to produce normalized data coordinates ($X_v'$, $Y_v'$).

The step in box 36 adjusts the normalized data coordinates ($X_v'$, $Y_v'$) for the distortion of the pseudo image detected by the sensor electronics. Locations corresponding to locations surrounding the normalized data coordinates ($X_v'$, $Y_v'$) are found from a compressed table of calibration data, and interpolation between these points determines the screen coordinates ($X_s$, $Y_s$), as described in relation to FIG. 18. The step in box 38 then jitter smooths the movement as described in relation to FIG. 19, to produce a corrected position location indicator at display coordinates (x, y) for response by the system in the step in box 40.

Figures 3, 3A:
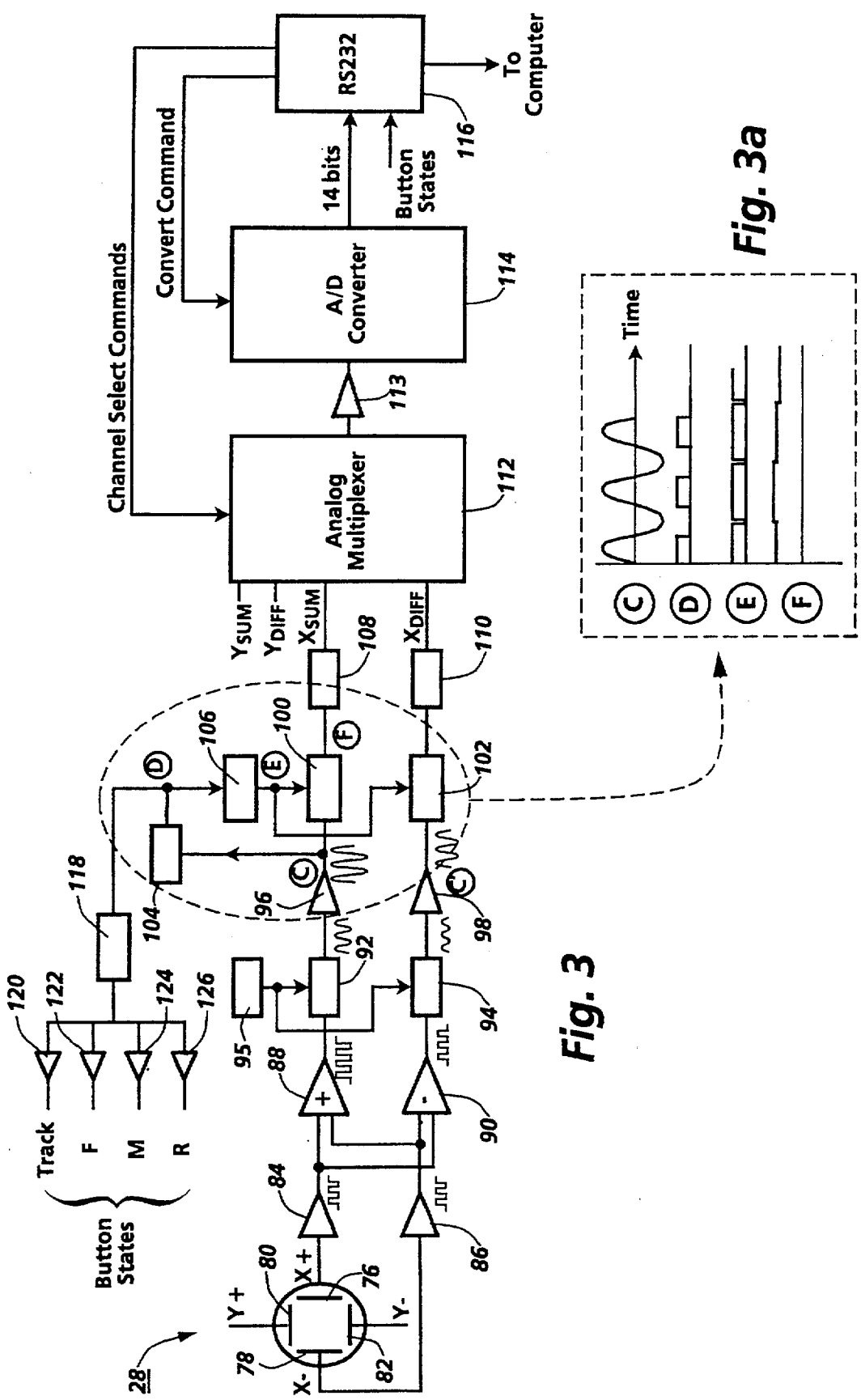
FIG. 3 is a block schematic of the sensing and position location indicator control electronics for a single light pen.

The circuit of FIG. 3 schematically illustrates a technique wherein narrowband filters 92 and 93 are used to separate the X and Y positions of one light pen from the X and Y positions of another and provide digital signals indicative of each of the X and Y positions. Although only a single pen operated at a single frequency is shown and described, it should be understood that a number of pens (e.g., three) can be used simultaneously and independently. Each pen may be identified by a central identification frequency. Multiple functions for each pen are identified by function frequencies closely clustered about each identification frequency.

The position sensing photodiode 28 includes four (two opposed pairs) electrodes 76(X+), 78(X−), 80(Y+) and 82(Y−), each of which generates a current signal as a function of the light intensity and position of the centroid of the light spot projected thereon. If several pens are being used, they simultaneously project optical signals chopped at different frequencies. The output signals from the detector electrodes will be a complex superposition of square waves at those frequencies. These complex waves will be separated in the circuit described below wherein only representative signals for the X coordinates are shown. It should be understood that the Y coordinate signals are handled in a similar manner.

X+ and X− square wave current signals are converted to voltage signals and amplified at amplifiers 84 and 86. Initially the principal noise in the system is the detector noise so care is taken to amplify the signal to a usable level without introducing noise to the signal. Then both signals pass to standard sum and difference amplifiers 88 and 90 for determining location. The sum of X+ and X− will always have the same phase relationship to the pen modulation and will be a fairly large signal, while the difference can either be in phase (on one side of the center of the detector) or 180° out of phase (on the opposite side of center). Next, the $X_{sum}$ and $X_{diff}$ signals, which include fundamental and higher level harmonic frequency components (since they are comprised of square waves), are each passed through a switched capacitor narrow bandpass filters 92 and 94 tuned to a very narrow predetermined frequency range by a crystal controlled clock 95 so as to pass the cluster of frequencies for a specific pen. The output of the bandpass filters are sine waves at the first harmonic frequency. Once again the output signals are amplified by amplifiers 96 and 98 in order to be able to more easily extract the amplitude and frequency information representative of position and function information for the specific pen.

The $X_{sum}$ and $X_{diff}$ sine wave signals then pass to sample and hold circuits 100 and 102 controlled by a signal shunted from the $X_{sum}$ sine wave. The shunted signal (C) (note FIG. 3a) fires a zero crossing detector 104 so that each time the sine wave (C) crosses zero, the output signal changes between low and high (0 to 5 volts) as represented by signal (D). When signal (D) goes from high to low it fires a controlled time delay circuit 106 whose output is signal (E), a negative going pulse approximately 2 μsec in duration, which coincides with the next peak of the sine wave. The time delay is set to correspond to ¼ cycle of the mean frequency of the cluster. Signal (E) controls the sampling of sample and hold circuits 100 and 102, so that at every negative going pulse a peak is sampled. Since the $X_{sum}$, $X_{diff}$, $Y_{sum}$, and $Y_{diff}$ signals are all generated by a single light pen, it is sufficient to generate a single timing signal (E) for all of these signals. The output signal (F), from the sample and hold circuits, is a stair-stepped DC voltage indicative of the amplitude of the $X_{sum}$ and $X_{diff}$ sine wave signals (C and C'), and representative of the light spot position. RC filters 108 and 10 remove noise from the DC signal (F).

The DC signals (F) pass to an analog multiplexer 112 which scans them and sequentially passes the $X_{sum}$, $X_{diff}$, $Y_{sum}$ and $Y_{diff}$ signals through a unity gain buffer 113 to an A/D converter 114 which converts each sequentially received analog voltage signal (F) and converts it into a fourteen bit digital signal.

The square wave signal (D) is additionally used to differentiate among the closely clustered frequencies to determine the invoked function. A portion of the signal is tapped off and sent to a frequency-to-voltage converter 118 whose output passes to four comparators 120, 122, 124, and 126, each set at a different threshold in order to determine the exact frequency of the signal for identifying the button state of the light pen.

Output from the controller 116 feeds back channel select commands to the multiplexer 112, reeds convert commands to the A/D converter 114, and feeds the data point information for the single pen to the DSP.

Since both sum and difference signals vary linearly with respect to the intensity of the light spot, a division step will yield generalized input data coordinate values ($X_v$ and $Y_v$):

$$X_V = \frac{X_{diff}}{X_{sum}} \text{ and } Y_V = \frac{Y_{diff}}{Y_{sum}}.$$

The pseudo image data coordinates $X_v$ and $Y_v$ eliminate light intensity variability going to battery power shifts, the angle at which the light pen is held with respect to the screen, and the distance of the light pen from the center of the screen. $X_v$ and $Y_v$ have a non-linear one-to-one correspondence with the $X_s$ and $Y_s$ screen coordinates due to the screen non-linear voltage variance, non-linearities in the imaging lens, non-linearities intrinsic to the detection electronics, and other factors.

Although the present invention has been described with reference to a specific frequency generating circuit and a specific discrimination circuit, it is possible that other suitable circuits could be used within the purview of this invention.

B. An Implementation
1. Normalization

FIG. 4 shows frequency band 130 of frequencies passed by a narrowband filter for a single pen, such as filter 92 in FIG. 3. The band is centered around a central frequency $f_i$, with the function identifying frequencies being identified such as by a comparator 120, 122, 124, and 126 of FIG. 3. The frequency bands for the multiple pens are significantly separated, and the function identifying frequencies for each pen are closely clustered in these frequency bands. Frequency 132 is associated with the front button or the tip switch on the light pen, since pressing the pen tip against the screen activates a switch that indicates the same function as the front button. Frequency 134 is associated with the rear button on the light pen, frequency 136 is associated with the middle button on the light pen, and frequency 138 is associated with the tracking signal of the pen.

Under ideal conditions, the different frequencies identifying different function states would cause no deviation in the mapping of input data coordinates ($X_v$, $Y_v$) to screen coordinates ($X_s$, $Y_s$). In implementation, however, the location identifying circuitry has some frequency dependence which may cause some distortion in the detection of pseudo image data coordinates from one state to the next. For example, pushing a button on a pen held stationary at the edge of the screen may cause the cursor responsive to that pen to noticeably jump.

A calibration pen 140 that may be used to input normalization and calibration points is shown in FIG. 5, pointing to location 144 on screen 143. Pen 140 has a modifiable light source which operates at multiple frequencies, representing multiple functions for multiple pens. For example, a system utilizing three pens, each with four different function states, must obtain full calibration data for one frequency of each pen, and must obtain normalization data for the other three frequencies of each pen. A pen collar 142 assists the user in holding the calibration pen 140 steadily perpendicular to screen 143 at location 144. The calibration pen 140 may scan through each of the twelve frequencies while being held at each normalization point, as described below.

The flowchart of FIG. 6 shows a procedure for normalizing the data coordinate values for the frequencies indicative of different button states. Although normalization for only a single pen is shown and described, it should be understood that a number of pens/e.g., three) can be used simultaneously and independently. In the step in box 146, input data coordinates ($X_{vtrack}$, $Y_{vtrack}$) at the Four corners of screen 20 are detected for a pen in tracking mode. In the step in box 147, the corner input data coordinates ($X_{vfront}$, $Y_{vfront}$) are detected for a pen in front button or tip mode.

In the step in box 148, the front button normalization factors NormFx and NormFy are computed using the data collected at the corners. This can be deduced by dividing the pen coordinate value for the front button state by the pen coordinate value at the same point for the tracking state, and averaging across the four corners as follows:

$$NormFx = \frac{\left(\frac{X_{Vfront}}{X_{Vtrack}}\right)_{corner1} + \left(\frac{X_{Vfront}}{X_{Vtrack}}\right)_{corner2} + \left(\frac{X_{Vfront}}{X_{Vtrack}}\right)_{corner3} + \left(\frac{X_{Vfront}}{X_{Vtrack}}\right)_{corner4}}{4} \text{ and}$$

$$NormFy = \frac{\left(\frac{Y_{Vfront}}{Y_{Vtrack}}\right)_{corner1} + \left(\frac{Y_{Vfront}}{Y_{Vtrack}}\right)_{corner2} + \left(\frac{Y_{Vfront}}{Y_{Vtrack}}\right)_{corner3} + \left(\frac{Y_{Vfront}}{Y_{Vtrack}}\right)_{corner4}}{4}.$$

The step in box 149 detects input data coordinates ($X_{vmiddle}$, $Y_{vmiddle}$) at each of the four corner points for a pen in middle button mode. Then the normalization factors NormMx and NormMy are computed in the step in box 150 in the same manner as the front button normalization factors above. The step in box 151 detects data coordinates ($X_{vrear}$, $Y_{vrear}$) for the four corners for a pen in rear button mode, and finally computes the normalization factor NormRx and NormRy in the step in box 152 in the same manner as the front button normalization factors above.

During operation, then, to get coordinates for an input when a mode other than tracking mode is indicated, the system divides the input data coordinate reading by the normalization factor for that function mode. For example, if the system senses for tracking mode ($X_v$, $Y_v$), if the pen is in front button mode the system will compute:

$$X_{v'} = \frac{X_V}{NormFx} \quad \text{and} \quad Y_{v'} = \frac{Y_V}{NormFy}.$$

After some time, the response of the system may deviate from the original measured values. For example, as resistors and amplifiers in the circuit of FIG. 3 heat up, their response may be slightly different. Even the tracking state values may drift from the original values. Since the main calibration and normalization procedure is designed to be done infrequently, the response of the system to the pen input may be affected by these later, slight drifts in the electronic signal. Since the hardware for the X path and the Y path is different, the amount of drift in the system response for X and Y values may differ as well, and so should be calculated separately. The flowchart of FIG. 7 shows a method for renormalizing the screen at a time after the initial normalization process to adjust for changes in the response, such as for drifts in the electronic signal.

The step in box 160 detects input data coordinates for the corners with the pen in front or tip button mode. It is easier for the user, who may not have a calibration pen 140 available, to effectively point directly at a spot on the screen by pressing a light pen against the screen, which activates the tip switch. Since the overall difference in gain of the system should not be significantly affected by the frequency, it is acceptable to compute the renormalization factor from any of the modes.

The step in box 162 retrieves the original data for the corner points in front button mode. The step in box 164 computes the overall renormalization factors for the system as follows:

and if the pen is in front button mode:

$$X_{v'} = \frac{X_V}{NormFx \cdot ReNormX} \quad \text{and} \quad Y_{v'} = \frac{Y_V}{NormFy \cdot ReNormY}.$$

2. Calibration

The non-linear properties of the correspondence between the input data coordinates ($X_v$, $Y_v$) and the screen coordinates ($X_S$, $Y_S$) may be illustrated by reference to the following FIGS. 8 and 9.

FIG. 8 shows a screen coordinate grid 170 with lines of constant pixel coordinates shown on screen 178. X readings are taken along the horizontal axis so that lines of constant $X_S$ value are vertical across the screen. Y readings are taken along the vertical axis so that lines of constant $Y_S$ value are horizontal across the screen. When a user points with a pen to point 172, the $X_S$ coordinate should be the same as when the user points to point 174, on a vertical line 176 of constant X value. The $Y_S$ coordinate would be the same for two points on a horizontal line of constant Y value.

In contrast, FIG. 9 shows a voltage grid 180 with lines of constant voltage as detected by the sensor 26 plotted across screen 178. Constant $V_x$ voltage readings are in an approximate vertical direction, and constant $V_y$ voltage readings are in an approximate horizontal direction. The voltage on the screen varies in a smooth, but non-linear fashion: $V_x$ and $V_y$ voltage lines are slightly skewed in both directions and bent near the corners of the screen, and equal increments in voltage are not equally spaced across the screen. The input data coordinates $X_v$ and $Y_v$ for the pseudo image are derived from the input voltages as described in relation to FIG. 3, so that lines of constant $X_v$ or $Y_v$ will be skewed in the same manner as the voltage grid.

Line 176 shows a line of a constant $X_S$ as shown in FIG. 4. The two points 172 and 174 along line 176 have the same $X_S$ coordinate. However, lines of constant voltage do not follow the lines of constant pen coordinate, so the input data coordinate $X_{v1}$ sensed when the pen points to point 172 will be different than the input data coordinate $X_{v2}$ sensed when the pen points to point 174. Readings for $Y_v$ input data coordinates are similarly varied along horizontal lines of constant $Y_S$.

FIG. 10 illustrates the relationship between the two sets of dimensions for the system. A portion of the screen 178 is shown in FIG. 10, with lines of constant input data coordinates as derived from the screen voltage, such as line 182 with a constant input data coordi- $$ReNormX = \frac{\left(\frac{X_{Vnew}}{X_{Vold}}\right)_{corner1} + \left(\frac{X_{Vnew}}{X_{Vold}}\right)_{corner2} + \left(\frac{X_{Vnew}}{X_{Vold}}\right)_{corner3} + \left(\frac{X_{Vnew}}{X_{Vold}}\right)_{corner4}}{4} \quad \text{and}$$

$$ReNormY = \frac{\left(\frac{Y_{Vnew}}{Y_{Vold}}\right)_{corner1} + \left(\frac{Y_{Vnew}}{Y_{Vold}}\right)_{corner2} + \left(\frac{Y_{Vnew}}{Y_{Vold}}\right)_{corner3} + \left(\frac{Y_{Vnew}}{Y_{Vold}}\right)_{corner4}}{4}$$

Then when the system senses a point ($X_v$, $Y_v$) with the pen in tracking mode, the coordinates will be normalized to:

$$X_{v'} = \frac{X_V}{ReNormX} \quad \text{and} \quad Y_{v'} = \frac{Y_V}{ReNormY};$$

nate of $X_v = -0.7215$, and lines of constant screen coordinates, such as line 184 of $X_S = 32$. Point 186 has screen coordinates of (32,84), and point 188 has screen coordinates of (35,78). However, the X input data coordinates for each of these points is the same, since they both lie on a line of constant input data coordinate $X_v = -0.7835$. From a simple sensor reading, the computer would not be able to distinguish a difference between the x coordinate reading of point 188 and the x coordinate reading of point 186.

The system of the invention compensates for the non-linear relationship between the pen input coordinates and the input data coordinate grid by a calibration procedure which calibrates the response of the system to the input data coordinate grid for multiple points with known pen coordinates. A calibration pen 140 as shown in FIG. 5 may be used to input calibration points at the tracking frequency for each light pen. For example, a system utilizing three pens must calibrate for three different tracking frequencies. The calibration pen 140 scans through each of the frequencies while being held at each calibration point.

As shown in FIG. 10, it is necessary to convert from input data coordinates $(X_v, Y_v)$ sensed by the system electronics to corresponding screen coordinates $(X_s, Y_s)$ for response by the computer system. The method of the invention for this conversion involves calibrating the response of the system for a known set of input locations. The steps for this procedure are shown in the flowchart of FIG. 11. In the step in box 200, a set of input data coordinates $(X_v, Y_v)$ corresponding to known, regular $(X_s, Y_s)$ locations is recorded. For example, the image projection subsystem may project a grid of regularly spaced calibration points upon the display screen for the user to point to with a calibration pen 140 or with each light pen of the system. The input data coordinates of each point are sequentially measured as the light pen is held at each calibration location.

In the step of box 202, a function is determined which provides a conversion from the input data coordinates to the known screen coordinates. If the system electronics were perfectly linear, converting from input data values reported by the sensor to screen coordinates corresponding to the pixel location of the pen tip would simply involve a scaling and a translation, i.e., $$X_s = a + b^*X_v$$

and $$Y_s = c + d^*Y_v,$$

where the coefficients a, b, c, and d could be computed by a simple calibration procedure in which the user would point with the pen to the known calibration points $(X_s, Y_s)$, the input data coordinates $(X_v, Y_v)$ would be observed, and values for a, b, c, and d computed by solving a linear system with two equations and two unknowns.

However, the system electronics are not linear, so a more complicated method for converting input data coordinates to screen coordinates must be used. The most obvious approach is to replace the previous equations with something more complicated, such as:

$$X_s = a + b^*X_v + c^*Y_v + d^*X_v^*Y_v$$

and $$Y_s = e + f^*X_v + g^*Y_v + h^*X_v^*Y_v,$$

or perhaps something with even higher order terms. Calibration would involve pointing the pen at places with known screen coordinates and measuring the input data coordinates, and the coefficients a, b, etc. could be computed using least squares.

This approach does not work well for two reasons. First of all, the conversion from input data coordinates to screen coordinates is not well approximated by such simple functions. Secondly, useful information is thrown away, so that if calibration reveals that $(X_s, Y_s)$ corresponds to $(X_v, Y_v)$, the above conversion procedure would not necessarily map $(X_s, Y_s)$ to $(X_v, Y_v)$, because least squares do not (in general) pass through the input points.

So instead of least squares, standard cubic spline interpolating techniques are used. In the method of the invention, a standard technique as described in Computer Methods for Mathematical Computations, by Forsythe, Malcolm, and Moler (1st ed. 1977), at pages 70–79, the disclosure of which is hereby incorporated by reference, is used to derive the spline function.

The cubic splines pass through the calibration input points, which become joints of the cubic spline approximating function. During the calibration procedure, the user points the pen at n*m points, which are equally spaced in a lattice. In the present implementation, 17×12 points regularly spaced throughout the screen are usually used.

If these points are used as the joints, then a simple equally spaced two-dimensional cubic spline function (sometimes called a tensor or bicubic spline) may be used to convert screen coordinates into input data coordinates. These splines do not throw any information away—if calibration reveals that $(X_s, Y_s)$ corresponds to $(X_v, Y_v)$, then $(X_s, Y_s)$ will be converted to exactly $(X_v, Y_v)$.

A spline function is used to convert screen coordinates to input data coordinates. During regular use of the system, however, it is necessary to go from input data coordinates $(X_v, Y_v)$ to screen coordinates $(X_s, Y_s)$—that is, given an input data coordinate from the sensor, the screen coordinates must be determined. What is needed is the inverse of the spline function. Rather than using the spline function during the actual conversion process, a look-up table is computed. This is accomplished in the step in box 204, which builds a table of input data coordinate-to-screen values using the inverse of the spline function. Table look-up was chosen because of its speed advantage. Because the conversion operation has to run about 100 times per second during on-line operation, conversion speed is an important consideration. The steps in boxes 202 and 204 may be done off-line, building a table (typically 112 by 78) that contains input data coordinate-to-screen coordinate mappings. It should be noted that even a coarse grid computation would require a significant amount of time if attempted on-line; off-line, the additional time required to do a finer grid is warranted by the increased accuracy of the system. During on-line operation the system converts from input data coordinates to screen coordinates using linear interpolation from this table.

FIG. 12 shows the steps in building the calibration table. Although calibration for only a single pen is shown and described, it should be understood that a number of pens (e.g., three) may be used simultaneously and independently. The input data coordinates for known calibration points are recorded in the step in box 210. Standard techniques for determining cubic splines are used to compute a spline function S in the step in box 212 that takes screen coordinates $(X_s, Y_s)$, and produces input data coordinates $(X_v, Y_v)$. If the screen coordinate position is one of the positions used for calibration in the step in box 210, the output is exactly the detected input data coordinate. Otherwise it is an interpolation according to the cubic spline of the detected input data coordinate.

In the step in box 214, a regular, closely-spaced mesh of input data coordinates is chosen. In the step in box 216, for each $(X_v, Y_v)$ in the mesh the spline function S is used to find an $(X_s, Y_s)$ with the property that $S[(X_s, Y_s)] = (X_v, Y_v)$. In other words, a table is created which assigns to each $(X_v, Y_v)$ a screen value $(X_s, Y_s)$. This defines a mapping from $(X_v, Y_v)$ to $(X_s, Y_s)$ which is the inverse of the spline function S. It is important to note that the input calibration points are equally spaced—if the input points were not constrained to be equally spaced, the standard algorithms for tensor splines as shown in step 212 would not be applicable. The step in box 218 writes the calibration table. The calibration table header is written with the maximum and minimum values of $X_v$ and $Y_v$ data coordinates $(X_{max}, Y_{max}, X_{min}, Y_{min})$, the number of rows (number of different X input data coordinate values numX, which range from $(X_{max}$ to $X_{min})$, and number of columns (number of different Y data coordinate values numY). Each row has a fixed $X_v$ value. The first row has $(X_s, Y_s)$ values for $(X_{min}, Y_v)$ where $Y_v$ ranges from $Y_{min}$ to $Y_{max}$.) The last row has $(X_s, Y_s)$ value for $(X_{max}, Y_v$.

Each pen in the system will have tables representing the $X_s$ and the $Y_s$ values at points on the screen. Each table for each pen is built separately. When the calibration pen is used, data for the tables for each pen are automatically separated as different frequencies are generated at each point. The table for each coordinate of each pen is about 30,000 bytes long in uncompressed form. Six tables, or three tables each with $X_s$ and $Y_s$ values for one pen, are far too much data to store on a reasonably priced expansion board with a DSP processor, and the host computer's main memory is too remote to efficiently access tables stored there. Therefore, it is desirable for the tables to be compressed to be stored on the DSP expansion board.

The compression technique according to the invention is based on storing the differences, or deltas, of successive table entries. While the following discussion describes a single table, there may be several tables compressed and stored on the expansion board, each corresponding to a light pen having a given frequency family.

Each row in the compressed table has a header, followed by a variably sized set of bit fields of packed integers. Each row of the compressed table corresponds to a row of the original table, and is structured as follows length, first, mindelta, numBits, delta[1]1, ... ,
delta[n];

where length is the total number of storage words for the row, and first is the value of the first element in the row. mindelta is a constant for the row. All the succeeding values are increments to first compensated by subtracting mindelta. This ensures that all the delta[j] values are positive, so that no additional bit is needed to represent the sign of delta[j]. numBits is the number of bits used to represent each delta[j] in the row. Each delta[j] is stored in numBits bits, packed into 24-bit storage words.

The delta entries following the header in each row are computed as follows:

delta[i]=row[i]−row[i−1]−mindelta;

so that delta[j] is the difference between adjacent row elements. The deltas are stored in bit slices of 2,3,4,6,8 or 12 bits, chosen so that they pack efficiently into the 24 bit words used by the processor. These bit slice sizes allow representation of delta values of up to 4, 8, 16, 64, 256 or 4096, respectively. The magnitude of the largest delta in the row determines the bit slice size for that row.

The table look-up during decompression may be optimized by combining the tables for x and y coordinates during compression. Each row of the compressed table contains either values of $X_s$ or $Y_s$. The $X_s$ and $Y_s$ rows are interleaved in order to optimize the computation of the row addresses during look-up. The rows are stored as follows:

$X_s$ row 0
$Y_s$ row 0
$X_s$ row 1
$Y_s$ row 1
and so on.

The flowchart of FIG. 13 describes the steps in compressing the values from the calibration table into a single table of $X_s$ and $Y_s$ rows for each pen. The step in box 220 reads the $X_{min}$, $X_{max}$, and numX values from the header of the calibration table, where $X_{min}$ is the minimum value of X in the table, $X_{max}$ is the maximum value of X in the table, and numX is the total number of X values in the table. The step in box 222 reads the $Y_{min}$, $Y_{max}$, and numY values from the calibration table. The step in box 223 computes the increment between adjacent rows and columns:

$$X_{inc} = \frac{(X_{max} - X_{min})}{numX} \text{ and } Y_{inc} = \frac{(Y_{max} - Y_{min})}{numY}.$$

The step in box 224 writes the header for the compressed table, $(X_{min}, X_{max}, X_{inc}, Y_{min}, Y_{max}, Y_{inc}, numX, numY)$.

The step in box 226 sets a counter i to 0. The step in box 228 tests for i less than numY, to see if all the rows have been completed. If there are still more rows to do, the step in box 230 resets a counter j. The step in box 232 checks if all the columns in the given row have been read. If there are still more values to read, the step in box 234 reads the jth element of the current row$_i$ into the row array arrayX[j] or array Y[j]. The step in box 236 updates counter j.

If all the values for the current row have been entered, the step in box 238 compresses the row$_i$ stored in arrayX. The step in box 240 compresses the row$_i$ of values stored in array Y. The steps of 238 and 240 are interchangeable. The step in box 242 updates counter i, and returns to the step in box 228 to see if all the rows have been compressed. If all the rows for that pen have been compressed, the compressed table is stored in memory on the expansion board in the step in box 244. During system operation, the tables are stored in a file in main memory of the computer, and downloaded to the DSP after system boot.

The flowchart of FIG. 14 shows the steps in compressing a row$_i$ as described in boxes 238 and 240 of FIG. 13. The step in box 252 finds maxdelta, or the largest difference between any two adjacent points in row$_i$. The step in box 254 finds mindelta, or the smallest difference between any two adjacent points in row$_i$. The step in box 256 writes mindelta to the row$_i$ header. The step in box 258 writes (-mindelta) in the delta[O] location. This is so that during decompression, when each element is computed by

[previous element+delta[i]−mindelta], the first element, if the delta for delta[O]=−mindelta, is

[first+delta[O]+mindelta], or simply first.

The step in box 260 determines the number of bits numBits that will be needed to represent the largest delta for the current row$_i$. The step in box 262 finds the total number of words that will be used to store this row$_i$, and the step in box 264 writes this total length to the row$_i$ header. The step in box 266 writes numBits into the row$_i$ header.

The step in box 268 packs the first delta bit field in delta[O] into the compressed row storage. The step in box 270 sets a counter j to 1, and the step in box 272 checks to see if all the values for row$_i$ have been compressed. If there are more values to compress, the step in box 274 finds the delta[j] to the next value, subtracting mindelta to ensure that the result will be a positive value. The step in 276 then packs the new delta[j] field into the compressed row$_i$. The step in box 277 updates the counter, and returns to box 272 to check to see if there are remaining values in row$_i$. If all the values in that row have been compressed, the compressed row$_i$ is returned.

The flowchart of FIG. 15 shows the steps in finding maxdelta for a row$_i$ as described in box 252 of FIG. 14. The step in box 288 sets a preliminary value of maxdelta = −1000. The step in box 290 sets a counter to 1. The step in box 292 checks to see if all the values in row$_i$ have been checked. If there are more values to check, the step in box 294 computes the delta to the next value. The step in box 296 checks to see if delta is greater than the current maxdelta. If it is, the new delta is stored as maxdelta in the step in box 298. The counter is updated in the step in box 300. When all the values in row$_i$ have been checked, the step in box 292 returns maxdelta.

The same steps in FIG. 15 used to find the maxdelta may also be used to find mindelta, as described in box 254 of FIG. 14. To use these steps, the step in box 288 sets mindelta=1000. After the delta is computed in the step in box 284, the step in box 296 checks to see if the new delta is less than the current mindelta. If so, the new delta is stored as mindelta.

The flowchart of FIG. 16 shows the steps in finding the necessary number of bits numBits to represent the delta values in a row$_i$, as described in box 260 of FIG. 14. The step in box 310 sets a counter to 0. The step in 312 finds the difference between maxdelta and mindelta for row$_i$, and stores it in a temporary storage n. The step in box 314 checks to see if n is greater than zero. If it is, the step in box 316 divides n in half and discards the non-integer portion of the result. The counter is updated in the step in box 318. When the values of n is not greater than zero, the value of the counter is returned specifying the number of bits numBits needed to represent the deltas in the row$_i$.

The flowchart of FIG. 17 shows the steps in packing a bit field into the compressed table as described in box 268 and box 276 of FIG. 14. The step in box 320 allocates temporary storage numBytes to hold the complete row of bit fields. The object of the packing step is to put the bit field for row$_i$ into the proper place in the numBytes of temporary storage. The number of bytes of temporary storage is computed as:

numBytes=(numBits*(numY+1)+7)/8.

The step in box 322 sets a counter b=0. The step in box 321 gets the value of the bit field:

value=delta[i].

The step in box 324 checks to see if all the bits have been packed. If there are remaining bits, the step in box 326 finds the bit position of bit b as:

position=j*numBits+b.

The step in box 328 converts the bit position into the byte position in the temporary storage:

byteIndex=position/8.

The step in box 330 finds the current bit in the field to operate on, bitOffset, by shifting the bits in value. byteIndex and bitOffset together indicate which bit in the temporary storage should be set to the same value as bit b of the current bit field. The bitOffset is complemented by 7 so that, for example, bit 0 of a field is put into bit 7 of a byte, which is the most significant byte. This makes the bit fields read correctly when scanned from left to right, even if they cross byte boundaries. Finally the value bitval of the current bit b is found in the step in box 331. The step in box 332 checks whether the current bit bitval is 1; if it is, the step in box 334 sets the current bit in the packed array. If it is not, the step in box 336 clears the current bit value in the array. The step in box 338 updates the counter value, and returns to box 324 to check for all bits.

During normal operation, it is possible to find a particular table row by putting the address of the first row into an address register, and then incrementing by the length value in each row header until the proper row is found. Placing the length field first in the row header makes this easier.

The computation of the $X_s$ coordinate uses four table elements, table[i,j], table[i+1,j], table[i,j+1], and table[i+1,j+1]. The $Y_s$ coordinate uses four similar table elements, for a total of eight look-ups. It is easy to compute table [i,j] and table[i,j+1] together because table[i,j] is the previous value computed when computing table [i,j+1]. Since the rows are interleaved, $X_s$ row 0
$Y_s$ row 0
$X_s$ row 1
$Y_s$ row 1 and so on, the row addresses may be used to find both $X_s$ and $Y_s$ values. The first row address I is saved and used to step to $Y_s$ row I, then $X_s$ row I+1, and finally to $Y_s$ row I+1.

FIG. 18 shows the steps in the table look-up procedure for the optimized compressed table. The step in box 340 computes the table indices I and J by dividing the normalized input data coordinates ($X_v'$, $Y_v'$) by the increment of the table, since each table line represents a line of constant $X_v$ or $Y_v$ input data coordinates, and there is a fixed increment between each line. O and V are the remainders from dividing the $X_v'$ and $Y_v'$ normalized data coordinates, respectively, to get I and J, respectively. The step in box 342 computes the address of $X_s$ row I. The step in box 344 computes the J and J+1 elements of $X_s$ row I. The step in box 346 increments the row address so it is the address of $Y_s$ row I. The step in box 348 computes the J and J+1 elements of $Y_s$ row I. The step in box 350 increments the row address so it is the address of $X_s$ row I+1. The step in box 352 computes the J and J+1 elements of $X_s$ row I+1. The step in box 354 increments the row address so that it is now the address of $Y_s$ row I+1. The step in box 356 computes the J and J+1 elements of $Y_s$ row I+1. The step in box 358 uses the remainders O and V to compute the screen coordinates ($X_s$, $Y_s$) from these eight elements using weighted averages. These screen coordinates may be used to locate a position location indicator.

3. Output Smoothing

The flowchart of FIG. 19 shows the steps required to smooth "jitter" in the detected pen location, such as typically caused by residual noise in the electronics. Jitter smoothing is essentially a software filtering. The purpose of smoothing is to adjust the motion of a response based on the magnitude of the distance that the input has changed. The smoothing Function helps lessen the effects of very small movements such as might be caused by signal noise in the electronic circuitry or by unintentional slight movement in the hand of a user holding a pen, and helps to keep small intentional movements from looking "jerky." For small motions more filtering is applied to reduce jitter, and for large motions little or no filtering is applied so the pen remains responsive to large movements. A mapping for such a smoothing function can be found in Table 1. Although the following description describes smoothing for the x-coordinate change, it is understood that both the x and y coordinate position changes may be similarly smoothed, independently or in combination. The step in box 390 takes a new screen coordinate $X_s$. In the step in box 392, the $last_x$ position is retrieved from memory. The step in box 394 computes the magnitude of the change in position $delta_x$ from $last_x$ to $X_s$. The step in box 396 checks to see if $delta_x$ is smaller than the table size. If $delta_x$ is larger than the table, then the smoothdelta is given the same value $delta_x$ in the step in box 400. If $delta_x$ is smaller than the table size, the the step in box 389 finds the $smoothdelta_x$ value corresponding to that $delta_x$ from a Pen Position Smoothing Map, as shown in Table 1. The step in box 402 checks if the $X_s$ value is greater than the $last_x$ position. If it is, the next position x is computed in the step in box 404 to be $x = last_x + smoothdelta_x$. If $X_s$ is less than $last_x$, the step in box 406 finds $x = last_x - smoothdelta_x x$. The step in box 408 stores this new value as $last_x$ in anticipation of a further change in position. The smoothed display coordinate x for the position location indicator is returned to the computer for response in the step in box 410. A cursor at the $last_x$ position at the start of the computation will be moved to the x position in response to tracking, for example.

Note that $delta_x$ is determined by the $last_x$ reported value, and the new value $new_x$ from the input system. Errors introduced by smoothing therefore do not compound and slow the response of the system.

The values of the Pen Position Smoothing Map according to the invention, as shown in Table 1, are derived From an exponential function of delta, in this case an approximation of an exponential function:

next = last + delta*F(delta);

or in this case $x = last_x + delta_x*(1 - e^{\alpha delta_x})$.

In the present invention, $e - 0.02delta$ is used.

This function approximates the output that would be seen from an ordinary lowpass filter. However, a filter implemented in hardware might cause the response to appear sluggish. Likewise, conventional methods of smoothing using weighted averages, or exponential smoothing as a function of time, might also contribute to a sluggish response. The smoothdelta values based on the above function have change thresholds at 9 and 18 pixels. Values of smoothdelta are two pixels behind the actual delta for changes of from 1 to 8 pixels, and one behind for 9 to 17 pixel changes. If the input is 18 or more pixels different, smoothdelta matches delta.

Table 2 shows an example of the effects of the smoothing operation on the x coordinate of a position location indicator tracking a moving pen. Although only the x coordinate is described in the following example, it is clear that the smoothing operation may be performed for both the x and y coordinates. The first move, from position 0 to position 2 generates a $delta_x$ of 2, and $smoothdelta_x$ can be seen from the map to be 1, so the x position is 1. If the two pixel variation were caused by an unsteady hand, for example, the position location indicator would not be significantly affected. For the next move to position 4, $delta_x = 3$, and the smoothed x position will be [$last_x + smoothdelta_x$], or [1+1]=2. If the pen should go to 7, the x position is 5. It can be seen from

TABLE 1.0

| Pen Position Smoothing Map | |
|---|---|
| Actual delta | smoothdelta |
| 0 | 0 |
| 1 | 0 |
| 2 | 1 |
| 3 | 1 |
| 4 | 2 |
| 5 | 3 |
| 6 | 4 |
| 7 | 5 |
| 8 | 6 |
| 9 | 8 |
| 10 | 9 |
| 11 | 10 |
| 12 | 11 |
| 13 | 12 |
| 14 | 13 |
| 15 | 14 |
| 16 | 15 |
| 17 | 16 |
| 18 | 18 |

TABLE 2

| Pen Movement Smoothing Results Results of Jitter Smoothing | |
|---|---|
| Input $X_s$ | Output x |
| 0 | 0 |
| 2 | 1 |
| 4 | 2 |
| 7 | 5 |

TABLE 2-continued

Pen Movement Smoothing Results
Results of Jitter Smoothing

| Input $X_s$ | Output x |
|---|---|
| 8 | 6 |
| 8 | 7 |
| 8 | 7 |
| 7 | 7 |
| 6 | 7 |
| 4 | 6 |
| 4 | 5 |
| 0 | 2 |
| 0 | 1 |
| 25 | 25 |
| 35 | 34 |
| ... | ... | this example that the position location indicator does not always match the exact location of the input. When the input stays motionless, for example, when it sits at pixel 8, the smoothed output position x gets to pixel 7, but then delta$_x$ remains at 1 which corresponds to a smoothdelta$_x$ of 0, resulting in no movement. A one pixel difference between the input point and the position location indicator will not be distinguishable to the user, although a sluggish or jittery pen movement probably would be.

C. Source Code Appendix

Appendix A is assembly source code implementing some of the features described above. Appendix B is C source code implementing some of the features described above. The source code of Appendix A, when executed on a MC56000 Digital Signal Processor, performs the general method for correction of the position location indicator for a large area display system, as described above. The source code of Appendix B, when executed on a SparcStation-2 host computer, performs general techniques contributing to correction of the position location indicator for a large area display system, as described above. The code in Appendix A and Appendix B generally follow the implementation described above. Nonetheless, the code may differ from the above description in various ways. For example, code may be divided into procedures or routines differently than described above.

The following is included in Appendix A:

The function serial.patent.asm executes on the DSP and converts input data coordinates ($X_v$, $Y_v$) to screen coordinates ($X_s$, $Y_s$) using the compressed calibration table, as described above. serial.patent.asm also performs the normalization operations, and jitter smoothing operation, as described above.

The following are included in Appendix B:

The function ncal.all.c takes input data coordinates and writes them to a data file to be input to the table.c program. ncal.all.c is used to enter the input data coordinates for the calibration points. The function npen.c includes access routines for the system that are used by ncal.all.c. npen.h and npenFiles.h contain definitions and file names used by ncal.all.c.

The function table.c reads the input data coordinates generated by ncal.all.c and computes a mapping to screen coordinates. The result is written to a calibration table in a file to be read by delta.c.

The function delta.c reads the calibration table generated by the table program, compresses it, and writes a compressed calibration table to a file that will be downloaded to the DSP device at run time.

The function npensetup.c is a setup program used to download programs and the compressed calibration tables onto the DSP device. serial.c contains utility routines to control the DSP via a serial line interface that are used by npensetup.c. serial.h contains definitions and file names used by npensetup.c.

D. Miscellaneous

The present invention computes the calibration table infrequently, at the beginning of operation of the system, and stores the calibration information in compressed tables. Later changes in the system electronics are accounted for by normalization procedures. In another embodiment of the invention, the compressed calibration table or portions of the table could be revised at a later time by entering new calibration data and adjusting the spline function, and making corrections to the table accordingly.

Another contemplated modification to the present invention includes adjusting the calibration pen to produce the average frequency of the band for each pen, so that the calibration and compression tables are built for the average frequency. As seen in FIG. 16, none of the current function frequencies fall directly at the average frequency. It is possible that the calibration might be done at the average frequency rather than the fringe frequencies, and a multiplicative factor determined by a method similar to that described in relation to FIG. 6 be used to differentiate among different function frequency responses.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

```
; serial.patent.asm --
;       Serial line version of the DSP pen conversion program.
;       This program takes sensor values and converts them to X, Y coordinates.
;
;       This version includes stroke smoothing and button state filtering.
;
;       This version includes an improved input handler that can accept
;       commands and parse them as Wacom cmds.
;
;       This has a 10 byte raw output format. 5 2-byte DSP words.
;
;       There are basically two threads of control here. The highest
;       priority thread handles the serial line via its Input, Output, and
;       Idle interrupts. The lower priority thread handles interrupts
;       from the Xilinx and does the conversion. Because Output is so slow
;       it will be overlapped with the conversion thread. The Output
;       interrupt handler uses its own private registers plus it
```

```
;           save/restores registers that the conversion routine might be using.
;
;           Input processing is bi-modal.  In bootstrap mode, bytes are read and
;           packed into memory.  When a burst of input completes, as indicated
;           by the Idle interupt, those packed DSP words are executed.  In
;           conversion mode, input characters are stored in unpacked format
;           and processed at each conversion interrupt.
;
            opt so
            page    138,52                          ; for use with : enscript -f Courier9 -Plw1 -r
;
;******* DSP system definitions ************************************************
;
; Interrupt table addresses.  The DSP branches through these points
; upon various kinds of interrupts.
;
ResetIntr       equ     p:$0            ; DSP reset
IrqaIntr        equ     p:$8            ; Interrupt from Xilinx (pen electronics)
SciRecIntr      equ     p:$14           ; Serial line recieve
SciRecXIntr     equ     p:$16           ; Serial line recieve w/ error
SciXmtIntr      equ     p:$18           ; Serial line transmit ready
SciIdleIntr     equ     p:$1a           ; Serial line idle
IllIntr         equ     p:$3e           ; Illegal instruction M_IPR    EQU    x:$FFFF                 ; Interrupt Priority Register
M_BCR    EQU    x:$FFFE                 ; Port A Bus Control Register
M_PCC    EQU    x:$FFE1                 ; Port C Control Register ; Serial line interface control registers
M_SRXL   EQU    x:$FFF4                 ; SCI Receive Data Register (low)
M_SRXM   EQU    x:$FFF5                 ; SCI Receive Data Register (middle)
M_SRXH   EQU    x:$FFF6                 ; SCI Receive Data Register (high)
M_STXL   EQU    x:$FFF4                 ; SCI Transmit Data Register (low)
M_STXM   EQU    x:$FFF5                 ; SCI Transmit Data Register (middle)
M_STXH   EQU    x:$FFF6                 ; SCI Transmit Data Register (high)
M_STXA   EQU    x:$FFF3                 ; SCI Transmit Data Address Register
M_SCR    EQU    x:$FFF0                 ; SCI Control Register
M_SSR    EQU    x:$FFF1                 ; SCI Status Register
M_SCCR   EQU    x:$FFF2                 ; SCI Clock Control Register ;********** *** Command Processing *********************************
; Single character commands BOOT_CMD        EQU     $21     ; '!' => into bootstrapping mode
WACOM_CMD       EQU     $24     ; '$' => Wacom reset to stream mode
RAW_MODE_CMD    EQU     $40     ; '@' => Raw mode ; Two character commands (Mainly Wacom-II)

VERSION_CMD     EQU     $7E23   ; '~#' => Version

STREAM_CMD      EQU     $5352   ; 'SR' => stream mode

FORMAT_CMD      EQU     $4153   ; 'ASn' => Change format
ALLOW_CMD       EQU     $414C   ; 'AL' => allow 0, all, or N points
RESET_CMD       EQU     $5245   ; 'RE' => Wacom reset
STOP_CMD        EQU     $5350   ; 'SP' => stop sending points
START_CMD       EQU     $5354   ; 'ST' => start sending points
REQUEST_CMD     EQU     $5251   ; 'RQn' => Request n points ZERO            EQU     $30     ; '0'
ONE             EQU     $31     ; '1'
TWO             EQU     $32     ; '2'

;******************** 7-byte Output Block Format ************************
; Sync and valid bit for 1st byte of output block
;       The Sync, InRage, and StandardStylus Wacom bits are set
SYNC            EQU     $E0

; Output format for 7th byte of output block that has button state

TRACKING        EQU     $00
LEFT_BUT        EQU     $21     ; The 0x20 bit is "switch was pressed"
MID_BUT         EQU     $22
RIGHT_BUT       EQU     $24

LOW_BUT         EQU     $30

;******************** REGISTER ASSIGNMENTS ***************************

;       FLAG WORD DEFINITIONS
;
; n0 is a flag word for the conversion program.  Bit test operations
; are used to set and detect these flags.
```

```
IVALID    EQU    0      ; input valid for Idle interrupt
ACTIVE    EQU    1      ;Xilinx interrupt active flag
CMDPND    EQU    2      ; command pending flag
OUTPUT    EQU    3      ; output active flag
CVT_XY    EQU    4      ; Convert to X, Y coordinates flag
NO_PEN    EQU    5      ; Pen inactive flag
NEWBUT    EQU    6      ; Button state changing flag
IDLE      EQU    7      ; Idle state flag
WACOM     EQU    8      ; Character Wacom output flag
LASTCHAR  EQU    9      ; Last of 7 characters to output
FIXUPR1   EQU    10     ; Need to reset r1 input pointer
ECHO      EQU    11     ; Echo enable during command processing
TWOBYTE   EQU    12     ; Output only low and mid bytes of DSP word
DIAG      EQU    13     ; Diagnostics flag - forces three-byte output ;      Input handling by serial.boot.asm
;      While conversion is active, the serial input
;      handler only touches flags in n0, plus it dumps the character to n6
;      If conversion is not active, the input handler uses A, X0, r0, r1
;               A - input packing register
;               r0 - packing register pointer
;               n6 - Dumping register for bad characters
;               r1 - address of packed characters to input
;               X0 - data transfer to/from memory ;      Output will always be active during conversion.  Currently this uses:
;      r5 - pointer to DSP word to output next
;      r6 - unpacking register pointing to STX{L,M,H}
;      X0 - data transfer - this is save/resotred using y:SAVE_X0
;      n0 - flags to determine output length ;      Conversion uses:
;      Both accumulators and all X and Y registers
;      r0 - result of Div3, tmp for incrementing, normalizing
;      r7,n7 - Address pointer and offset inside Table
;      r2,n2 - Slice/Numbits map address
;
;      Command processing is done before conversion.  It uses the
;      X registers and A accmulator.
;      r4 as pointer into INBUF, and r3 and pointer into CMDBUF
;
;***************** MEMORY MAP ******************************
;
; INBUF is the character input buffer that lives in P space for bootstrapping
; This buffer is known to run up to $100 so a btst #8 can detect the limit.
INBUF    EQU    $00C0
INB_LIM  EQU    $00FF ; Register save areas, in Y space SAVE_A0  EQU    $00A0
SAVE_A1  EQU    $00A1
SAVE_A2  EQU    $00A2
SAVE_X0  EQU    $00A3

; Well known entry points.  These locations are jumped to via the bootstrapper
IDLEJSR  EQU $100        ; Into idle mode, IRQA but no output.
START    EQU $110        ; Into raw output mode
CONVERT  EQU $120        ; Into X, Y output mode
RESET    EQU $130        ; Reset into bootstrap mode ; Xilinx -
;      The Xilinx puts raw sensor values into Y memory at RAW_IN
;      It has a control register at XX_REG in X memory that controls
;      the IRQA interrupt.  After reset this location must be written
;      one time to enable interrupts. (Another write will toggle the
;      state back to not interrupting.)  After an IRQA interrupt, the
;      register must be written again to renable the interrupt.

RAW_IN   EQU    $7ff0           ; Y Memory updated by Xilinx part
XX_REG   EQU    $ffc0           ; Toggles interrupt ability ; ***** Working Variables inside Convert
;
XVOLTS   EQU    $0000   ; Result of xminus/xplus
YVOLTS   EQU    $0001   ; Result of yminux/yplus
EYE      EQU    $0002   ; I index into table
JAY      EQU    $0003   ; J index into table
OH       EQU    $0004   ; o, remainder from computing I
VEE      EQU    $0005   ; v, remainder from computing J
SLICES   EQU    $0006   ; Number of bit slices per DSP word
NUMBITS  EQU    $0007   ; Number of bits per slice
MINDEL   EQU    $0008   ; Mindelta, used in delta computation
```

```
ARE         EQU     $0009   ; r = (1-v)*table[i][j] + v*table[i][j+1]
ESS         EQU     $000A   ; s = (1-v)*table[i+1][j] + v*table[i+1][j+1]

; ***** Parameters for the Convert procedure
; Inputs
NORM_X      EQU     $000C   ; The current norm. factor depending on button state
NORM_Y      EQU     $000D   ; ditto
ROW_1       EQU     $000F   ; Pointer to current row 1
RAW_DATA    EQU     $0010   ; Beginning of raw sample ; Words $0010 through 001F are reserved for raw sample
; Really only 8 words with single pen, but 16 words with multipen.

; ***** Output Buffer Locations. Addressing tricks are used to detect
; end of buffer, so these values are important. OutputChar increments
; its address pointer until bit #3 flicks on, meaning the address has
; hit something that ends in 0x8

LONG_OUT    EQU     $0020   ; Increments to $28, then bit #3 turns on
RAW_OUT     EQU     $0023   ; Increments to $28 to output five words
NUM_RAW     EQU     5
SHORT_OUT   EQU     $0024   ; Increments to $28 to output four words
CVT_OUT1    EQU     $0026   ; Increments to $28 to output two words
CVT_OUT2    EQU     $0027   ; Second output word
CVT_LAST    EQU     $0028   ; Output word for odd char (7th)

XPLUS       EQU     $0029   ; These must be continuous and match the format of
XMINUS      EQU     $002A   ; memory buffer written by the Xilinx
YPLUS       EQU     $002B
YMINUS      EQU     $002C
THRESH      EQU     $002D   ; Threshold voltage for determining button state ; Table for conversion from NUMBITS to SLICES
; The table is downloaded by mpen_setup or npensetup
; This must match MPEN_SLICE_ADDR from comptable.h
SLICE       EQU     $0030
SL_SIZE     EQU     13

; Button state detection. 4 baseline voltages are stored, along with
; four (historical) bit patterns that identify each state.
; Each bit of the A/D is about 1.2 millivolts. The different button
; states have voltages that differ by 29 or 28 millivolts.
;
; The layout of the BITS and V are related. The different voltages
; are stepped through in a loop. Upon a match, the loop counter (LC) is
; used as an index into the BITS array to get the identifying bit pattern.
; Because the LC counts down, the ordering of the two arrays is reflected.

BITS_BASE       EQU     $0050   ; BITS_BASE plus LC indexes correct pattern
LEFT_BITS       EQU     $0051   ; Storage for state bits
RIGHT_BITS      EQU     $0052
MIDDLE_BITS     EQU     $0053
TRACKING_BITS   EQU     $0054

TRACKING_V      EQU     $0055   ; Baseline button voltage for tracking state
MIDDLE_V        EQU     $0056
RIGHT_V         EQU     $0057
LEFT_V          EQU     $0058

TOLERANCE       EQU     5       ; +/- range around baselines, about 6 millivolts
LOW_VOLTS       EQU     $100

; Current answer, outputs from Convert procedure
BUTTONS  EQU    $0059   ; Button state bits
XVALUE   EQU    $005A   ; X pixel value
YVALUE   EQU    $005B   ; Y pixel value ; Previous values for smoothing
LAST_X   EQU    $005C
LAST_Y   EQU    $005D
LAST_BUT EQU    $005E ; Buffer for version string. The start of the string
; is between VERSION and VERS_END, and the start address is
; stored in VRS_ADDR_PTR. The string is lined up so it
; always ends at VERS_END

VRS_ADDR_PTR EQU $005F
VERSION EQU     $0060
VERS_END EQU    $0067

; DEBUG TEMP
DEBUG_1 EQU     $006A
```

```
; Table for jitter smoothing
; This must match MPEN_JITTER_ADDR from comptable.h
JITTER   EQU      $0070
JT_SIZE  EQU      19

; ***** Command Copy buffer.  The command is copied from P to Y space.
; In the worst case a malformed command could range up to $0100
CMDBUF   EQU      $00B0
CMDEND   EQU      $0100

; ***** Stay away from $100 -> $1FF because sin and mulaw tables are stored
; in proms there (depends on setting of OMR).

; ***** Base Addresses (because there could be three tables)

;
; ***** Table header
TABLE    EQU      $200     ; Location of table header
X_MIN    EQU      TABLE    ; minX fraction (23 bits), plus sign bit, scaled by 1/2
X_MAX    EQU      TABLE+1  ; maxX fraction and sign bit
X_INC    EQU      TABLE+2  ; incX fraction
Y_MIN    EQU      TABLE+3  ; minY fraction (23 bits), plus sign bit, scaled by 1/2
Y_MAX    EQU      TABLE+4  ; maxY fraction and sign bit
Y_INC    EQU      TABLE+5  ; incY fraction
X_NUM    EQU      TABLE+6  ; numX
Y_NUM    EQU      TABLE+7  ; numY
; ***** Normalization factors (offsets from TABLE)
G_NRM_X  EQU      TABLE+8  ; genNormX as a DSP fraction, scaled by 1/2
G_NRM_Y  EQU      TABLE+9  ; genNormY
L_NRM_X  EQU      TABLE+10 ; leftNormX
L_NRM_Y  EQU      TABLE+11 ; leftNormY
M_NRM_X  EQU      TABLE+12 ; middleNormX
M_NRM_Y  EQU      TABLE+13 ; middleNormY
R_NRM_X  EQU      TABLE+14 ; rightNormX
R_NRM_Y  EQU      TABLE+15 ; rightNormY

;************* INTERRUPT VECTORS **************** org      p:ResetIntr
         jmp      <Init              ; Hardware reset vectors here org      p:SciRecIntr       ; Recieve from Serial Interface
         jsr      <InputChar org      p:SciRecXIntr      ; Recieve with error
         jsr      <InputBadChar org      p:SciIdleIntr      ; Idle interrupt, end of input burst
         jsr      <Idle org      p:SciXmtIntr       ; Transmit on Serial Interface
         jsr      <OutputChar org      p:IrqaIntr
         jsr      <PenInput          ; Service interrupt from Xilinx org      p:IllIntr
         jsr      Illegal            ; Recover from illegal instructions ;****************** Bootstrap Initialization ******************
Init
         movec    #$4,OMR             ; ROMS disabled, normal expanded mode
         movep    #>$0000,x:M_BCR    ; no wait state for SRAM, 0 for IO
         movep    #>$C000,x:M_IPR    ; Serial interface at priority 2

;        Initialize the serial line interface
         movep    #$0F02,x:M_SCR     ; Enable RX, Idle interrupts
                                     ; Enable transmitter, receiver
                                     ; point to point (not multidrop)
                                     ; LSB first
                                     ; 10-bit asynchronous (1 stop, no parity)
         movep    #$002B,x:M_SCCR    ; Load clock register for 9600 baud,
                                     ; NOTE: this value is for the 27 MHz part.
         movep    #>$03,x:M_PCC      ; Give TXD and RXD pins to the SCI interface ; Initialize packing registers for character string reception
Reset
         move     #M_SRXL,r0         ; Initialize pack register to low byte
         clr      A                  ; A is used to accumulate characters.
         move     #INBUF,r1          ; r1 is address of input string
         move     #0,n0              ; Clear all flags move     #>$00,sr           ; permit interrupts
```

```
spin    nop
        jmp     <spin           ; spin awaiting an interrupt, never rti ;**************** Illegal instruction recovery **************
;       Transmit some information on the serial line, then reset ourselves
Illegal
        movec   ssh,X0          ; Read PC from system stack (decrements sp)
        ; Dump flag and bad PC
_f      jclr    #1,x:M_SSR,_f   ; Wait for TRDE to go high (to one)
        movep   #$21,x:M_STXL   ; Transmit ! to signal problem
_g      jclr    #1,x:M_SSR,_g   ; Wait for TRDE
        movep   X0,x:M_STXM     ; high order PC bits
_h      jclr    #1,x:M_SSR,_h   ; Wait for TRDE
        movep   X0,x:M_STXL     ; low PC bits
_i      jclr    #1,x:M_SSR,_i   ; Wait for TRDE
        movep   #$2A,x:M_STXH   ; Transmit * to flush serial line before reset _k      jclr    #0,x:M_SSR,_k   ; Wait for transmitter to empty all the way
                                ; before we
        reset                   ; Reset peripherals and interrupt priorities jmp     <Init           ; Re-initialize ;       Move program up past input buffer
        org     p:IDLEJSR ;*************** Well Know JSR targets ******************
; These are called indirectly via the bootstrap monitor
; and bring the device into a particular state.

;*** Start IRQA interrupt but no output
EnableIdle
        movep   #>$C006,x:M_IPR ; Serial priority 2, IRQ_A priority 1, neg edge
        movep   #$ffffff,y:XX_REG ; Write Xilinx Enable register
        bset    #ACTIVE,n0      ; Xilinx Interrupts Active
        bclr    #CVT_XY,n0      ; Do not do X, Y conversion
        bset    #IDLE,n0        ; Set idle flag
        bset    #ECHO,n0        ; Enable echoing
        move    #INBUF,r4       ; Command input pointer
        bset    #FIXUPR1,n0     ; Flag input reset
_x5     jclr    #1,x:M_SSR,_x5  ; Wait for TRDE to go high (to one)
        movep   #$3C,x:M_STXL   ; Transmit '<' to ACK state change
        rts ;*** START raw output and IRQA interrupt
        org     p:START         ; Just past INBUF limit
EnableIrqa
        movep   #>$C006,x:M_IPR ; Serial priority 2, IRQ_A priority 1, neg edge
        movep   #$ffffff,y:XX_REG ; Write Xilinx Enable register
        bset    #ACTIVE,n0      ; Xilinx Interrupts Active
        bclr    #CVT_XY,n0      ; Clear X, Y conversion flag
        bclr    #IDLE,n0        ; Clear idle flag => raw output
        bclr    #ECHO,n0
        move    #INBUF,r4       ; Command input pointer
        bset    #FIXUPR1,n0     ; Flag input reset
_x4     jclr    #1,x:M_SSR,_x4  ; Wait for TRDE to go high (to one)
        movep   #$3D,x:M_STXL   ; Transmit '=' to ACK state change
        rts ;*** CONVERT X Y values and start IRQA interrupt
        org     p:CONVERT
EnableConvert
        movep   #>$C006,x:M_IPR ; Serial priority 2, IRQ_A priority 1, neg edge
        movep   #$ffffff,y:XX_REG ; Write Xilinx Enable register
        bset    #ACTIVE,n0      ; Xilinx Interrupts Active
        bset    #CVT_XY,n0      ; Do X, Y conversion
        bclr    #IDLE,n0        ; Clear idle flag
        bclr    #ECHO,n0
        move    #INBUF,r4       ; Command input pointer
        bset    #FIXUPR1,n0     ; Flag input reset
_x3     jclr    #1,x:M_SSR,_x3  ; Wait for TRDE to go high (to one)
        movep   #$3E,x:M_STXL   ; Transmit '>' to ACK state change
        rts ;*** Stop IRQA interrupt and all output. Return to bootstrapping mode
        org     p:RESET
ResetInput
        bclr    #ACTIVE,n0      ; Clear Convert Active
        bclr    #IVALID,n0      ; Clear Input Valid
        bclr    #IDLE,n0        ; Clear idle flag
        bclr    #ECHO,n0        ; Clear echoing flag
        movep   #>$C000,x:M_IPR ; Disable IRQ_A
        bset    #FIXUPR1,n0     ; Flag that input pointer needs resetting
        move    #INBUF,r4       ; Command input pointer
```

```
_x2         jclr    #1,x:M_SSR,_x2  ; Wait for TRDE to go high (to one)
            movep   #$3F,x:M_STXL   ; Transmit '?' to NACK
            rti                     ; Yes, return from interrupt ;*************** Serial Line subroutines ******************

; This input routine will pack three characters into a DSP word.
; This uses a trick based on the address of the three receive registers,
; which are FFF4 (low), FFF5 (mid), FFF6 (high). The JSET instruction
; tests bit #1 (counting from zero), and this only jumps when
; r0 is FFF6.

InputChar
            jset    #ACTIVE,n0,Unpacked   ; Conversion active => cmd processing bset    #IVALID,n0      ; Flag input as active
            jclr    #FIXUPR1,n0,_a  ; See if r1 needs resetting
            move    #INBUF,r1
            move    #M_SRXL,r0      ; Reset packing pointer
            clr     A
            bclr    #FIXUPR1,n0
_a
            move    x:(r0),X0       ; Fetch char from SRX{L,M,H}
            or      X0,A            ; Pack it into the accumulator
            jset    #1,r0,Wrapit    ; if r0 == FFF6 then bit #1 is set
            lua     (r0)+,r0        ; otherwise, just increment r0 to next SRX
            rti
Wrapit      move    A1,p:(r1)+      ; Save packed characters, "A1" doesn't normalize
            move    #M_SRXL,r0      ; Reset packing pointer
            clr     A jclr    #8,r1,R1OK      ; Guard against runaway input, r1 >= $100
            move    #INBUF,r1       ; Reset circularly
_b          jclr    #1,x:M_SSR,_b   ; Wait for TRDE to go high (to one)
            movep   #$3F,x:M_STXL   ; Transmit '?' to NACK
R1OK
            rti ; Here we just store characters into memory unpacked, one char
            ; per DSP word. These are interpreted later by DoCommand
Unpacked
            move    A0,y:SAVE_A0
            move    A1,y:SAVE_A1
            move    A2,y:SAVE_A2
            move    X0,y:SAVE_X0 bclr    #IVALID,n0      ; Clear input active flag to fool Idle
            jclr    #FIXUPR1,n0,_c  ; See if mode change demands pointer fiddling
            move    #INBUF,r1
            bclr    #FIXUPR1,n0
_c
            movep   x:M_SRXL,X0     ; Read character to clear interrupt
            move    X0,p:(r1)+      ; Save unpacked character in INBUF
            move    #>$d,A          ; Carriage return delimiter
            cmp     X1,A            ; See if we got the delimiter
            jne     NeedMore
            bset    #CMDPND,n0      ; Set flag that means command is pending
NeedMore
            jclr    #8,r1,ok2       ; Guard against runaway input, r1 >= $100
            move    #INBUF,r1       ; Reset circularly
ok2
            jclr    #ECHO,n0,noack  ; If transmitting, skip ack
_d          jclr    #1,x:M_SSR,_d   ; Wait for TRDE to go high (to one)
            movep   X0,x:M_STXL     ; Echo character to ack
noack
            move    y:SAVE_A1,A1
            move    y:SAVE_A2,A2
            move    y:SAVE_A0,A0
            move    y:SAVE_X0,X0
            rti ; A break on the serial line causes this interrupt. We treat it as
; a reset so the host can regain control of us.

InputBadChar
            movep   x:M_SSR,n5      ; Read status to clear error
            movep   x:M_SRXL,n5     ; Clear receive buffer
            movep   #$21,x:M_STXL   ; Transmit ! to signal problem
_ibc        jclr    #0,x:M_SSR,_ibc ; Wait for transmitter to empty all the way
                                    ; before we
            reset                   ; Reset peripherals and interrupt priorities jmp     Init            ; Start things over
```

```
; Idle interrupts on the serial line.  This interrupt is generated after
; each burst of characters from the host.  It appears that a single
; write system call will reliably generate a continuous burst, so
; we are going to use this feature to detect end-of-command.

; In this bootstrap version we will just go for it and execute the
; downloaded instructions.  The only trick here is to place an rts at
; the end of the sequence so we can jump to it, and to execute the
; bootstrap instructions at a low priority so we can be interrupted
; if someone downloads an infinite loop.

Idle
        jclr    #IVALID,n0,Skip ; Check input-active flag against zero move    A1,p:(r1)+      ; Save last characters, "A1" doesn't normalize
        move    #>SC,A1         ; "RTS" instruction
        move    A1,p:(r1)       ; Store it at the end of the sequence
        move    #INBUF,r1       ; Reset input pointer to start of sequence
        nop                     ; pipeline delay to update r1
        bclr    #9,sr           ; Change interrupt mask from S3 to S2
        jsr     (r1)            ; Go for it, with priority lowered
        bset    #8,sr           ; Raise interrupt mask back to S3
        bset    #FIXUPR1,n0     ; Reset input pointer for next command _e      jclr    #1,x:M_SSR,_e   ; Wait for TRDE to go high (to one)
        movep   #$a,x:M_STXL    ; Transmit newline to ACK bclr    #IVALID,n0
Skip    rti ; This routine normally outputs three bytes per DSP word: low, mid, high.
; Instead of using up an address register as a limit pointer,
; the current address is tested with a bit test operator and
; output stops on addresses that end in 0x8.  This limits output
; to 24 byte bursts...
; if #WACOM,n0 is set, then one extra byte (e.g., the 7th) byte is transferred
; if #TWOBYTE,n0 is set, then two bytes per DSP word are output: mid and low.

OutputChar
        move    X0,y:SAVE_X0    ; Save X0
        move    y:(r6),X0       ; Fetch current DSP word
        move    X0,x:(r6)       ; Extract a byte into the transmit register
        move    y:SAVE_X0,X0    ; Restore X0
        jclr    #TWOBYTE,n0,check3
        jset    #0,r6,WrapOut   ; In two-byte mode, reset after r6 == FFF5
check3  jset    #1,r6,WrapOut   ; In three-byte mode, reset after r6 == FFF4
        lua     (r6)+,r6        ; increment r6 to next STX register
        jset    #LASTCHAR,n0,EndOut2    ; Just did 7th char?
        rti
WrapOut move    #M_STXL,r6      ; Reset STX pointer to Low byte (FFF4)
        lua     (r5)+,r5        ; Update output pointer
        nop                     ; pipeline delay
        jset    #3,r5,EndOut1   ; if r5 == xxx8 then stop output
        rti                     ; Return, leaving output active
EndOut1
        jclr    #WACOM,n0,EndOut2   ; In Wacom, 7 char output mode?
        bset    #LASTCHAR,n0    ; Do one more character
        rti                     ; Return leaving output active
EndOut2
        bclr    #OUTPUT,n0      ; Clear Output Active
        bclr    #LASTCHAR,n0    ; Clear 7th char output
        bclr    #WACOM,n0       ; Clear 7 byte mode
        bclr    #TWOBYTE,n0     ; Clear 2 byte mode
        bclr    #12,x:M_SCR     ; Disable transmit interrupt
        rti ;***************** Interupt from Xilinx ******************************

PenInput
        ; **** Detect operating mode

; See if a serial line command is pending.
        ; If so, process it, which may stop our output.

jset    #CMDPND,n0,DoCommand
Doit
        jset    #IDLE,n0,Done   ; Do nothing but commands in idle mode jset    #CVT_XY,n0,DoXY ; Do X, Y conversion, overlapped with output jset    #OUTPUT,n0,Done ; Bail if we are still outputting last point ; **** Output raw sensor values.

move    #RAW_IN,r5      ; Copy Raw Xilinx inputs
```

```
            move    #RAW_OUT,r5        ; To long output buffer
            do      #NUM_RAW,LongCopy
            move    y:(r5)+,X1
            move    X1,y:(r5)+
LongCopy:
            move    #RAW_OUT,r5
            jset    #DIAG,n0,StartOutput    ; Output all three bytes of DSP words ; **** Output raw sensor values in a 10-byte format
; Each of the 5 values (X+, X-, Y+, Y-, Button) take two bytes,
; 7 bits in each byte, leaving the top bit clear.
; This is weird, but it is most convenient to put the sync bit
; in the high bit of the *last* byte of each sample.  Fixing this
; requires a revamped OutputChar that puts out DSP words in
; high to low byte order.  Currently it is low to high.
            bset    #TWOBYTE,n0        ; Set 2-byte output mode
            move    #RAW_OUT,r5
            move    #>$7F,Y0           ; Mask for low 7 bits
            move    #>$3F80,Y1         ; Mask for next 7 bits
            clr     B
            clr     A
            do      #NUM_RAW,split     ; Put 7 bits of A/D into low and mid bytes.
            move    y:(r5),X1          ; Fetch current word
            move    X1,B1              ; Will mask out second byte in B accumulator
            move    X1,A1              ; Start low byte in A
            and     Y1,A               ; Mask out low bits
            and     Y1,B               ; Mask out high bits
            lsl     B                  ; And scoot them over 1
            move    B1,X0
            or      X0,A               ; Or high bits in with low bits.
            move    lc,B               ; Put loop counter into B
            move    #>1,X1
            cmp     X1,B
            jne     saveit
            move    #>$8000,X1         ; Set high bit of middle byte
            or      X1,A
saveit
            move    A1,y:(r5)+         ; Save it
split
            move    #RAW_OUT,r5        ; Reset output pointer
            jmp     StartOutput        ; Output 5 2-byte words (drop high byte)

; *** Convert input samples to X, Y coordinates
DoXY

; Move inputs to working variables so the Xilinx won't clobber
; them while we are using their values
            move    #RAW_IN,r2
            move    #XPLUS,r7
            do      #5,copy            ; 4 voltages plus threshold voltage
            move    y:(r2)+,X1
            move    X1,y:(r7)+
copy
            jsr     Convert            ; Convert the sample
            jset    #NO_PEN,n0,Done    ; Pen inactive, no output ; *** Output 7 bytes in 2 1/3 DSP words containing:
; DSP1: <byte3,byte2,byte1>
; DSP2: <byte6,byte5,byte4>
; DSP3: <         byte7>
;
; byte1: <Sync, Xsign, Xhigh>
; byte2: <Xmid>
; byte3: <Xlow>
; byte4: <Ysign, Yhigh>
; byte5: <Ymid>
; byte6: <Ylow>
; byte7: <Flags,Pressure,Buttons> move    #>SYNC,A           ; Load sync bits into A
            move    y:XVALUE,X1        ; Fetch X
            jsr     PackCoord          ; Pack into three bytes for output
            move    A1,y:CVT_OUT1      ; Store first output word clr     A
            move    y:YVALUE,X1
            jsr     PackCoord          ; Get Y move    A1,y:CVT_OUT2      ; Store second output word move    y:BUTTONS,A
            move    A1,y:CVT_LAST      ; Save last word ; Guard against output still active - miss a point in this case
            jset    #OUTPUT,n0,Done
```

```
            bset    #WACOM,n0               ; Flag 7 char output mode
            move    #CVT_OUT1,r5            ; Set output pointer
;;;         jmp     StartOutput             ; Transmit result ; *** Exit PenInput while enabling serial line output
StartOutput
            move    #M_STXL,r5              ; Reset unpacking pointer
            bset    #OUTPUT,n0              ; Set Output Active
            movep   #$ffffff,y:XX_REG       ; Re-enable Xilinx interrupt
            movep   #$1F02,x:M_SCR          ; Enable rx, tx, idle interrupts from SCI
            rti ; *** Exit PenInput, leaving serial line output alone
Done
            movep   #$ffffff,y:XX_REG       ; Re-enable Xilinx interrupt
            rti ; *** Pack Coordinate into 3 bytes for Wacom output.
            ; Because output is low, mid, high byte, and the Wacom format
            ; puts high bytes first, plus only 7 in a byte, this is tedious.
            ;
            ; X1 contains coordinate.
            ; A contains initial values for sync bits
            ; Return is A1 packed for output in low, mid, high byte order
PackCoord
            move    X1,B                    ; Put coord. into B
            rep     #14
            lsr     B                       ; Shift off low 14 bits
            move    B1,X0                   ; Save high bits
            or      X0,A                    ; Or into first byte (low A)

move    X1,B                    ; Fetch coord. again
            move    #>$7F,Y1                ; Mask for low bits
            and     Y1,B
            rep     #15
            lsl     B                       ; Shift low bits up to high byte
            move    B1,X0                   ; Fetch low byte
            or      X0,A                    ; Add it into output word move    X1,B                    ; Fetch coord. again
            move    #>$3F80,Y1              ; mask for mid (bits 7 to 13)
            and     Y1,B
            lsl     B                       ; Shift one position
            move    B1,X0                   ; Fetch middle bits
            or      X0,A                    ; Add it into output word rts

; ********************** CONVERSION **********************

;       Generate an answer in y:XVALUE y:YVALUE and y:BUTTONS.
;       See comment block around variable declarations at top of file.

Convert
            ; *** Get button state ********************************
            ; We compare the button voltage with known baseline values to
            ; determine which of the 4 states the buttons are in:
            ; Tracking (no buttons), Left, Middle, or Right
            ;
            clr     B                       ; Clear sign bits and low half
            move    y:THRESH,B1             ; Move w/out sign extension ; Convert from unsigned 14-bit A/D output to signed value
            move    #>$2000,Y1              ; Define compensation factor (8192)
            move    #>$3fff,Y0              ; Define a mask against button bits
            not     B                       ; thresh = -thresh
            and     Y0,B                    ;      & 0x3fff
            move    #0,B2
            sub     Y1,B                    ;      -8192 move    #>LOW_VOLTS,X0
            cmp     X0,B                    ; Low button voltage means no input
            jgt     penon
            bset    #NO_PEN,n0              ; Set flag to indicate inactive pen
            rts                             ; early return
penon       bclr    #NO_PEN,n0              ; Pen is active
            move    B1,y:THRESH             ; Save converted value of thresh
            ; Loop through checking Tracking, Middle, Right, Left baselines
            move    #TRACKING_V,r0          ; Address of first baseline
            move    #>TOLERANCE,Y0
            do      #4,states
            move    y:(r0)+,X0              ; Get a baseline voltage
            clr     B
            move    y:THRESH,B1             ; Get the current button voltage
            sub     X0,B
            abs     B                       ; And the magnitude of diff from base
```

```
              cmp      Y0,B                      ; Is it less than TOLERANCE?
              jgt      next                      ; If no, try next baseline
              move     lc,n2                     ; Fetch loop counter.
              move     #BITS_BASE,r2             ; Base address of bit pattern array
              nop                                ; pipeline delay
              move     y:(r2+n2),B               ; Fetch bit pattern into B
              enddo
              jmp      b_hit                     ; Bail early
next          nop                                ; last loop instruction
states
              ; Pen in transient button state, return early
              bset     #NO_PEN,n0
              rts ; *** See if the button state is changing. If so, delete one
              ; point because there is an extra transient button state.
b_hit
              move     y:LAST_BUT,X0
              cmp      X0,B
              .if      <ne>
              jset     #NEWBUT,n0,Accept         ; Saw change last time, take it now
              bset     #NEWBUT,n0                ; Flag changing state
              bset     #NO_PEN,n0                ; Pretend pen is inactive
              rts                                ; Early return
              .endi
Accept
              bclr     #NEWBUT,n0                ; Clear changing state flag
              move     B1,y:LAST_BUT             ; Save current button state ; *** Set up normalization factors depending on the button state.

move     #>$F,X0                   ; Button bits for no buttons
              cmp      X0,B     y:G_NRM_X,X1     ; Compare and precopy one factor
              .if      <eq>
              move     X1,y:NORM_X               ; Copy General norms to working var.
              move     y:G_NRM_Y,X1
              move     X1,y:NORM_Y
              move     #>TRACKING,X1
              move     X1,y:BUTTONS              ; Save user-visible button bits
              jmp      doDivs                    ; Go do it with general norm factors
              .endi move     #>$4,X0                   ; Button bits for Left button
              cmp      X0,B     y:L_NRM_X,X1     ; Compare and precopy one factor
              .if      <eq>
              move     X1,y:NORM_X               ; Copy Left norms to working var.
              move     y:L_NRM_Y,X1
              move     X1,y:NORM_Y
              move     #>LEFT_BUT,X1
              move     X1,y:BUTTONS              ; Save user-visible button bits
              jmp      doDivs                    ; Go do it with left norm factors
              .endi move     #>$7,X0                   ; Button bits for Middle button
              cmp      X0,B     y:M_NRM_X,X1     ; Compare and precopy one factor
              .if      <eq>
              move     X1,y:NORM_X
              move     y:M_NRM_Y,X1
              move     X1,y:NORM_Y
              move     #>MID_BUT,X1
              move     X1,y:BUTTONS              ; Save user-visible button bits
              jmp      doDivs                    ; Go do it with middle norm factors
              .endi ; Must be right norm factors (X0==$5)
              move     #>RIGHT_BUT,X1
              move     X1,y:BUTTONS              ; Save user-visible button bits
              move     y:R_NRM_X,X1
              move     X1,y:NORM_X
              move     y:R_NRM_Y,X1
              move     X1,y:NORM_Y ; ********** Xv' = XMINUS / XPLUS / NORM ********************
              ; Use X+, X-, and the current normalization factor to compute
              ; the Xvolts ("Xv" in patent claim) value.
              ; *** Xv = xminus/(float)xplus;
doDivs        move     #>$2000,Y1                ; Define compensation factor (8192)
              move     #>$3fff,Y0                ; Define a mask against button bits
              ;*** xplus = -((~xplus & 0x3FFF) - 8192;
              move     y:XPLUS,B                 ; Put raw xplus into B
              not      B                         ; Complement bits
              and      Y0,B     y:XMINUS,A       ; mask out button byte, get xminus
              move     #0,B2                     ; Clear sign bits accidentally set
              sub      Y1,B                      ; Subtract compensation factor
              neg      B                         ; Negate to get positive Xplus
```

```
;*** xminus = (~xminus & 0x3FFF) - 8192
    not     A                           ; Complement bits of xminus
    and     Y0,A                        ; mask out button byte
    move    #0,A2                       ; Clear sign bits accidentally set
    sub     Y1,A                        ; Subtract compensation factor jsr     Div1                        ; Divide xminus by xplus, save into X1
    jclr    #NO_PEN,n0,Xok              ; Check low voltage flag
    rts                                 ; and return early
Xok
    ; *** Xv = Xv / normal.x;
    move    y:NORM_X,X0                 ; Fetch the normalization factor
    jsr     Div2                        ; Do the division of X1 by X0 into X1
    move    X1,A                        ; Put result back into the accumulator ; *** if (Xv > Xtable.high) Xv = Xtable.high;
    move    y:X_MAX,X0
    cmp     X0,A                        ; is xvolts > xmax ?
    .if     <gt>
    move    X0,A                        ; then xvolts = xmax
    .endi ; *** if (Xv < Xtable.low) Xv = Xtable.low;
    move    y:X_MIN,X0
    cmp     X0,A                        ; is xvolts < xmin ?
    .if     <lt>
    move    X0,A                        ; then xvolts = xmin
    .endi
    move    A,y:XVOLTS                  ; Save the bounded value ; Compute i, the index of the line of constant Xvolts,
    ; and o, the remainder of the division.
    ; *** i = (int)((Xv - Xtable.low)/Xtable.inc);
    ; *** o = (Xv - (Xtable.low + i*Xtable.inc))/Xtable.inc;
    sub     X0,A                        ; Subtract minimum
    move    y:X_INC,X1                  ; Fetch increment
    jsr     Div3                        ; Divide to get index
    move    r0,y:EYE                    ; Store index I
    move    X1,y:OH                     ; Scaled remainder, o, is in X1

; *************** Yv' = YMINUS / YPLUS / NORM ********************
    ; Compute the Y voltage ("Yv" in the patent claim)
    ; *** Yv = yminus/(float)yplus;
    move    #>$2000,Y1                  ; Define compensation factor (8192)
    move    #>$3fff,Y0                  ; Define a mask against button bits
    ;*** xplus = -((~xplus & 0x3FFF) - 8192)
    move    y:YPLUS,B                   ; Put raw yplus into B
    not     B                           ; Complement bits
    and     Y0,B    y:YMINUS,A          ; mask button byte, get yminus
    move    #0,B2                       ; Clear sign bits accidentally set
    sub     Y1,B                        ; Subtract compensation factor
    neg     B                           ; Negate to get positive Yplus ;*** yminus = (~yminus & 0x3FFF) - 8192
    not     A                           ; Complement bits
    and     Y0,A                        ; mask button
    move    #0,A2                       ; Clear sign bits accidentally set
    sub     Y1,A                        ; Subtract compensation factor jsr     Div1                        ; Divide yminus by yplus, save into X1
    jclr    #NO_PEN,n0,Yok              ; Check low voltage flag
    rts                                 ; and return early
Yok
    ; *** Yv' = Yv / normal.y;
    move    y:NORM_Y,X0                 ; Fetch the normalization factor
    jsr     Div2                        ; Do the division of X1 by X0 into X1
    move    X1,A                        ; Put result back into the accumulator ; *** if (Yv' > Ytable.high) Yv' = Ytable.high;
    move    y:Y_MAX,X0
    cmp     X0,A                        ; is yvolts > ymax ?
    .if     <gt>
    move    X0,A                        ; then yvolts = ymax
    .endi ; *** if (Yv' < Ytable.low) Yv' = Ytable.low;
    move    y:Y_MIN,X0                  ;
    cmp     X0,A                        ; is yvolts < ymin ?
    .if     <lt>
    move    X0,A                        ; then yvolts = mmin
    .endi
    move    A,y:YVOLTS                  ; Save the bounded value ; ***************** Compute X ***********************
    ; It is a function of both Xv' and Yv'
```

```
;
; Compute j, the index of the line of constant Y volts,
; and v, the remainder of the division
; *** j = (int)((Yv' - Ytable.low)/Ytable.inc);
; *** v = (Yv' - (Ytable.low + j*Ytable.inc))/Ytable.inc;
        sub     X0,A                    ; Subtract minimum
        move    y:Y_INC,X1              ; Fetch increment
        jsr     Div3                    ; Divide to get index
        lua     (r0)+,r0                ; Save J+1, not J
        nop                             ; pipeline delay
        move    r0,y:JAY                ; Store index J+1
        move    X1,y:VEE                ; Scaled remainder, v, is in X1

; Compute r, an interpolated value between two lines of Y voltage
        ; in the X conversion table
        ; *** r = (1-v)*Xtable.t[i][j] + v*Xtable.t[i][j+1];
        move    #0,r7                   ; 0 for X table
        move    y:EYE,X0                ; X0 = i
        jsr     Table
        move    B,y:ARE ; *** Check I+1 against max number of rows.
        move    y:EYE,r0
        move    #0,r7                   ; 0 for X table
        lua     (r0)+,r0
        clr     B
        move    y:X_NUM,B1              ; Fetch number of rows to compare with
        move    r0,X0                   ; X0 = i+1
        cmp     X0,B
        jlt     done_X                  ; At edge of table ; Compute s, an interpolated value between two lines of Y voltage
        ; *** s = (1-v)*Xtable.t[i+1][j] - v*Xtable.t[i+1][j+1];
        jsr     Table
        move    B,y:ESS ; Finally, interpolate between the lines of X voltage
        ; *** p->x = NINT( ((1-o)*r + o*s );
        move    B,Y1
        move    y:ARE,Y0
        move    y:OH,X1
        jsr     wtAvg
        jmp     smooth_X done_X  move    y:ARE,B ; Do jitter smoothing. B contains the new X value.
        ; Compare with LAST_X and smooth the change.
smooth_X
        move    y:LAST_X,X0
        jsr     Smooth
        move    B,y:XVALUE
        move    B,y:LAST_X ; ***************** Compute Y **************************
        ; It is a function of both Yv' and Xv'
        ;
        ; Compute r, an interpolated value between two lines of Y voltage
        ; in the Y conversion table
        ; *** r = (1-v)*Ytable.t[i][j] + v*Ytable.t[i][j+1];
        move    #1,r7                   ; 1 for Y table
        move    y:EYE,X0                ; X0 = i
        jsr     Table
        move    B,y:ARE ; *** Check I+1 against max number of rows.
        move    y:EYE,r0
        move    #1,r7                   ; 1 for Y table
        lua     (r0)+,r0
        clr     B
        move    y:X_NUM,B1              ; Fetch number of rows to compare with
        move    r0,X0                   ; X0 = i+1
        cmp     X0,B
        jlt     done_Y                  ; at edge of table ; Compute s, an interpolated value between two lines of Y voltage
        ; *** s = (1-v)*Ytable.t[i+1][j] + v*Ytable.t[i+1][j+1];
        jsr     Table
        move    B,y:ESS ; Finally, interpolate between the lines of X voltage
        ; *** p->y = NINT( ((1-o)*r + o*s );
        move    B,Y1
        move    y:ARE,Y0
        move    y:OH,X1
```

```
            jsr     WtAvg
            jmp     smooth_Y

; *** At screen edge, p->y = r
done_Y      move    y:ARE,B

; Smooth the answer
smooth_Y
            move    y:LAST_Y,X0
            jsr     Smooth
            move    B,y:YVALUE
            move    B,y:LAST_Y rts                             ; End Convert ; *** Division #1 ***************************************************
;       Yv = xminus / xplus
;       abs(xminus) could be > abs(xplus), so we have to scale by 1/2
;       to ensure the result is < 1.0.  We also have to normalize the
;       numbers so as not to loose precision.  We normalize xplus first,
;       and then scale xminus by one less shift, effectively multiplying
;       our result by 1/2.
;
;       This routine checks for low voltages, too.  Low voltages are
;       signaled by setting the #NO_PEN,n0 bit, effectively turning off
;       the pen input.
;
;       Assume [x|y]minus is in A, [x|y]plus is in B
;       Return scaled result in X1

Div1        move    #>$200,Y1       ; Minimum Plus voltage value (512)
            cmp     Y1,B            ; Check that we are above threashold
            .if     <lt>
            bset    #NO_PEN,n0      ; Flag inactive pen
            rts                     ; return early
            .endi
            move    #0,r0           ; Initialize normalization counter
            rep     #14             ; Have 10 of 24 bits of precision already
            norm    r0,B            ; Normalize xplus
            move    B1,X0           ; Save normalized value
            move    r0,B            ; Save shift count
            move    #>1,X1          ; Add one (to negative value)
            add     X1,B
            neg     B               ; Get positive (shift count-1)
            rep     B               ; Now scale A, xminus
            lsl     A
            jsr     Divide          ; Do the division, A/X0 => X1
            rts ; *** Division #2 ***************************************************
;       This is like Division #1, except that there is no need to
;       bound the inputs to a particular range.  Now we have the problem
;       that both the ratio (dividend) and normalization (divisor) have
;       been scaled by 1/2, plus the divisor could be > dividend,
;       and the DSP's DIV instruction doesn't like that.  The division
;       will lose the scale, so solve all problems (rescale by 1/2 and
;       ensure that |dividend| < divisor) by multiplying dividend by 1/2.
;
;       Assume ratio is in X1, normalization factor is in X0
;       Return result in X1

; ***** Check range and magnitude of volates ******
Div2        move    #$40,Y1         ; Put 1/2 into Y1   (.1 binary)
            mpy     X1,Y1,A         ; Scale dividend by 1/2
            jsr     Divide          ; do the division of A by X0
            rts ; *** Basic division ************************************************
;       This assumes that |dividend| < divisor.  This is basically
;       taken from the DSP manual under the DIV instruction pages.
;
;       Put the dividend into A, the divisor into X0 before calling this
;       The quotient is returned in X1

Divide      abs     A       A,B     ; make dividend positive, copy old value to B
            eor     X0,B            ; This saves sign bit of quotient in N cc
            and     #$FE,ccr        ; clear carry bit C in condition code reg
            rep     #$18            ; do 24 divide steps to get 24 bit quotient
            div     X0,A            ; form quotient in A0, remainder in A1
            jpl     done            ; skip next if quotient is positive
            neg     A               ; complement quotient if N cc bit is set
done        move    A0,X1           ; Save value in X1
            rts
```

```
; ***** Division #3 volts/inc = index ********************************
;       This division is used to calculate an integer-valued index
;       into the table. Here we resort to repeated subtraction because
;       the hardware's divide iteration just won't do.
;
;       Put the dividend (volts) into A and the increment into X1 before
;       calling this. The resulting index is put into r0 upon return.
;       The remainder of the division is left in A.

Div3    move    #0,r0               ; Our subtraction counter
        do      #256,loop3          ; We know table size < 256
        sub     X1,A                ; Do one subtraction
        .if     <lt>                ; See if we are now negative
        enddo                       ; clean up do loop
        add     X1,A                ; restore the proper remainder
        move    X1,X0               ; Set up to divide remainder by divisor
        jsr     Divide              ; A/X0 => X1, remainder between 0 and 1
        jmp     loop3               ; and break out
        .endi
        lua     (r0)+,r0            ; count subtractions
loop3   nop
        rts ; *** Table ********************************************************
;       r = (1-v)*Xtable.t[i][j] + v*Xtable.t[i][j+1];
;       Do the lookup in the compressed tables. Each row is compressed
;       in along the direction of the j coordinate. Each row can occupy
;       a different number of storage words. The rows of the X and Y
;       tables are interleaved in memory. The general algorithm is
;       to use the i coordinate to find the right row, and then decompress
;       that row until the j and j+1 elements are computed.
;
;       V is in y:VEE, I is in y:EYE, J+1 is in y:JAY
;       X0 is y:EYE (or I+1, depending on call)
;       r0 is 0 if Xtable, 1 if Ytable.
;       Result r (or s) is returned in B
;
;       Each row has a three word header:
;       0: numWords it takes to store the row.
;       1: Value of first row element
;       2: mindelta << 16 | numBits
;
;       A variable number of words are used to store NUM_Y numBits elements.
;       The value of an element is array[i] = array[i-1] - d - slice.
;
;       An X table row is stored before the corresponding Y table row.
;
;       The term "slice" is used to refer to a packed integer that occupies
;       less than a full DSP word (24 bits). The slices are 1, 2, 3, 4, 6, 8
;       or more bits wide, and they are packed into DSP words. A slice will
;       not cross DSP word boundaries.
;
Table   move    X0,B                ; Put row index (loop index) into B
        asl     B                   ; Shift left to multiply row by 2. Set Z bit.
        move    r7,Y1               ; Fetch X/Y flag add     Y1,B                ; Bump row addr if Y table row.
        move    y:ROW_1,r7          ; Row address into r7
        .if     <eq>                ; Check Z bit to see if B is zero.
        jmp     rowI
        .endi ;       This could be optimized by remembering the base address after
;       the first lookup finds it. There will be 4 calls to Table for
;       each point, and they will be using 4 adjacent rows in the tables,
;       2 X and 2 Y, that are interleaved. However, this loop just
;       restarts from the beginning and chains through the rows until
;       it gets to the right one.

do      B,rowI              ; Look for row I in the table
        move    y:(r7),n7           ; Get row storage size into offset register
        nop                         ; pipeline delay after updating addr reg.
        lua     (r7)+n7,r7          ; Increment address by row size
        nop                         ; pipeline delay after updating addr reg.

;       *** Now r7 address the proper row.
rowI    lua     (r7)+,r7            ; Aim at first value, not row length
        nop                         ; pipeline delay after updating addr reg.
        move    y:(r7)+,Y1          ; Fetch value of first row element
        move    Y1,B                ;       into B move    y:(r7)+,X0          ; Fetch mindelta << 16 | numBits into X0
        move    X0,A                ;       into A
        move    #>$FF,Y1            ; Define Mask for numBits
        and     Y1,A                ; Get numBits into A
```

```
          move    A,y:NUMBITS       ; Save numBits into y memory
          move    X0,A              ; Get minDelta again
          move    #$FF0000,Y1       ; Define mask for mindelta
          and     Y1,A              ; Get mindelta << 16
          rep     #16
          asr     A                 ; Now shift it over 16 times.
          move    A,y:MINDEL        ; Save mindelta in y memory ; *** r7 addresses first word
; *** B = first
; *** y:NUMBITS = numBits
; * y:MINDEL = mindelta ; * Compute slice mask into Y1
          move    #>1,Y1
          move    Y1,A
          move    y:NUMBITS,y0
          rep     Y0
          asl     A                 ; A = 1 << numbits
          sub     Y1,A              ; A -= 1
          move    A,Y1              ; Save mask in Y1

; *** Compute number of slices per word into y:SLICES
          move    y:NUMBITS,n2      ; Use NUMBITS as index
          move    #SLICE,r2         ;     into SLICE array
          nop                       ; pipeline delay while r0 is updated
          move    y:(r2+n2),X1      ; fetch SLICES value
          move    X1,y:SLICES       ; and save it.

; *** March through the bit array updating B by (slice - mindelta)
; The bit slices are organized so that slice 0 is right justified,
; but the bits read from left to right.  This means we can successively
; mask out a slice, add it to the other accumulator, then shift
; the slice out the right end of the word, and iterate.

; In the following loop
; *** r0 is the slice counter
; *** r7 is word address
; *** X0 has the word being sliced
; *** X1 is used to shuffle things in and out of A
; *** Y0 holds the result for row[j]
; *** Y1 has Mask
; *** y:JAY has j+1
; *** B has current element value move    #0,r0             ; Initialize outer loop counter
top       move    y:(r7)+,X0        ; Fetch word to slice up into X0
          move    y:SLICES,X1       ; Fetch number of slices per word
          do      X1,slice          ; Inner loop to chop out slices
          move    B,Y0              ; Save previous result (arr[j])
          move    X0,A              ; A = word to slice up
          and     Y1,A              ; Mask out slice
          move    A1,X1             ; Save slice: "A1" is crucial to avoid sign bits add     X1,B              ; arr[j] = arr[j-1] + slice - mindelta
          move    y:MINDEL,X1
          sub     X1,B move    X0,A              ; A = word to slice up
          move    y:NUMBITS,X1      ; X = shift distance
          rep     X1
          asr     A                 ; shift out slice
          move    A,X0              ; and save modified word move    r0,A              ; Check loop counter
          move    y:JAY,X1          ; Against J+1 index
          cmp     X1,A
          .if     <eq>
          enddo
          jmp     slice2            ; Break out when we've done all needed slices
          .endi
          lua     (r0)+,r0          ; Increment outer slice counter
slice     nop
          jmp     top               ; Go to the next DSP word
slice2    move    B,Y1
; Done with decompression.
; *** Y0 = row[j]
; *** Y1 = row[j+1]
          move    y:VEE,X1
          jsr     WtAvg             ; Compute (1-v)row[j] + v*row[j+1]
          rts ; ****************** Weighted Average: (1-c)*a + c*b ***************
     ; WtAvg
```

```
;  in      X1 = c
;          Y0 = a
;          Y1 = b
;  out     B = (1-c)*a + c*b
;
; Rounding is somewhat important.  The final result ought to be
; rounded so moving things out of the accumulator doesn't loose info.
; The intermediate results shouldn't be rounded too soon, however.

WtAvg     mpy      Y1,X1,B         ; B = v*Xtable.t[i][j+1]

move     #$7fffff,X0     ; X0 = 1
          move     X0,A            ; A = 1.0
          sub      X1,A            ; A = 1 - v
          move     A,X0
          mpyr     Y0,X0,A         ; A = (1-v)*Xtable.t[i][j]

move     A,X1            ; X1 = (1-v)*Xtable.t[i][j]
          add      X1,B            ; B = (1-v)*Xtable.t[i][j] +
                                   ;     v*Xtable.t[i][j+1]
          rnd      B
          rts ;******************** Jitter Smoothing ***********************
;    Pen movements are smoothed with an approximation of an exponential
;    Basically, small movements are damped more than big ones
;    On entry, B contains the current value, X0 contains the previous value.
;    On exit, B contains the smoothed new value
Smooth
          bclr     #15,n0          ; Clear negative delta flag
          sub      X0,B            ; Compute change (newx - lastx)
          jpl      pls1            ; Jump if change is positive
          bset     #15,n0          ; Note negative delta
          neg      B               ; Warp to positive delta
pls1
          move     #>JT_SIZE,X1    ; Get max smoothed delta value
          cmp      X1,B            ; and see if we are below that
          jpl      toobig          ; B was bigger than JT_SIZE => no smoothing move     B,n2            ; Put delta into offset register
          move     #JITTER,r2      ; Put base address into address register
          nop                      ; pipeline delay
          move     y:(r2+n2),B     ; Map to the new delta
toobig                             ; Now B has the right delta
          jclr     #15,n0,pls2     ; Remember plus or minus delta
          sub      X0,B            ; Subtract (delta - lastx)
          neg      B               ; Fix it to (lastx - delta)
          rts                      ; and we are done
pls2
          add      X0,B            ; Add delta to lastx
          rts                      ; and we are done ;**************** Command Processing *************************
;
; Process a command.  This is jumped to from PenInput, and eventually the
; subroutines invoked here should branch back into that routine..

DoCommand
          move     #>CMDBUF,r3     ; Buffer with copy of command
          move     #>$d,A          ; Command delimiter
          move     #>CMDEND,B      ; Limiting address
cpycmd
          move     r3,X0           ; Check against malformed command
          cmp      X0,B            ; CMDEND - r3
          jlt      takeit          ; Jump if Accumulator B is less than X0
          move     p:(r4)+,Y0      ; Fetch a command character
          move     Y0,y:(r3)+      ; Store into second buffer cmp      Y0,A            ; Delimiter?
          jne      cpycmd
takeit ; Synchronize with input thread.  Reset r1 and r4 to INBUF
          ; when we catch up.  Up priority to block input interrupts.

move     #>$30,sr        ; IPL 3 blocks everything
          move     r1,A            ; tail pointer advanced by InputChar
          move     r4,X0           ; scan pointer advanced by DoCommand
          cmp      X0,A            ; r1 - r4 (tail - scan)
          jgt      StillMore       ; if scan < tail, then input is still ahead bset     #FIXUPR1,n0     ; Cause InputChar to reset on next character
          move     #INBUF,r4       ; Reset our own pointer in anticipation
          bclr     #CMDPND,n0      ; Clear command pending flag cause no more cmds
StillMore
```

```
            move    #>$20,sr        ; Reenable input and output interrupts

; Check for global, one character commands
            move    #CMDBUF,r3
            nop
skipnull
            move    y:(r3)+,A       ; Load first command character
            move    #0,X0
            cmp     X0,A
            jeq     skipnull        ; and skip past nulls from pokes ; Now A contains the first command character,
        ; and r3 addresses the next command character move    #>BOOT_CMD,X0   ; '!' - reset all => into bootstrap mode
            cmp     X0,A
            jeq     ResetInput move    #>WACOM_CMD,X0  ; 'S' - Default Wacom mode
            cmp     X0,A
            jeq     StreamMode move    #>RAW_MODE_CMD,X0 ; '@' - Into raw output mode
            cmp     X0,A
            jeq     RawMode
        ; Add second character and look for two character commands
            move    y:(r3)+,Y1
            rep     #8              ; Put first character in mid b,  for reading
            lsl.    A
            or      Y1,A            ; Add second character into low byte ; Now A contains two characters,
        ; and r3 addresses the third.

move    #>ALLOW_CMD,X0  ; 'AL' - Allow 0, all, or in range points
            cmp     X0,A
            jeq     AllowCmd move    #>FORMAT_CMD,X0 ; 'AS' - Set format
            cmp     X0,A
            jeq     FormatCmd move    #>VERSION_CMD,X0 ; '-*' - Return version info
            cmp     X0,A
            jeq     GetVersion move    #>RESET_CMD,X0  ; 'RE' - Wacom reset
            cmp     X0,A
            jeq     StreamMode move    #>STREAM_CMD,X0 ; 'SR' - Wacom stream mode
            cmp     X0,A
            jeq     StreamMode move    #>START_CMD,X0  ; 'ST' - Start sending points
            cmp     X0,A
            jeq     StreamMode move    #>REQUEST_CMD,X0 ; 'RQ' - Poll for one point now
            cmp     X0,A
            jeq     DoXY move    #>STOP_CMD,X0   ; 'SP' - Stop sending points
            cmp     X0,A
            jeq     IdleMode ; Ignore all other commands
            jmp     Doit ;************** Idle Mode **************************
;
; No output, but we continue to recieve IRQA interrupts in order
; to trigger command processing.  This is not a bootstrap mode.
IdleMode
        bset    #IDLE,n0        ; Disable stream output, but leave on IRQA
        bset    #ECHO,n0        ; Turn on command echoing
        jmp     Done ;************** Stream Mode **************************
;
; Turn on stream of X, Y points for output
StreamMode
        bclr    #IDLE,n0        ; Clear idle to enable processing
        bclr    #ECHO,n0
        bset    #CVT_XY,n0      ; Do X, Y conversion
        jmp     Doit            ; Go start output
```

```
;*************** Raw Mode *********************************
;
; Turn on stream of Sensor values for output
RawMode
        bclr    #IDLE,n0        ; Clear idle to enable processing
        bclr    #ECHO,n0
        bclr    #CVT_XY,n0      ; Do not do X, Y conversion
        jmp     Doit            ; Go start output ;************* Allow Command **************************
;
; Allow of all characters.
AllowCmd
        move    y:(r3)+,A       ; Fetch third character move    #>ZERO,X0
        cmp     X0,A
        jeq     IdleMode        ; 'AL0' => Idle state move    #>ONE,X0
        cmp     X0,A
        jeq     StreamMode      ; 'AL1' => Stream state jmp     Doit            ; Ignore other variations ('AL2')

;************* Format Command *************************
;
; Set the output format.
FormatCmd
        move    y:(r3)+,A       ; Fetch third character move    #>ONE,X0
        cmp     X0,A
        jeq     StreamMode      ; 'AS1' => Emit X, Y in 7 char binary format move    #>TWO,X0
        cmp     X0,A
        jeq     RawMode         ; 'AS2' => Emit raw sensor values jmp     Doit            ; Ignore other variations ('AS0' is ascii)

;************* Get Version ****************************
;
; Return a string version number.  The string is downloaded by npensetup
GetVersion
        move    y:VRS_ADDR_PTR,r5   ; Fetch pointer to string
        jmp     StartOutput EndMon
```

APPENDIX B

```
/*
 * npenall.c --
 *      Calibration program that uses the calibration
 *      pen that emits at all 4 frequencies, corresponding to 4 states:
 *      tracking, left, middle, right.  The
 *      calibration pen cycles through 5 states (including off) for each pen.
 *
 * Copyright 1992 Xerox Corp.  All rights reserved.
 */ include <fcntl.h>
include <sys/stropts.h>
#include <sys/termios.h>
#include <stdio.h>
#include <sys/filio.h>
include <sys/time.h> include "npen.h"
include "npenFiles.h"

#define AND     &&
#define OR      ||
#define NOT     !
#define TRUE    1
#define FALSE   0
#define loop    while(1)

/* various things for X display */
```

```c
#include <X11/Xlib.h>

Display *XDisplay = NULL;
Window MessageWindow;
GC WindowGC;
XFontStruct *WindowFont;

#define XSAMPLES  5
define YSAMPLES  4 define bufsize 1

/*
 * main --
 *      Open the device, display the calibration grid as an X window,
 *      then call ReadPen for each point and output the result.
 */
main (argc, argv)
    int argc;
    char *argv[];
{
    XGCValues init;
    XSetWindowAttributes attr;
    int x, y, width, height, i, j, widthincr, heightincr, edgeoffset, xres, yres;
    int window_fg_pixel, window_bg_pixel;
    XEvent event;
    RawData raw;
    DataStats stats[4]; /* Enough for each pen state */
    int s;
    FILE *console, *output;
    FILE *diagFile;
    int penFD;
    double t;
    char line[80];

if (argc < 5)
        {
        fprintf (stderr, "usage:  ncal.all <tty> <output file> <x res> <y res>\n");

exit(1);
    } else if (argc > 5) {
        diagFile = fopen("diag-output", "w");
        if (diagFile != NULL) {
            fprintf(stderr, "Dumping diagnostics output to \"diag-output\"\n");
        }
    } else {
        diagFile = NULL;
    }
    console = fopen("/dev/console", "w");

penFD = NpenOpen(argv[1]);
    if (penFD < 0) {
        exit(1);
    } output = fopen (argv[2], "w");
    if (output == NULL)
        {
        fprintf (stderr, " Can't open output file %s.\n", argv[2]);
        exit (0);
    } xres = atoi (argv[3]);
    yres = atoi (argv[4]);

if (xres < 2 OR yres < 2)
        {
        fprintf (stderr, " Bad values for x res or y res or both:  x is %d, y is %d.\n",
                xres, yres);
        exit(1);
    } printf("\nDo a quick test by aiming the calibration pen at the liveboard\n\n");
    printf("HIT RETURN WHEN READY");
    fgets(line, 80, stdin);
    NpenReadAll(penFD, &raw, stats, NULL, 0, 0);
    printf("OK\n");

XDisplay = XOpenDisplay (NULL);
    if (XDisplay != NULL)
        {
        edgeoffset = 0;
        x = 1; y = 0;
```

```
height = DisplayHeight (XDisplay, DefaultScreen(XDisplay));
width = DisplayWidth (XDisplay, DefaultScreen(XDisplay));

widthincr = (width - (2 * edgeoffset))/(xres - 1);
heightincr = (height - (2 * edgeoffset))/(yres - 1);

window_fg_pixel = WhitePixel(XDisplay, DefaultScreen(XDisplay));
window_bg_pixel = BlackPixel(XDisplay, DefaultScreen(XDisplay));

attr.override_redirect = 1;
attr.background_pixel = window_bg_pixel;
attr.backing_pixel = window_bg_pixel;
attr.backing_store = WhenMapped;

MessageWindow = XCreateWindow (XDisplay,
                               DefaultRootWindow(XDisplay),
                               x, y, width, height,
                               0, CopyFromParent,
                               CopyFromParent, CopyFromParent,
                               (CWBackingStore
                                | CWBackingPixel
                                | CWBackPixel
                                | CWOverrideRedirect),
                               &attr);
init.foreground = window_fg_pixel;
init.background = window_bg_pixel;
WindowGC = XCreateGC(XDisplay, MessageWindow,
                     GCForeground | GCBackground, &init);
XSelectInput (XDisplay, MessageWindow, ExposureMask | KeyPressMask);

XMapRaised (XDisplay, MessageWindow);

while (TRUE)
{
    XNextEvent (XDisplay, &event);
    if (event.type == Expose)
    {
        for (j = 0, y = edgeoffset; j < yres; j += 1, y += heightincr)
            for (i = 0, x = edgeoffset; i < xres; i += 1, x += widthincr)
            {
                XDrawLine (XDisplay, MessageWindow, WindowGC,
                           x, 0, x, height);
                XDrawLine (XDisplay, MessageWindow, WindowGC,
                           0, y, width, y);
            }
        XFlush(XDisplay);

for (j = 0, y = edgeoffset; j < yres; j += 1, y -= heightincr)
            for (i = 0, x = edgeoffset; i < xres; i += 1, x += widthincr)
            {
                XSetLineAttributes (XDisplay, WindowGC, 5, LineSolid, CapRound, JoinMiter);
                XDrawLine (XDisplay, MessageWindow, WindowGC,
                           x-10, y, x, y-10);
                XDrawLine (XDisplay, MessageWindow, WindowGC,
                           x, y-10, x+10, y);
                XDrawLine (XDisplay, MessageWindow, WindowGC,
                           x+10, y, x, y+10);
                XDrawLine (XDisplay, MessageWindow, WindowGC,
                           x, y+10, x-10, y);
                XFlush (XDisplay);

while (XNextEvent(XDisplay, &event), event.type != KeyPress)
                    ;

NpenReadAll (penFD, &raw, stats, diagFile, x, y);
                NpenDoButtonCompensation(x, y, &raw);

XBell (XDisplay, 100);

XSetLineAttributes (XDisplay, WindowGC, 1, LineSolid, CapRound, JoinMiter);

XDrawLine (XDisplay, MessageWindow, WindowGC,
                           x, y-10, x, y+10);
                XDrawLine (XDisplay, MessageWindow, WindowGC,
                           x-10, y, x+10, y);

NpenPrint(output, &raw, x, y);
            }
        NpenClose(penFD);
        NpenPrintButtonCompensation();
        exit(0);
    }
}
```

```
        else
        {
            fprintf (stderr, "calibrate: Can't figure which X Window display to use.\n");
            exit(1);
        }
}
/*
 * State for button compensation.
 */
static RawData upperLeft;
static RawData upperRight;
static RawData lowerLeft;
static RawData lowerRight;
/*
 * NpenDoButtonCompensation --
 *      Record the values at the four corners for a later bias calculation.
 */
NpenDoButtonCompensation(x, y, rawPtr)
    int x, y;
    RawData *rawPtr;
{
    static int Xlow = 1000, Xhigh = 0;   /* Corner coordinates */
    static int Ylow = 1000, Yhigh = 0;
    static int lastX = 0, lastY = 0;
    static int doneUpperRight = 0;
    static RawData lastRaw;

if (x > Xhigh) {
        Xhigh = x;
    }
    if (x < Xlow) {
        Xlow = x;
    }
    if (y > Yhigh) {
        Yhigh = y;
    }
    if (y < Ylow) {
        Ylow = y;
    }
    if (lastX == 0 && lastY == 0) {
        /* First sample is upper left corner */
        upperLeft = *rawPtr;
    } else if (x < lastX) {
        if (!doneUpperRight) {
            /* The end of the first set is the upper right,
             * which was the last sample we saw. */
            upperRight = lastRaw;
            doneUpperRight = 1;
        }
        /* Beginning of a new set, but not sure if it the last one.
         * Remember RawData in case this is lowerLeft. */
        lowerLeft = *rawPtr;
    } else {
        /* This could be the last sample, or lowerRight */
        lowerRight = *rawPtr;
    }
    lastX = x ; lastY = y;
    lastRaw = *rawPtr;
}
/*
 * NpenPrintButtonCompensation --
 *      The button compensation is the average of the ratios of the
 *      button-biased voltage to the tracking voltage.
 */
NpenPrintButtonCompensation()
{
    FILE *output = fopen(BUTTON_FILE, "w");
    double x_but, y_but;              /* Ratios with button held down */
    double x_trk, y_trk;              /* Ratios in the tracking state */
    double x_bias, y_bias;            /* Average of ratios of ratios */ define Doit(corner, button) \
    x_but = (double)corner.button.xminus / (double)corner.button.xplus; \
    y_but = (double)corner.button.yminus / (double)corner.button.yplus; \
    x_trk = (double)corner.track1.xminus / (double)corner.track1.xplus; \
    y_trk = (double)corner.track1.yminus / (double)corner.track1.yplus; \
    x_bias += x_but / x_trk; y_bias += y_but / y_trk ;

x_bias = 0.0 ; y_bias = 0.0;
    Doit(upperLeft, left1);
    Doit(upperRight, left1);
    Doit(lowerLeft, left1);
    Doit(lowerRight, left1);
    x_bias /= 4.0; y_bias /= 4.0;
    fprintf(output, "%f\n%f\n", x_bias, y_bias);
```

```
            x_bias = 0.0 ; y_bias = 0.0;
            Doit(upperLeft, middle1);
            Doit(upperRight, middle1);
            Doit(lowerLeft, middle1);
            Doit(lowerRight, middle1);
            x_bias /= 4.0; y_bias /= 4.0;
            fprintf(output, "%f\n%f\n", x_bias, y_bias);

x_bias = 0.0 ; y_bias = 0.0;
            Doit(upperLeft, right1);
            Doit(upperRight, right1);
            Doit(lowerLeft, right1);
            Doit(lowerRight, right1);
            x_bias /= 4.0; y_bias /= 4.0;
            fprintf(output, "%f\n%f\n", x_bias, y_bias);
            fclose(output);

/*
             * Also pick out button state threshold voltages.
             */
            output = fopen(THRESH_FILE, "w");
            if (output == NULL) {
                fprintf(stderr, "Cannot create %s (button state voltages)\n",
                    THRESH_FILE);
            } else {
                fprintf(output, "left1 %d\n", upperLeft.left1.thresh);
                fprintf(output, "middle1 %d\n", upperLeft.middle1.thresh);
                fprintf(output, "right1 %d\n", upperLeft.right1.thresh);
                fprintf(output, "track1 %d\n", upperLeft.track1.thresh);
            }
}
/*
 * npen.h --
 *       Definitions for user-level access to the npen device.
 *
 * Copyright 1991 Xerox Corp. All rights reserved.
 */ ifndef _NPEN
define _NPEN include <fcntl.h>
include <sys/stropts.h>
#include <sys/termios.h>
#include <stdio.h>
#include <sys/filio.h>
include <sys/time.h> typedef struct {
    int xplus;          /* Sensor values */
    int xminus;
    int yplus;
    int yminus;
    int thresh;         /* Button threshold voltage */
} Sample;

typedef struct {
    Sample left1;       /* These 4 samples must be contiguous in the struct */
    Sample right1;      /* NpenPrint depends on it */
    Sample middle1;
    Sample track1;
} RawData;

/*
 * Values for statistics
 */
typedef struct {
    int state;          /* Button state that identfies this sample */
    int num;            /* Number of samples */
    Sample high;        /* Highest sensor value at a point */
    Sample low;         /* Lowest ... */
    Sample sum;         /* Sum of all values */
    Sample sumsquare;   /* Sum of squares of values */
    Sample mean;        /* Average of all values except high and low */
    Sample variance;    /* Variance (square of standard deviation) */
} DataStats;

#define Save(s1, s2) (*(s1) = *(s2))

int NpenOpen();
int NpenClose();
int NpenReadSample();
int NpenConvert();
int NpenPrint();

#endif /* not _NPEN */
```

```
/*
 * npenFiles.h --
 *
 *      Well known file names related to setup of the npen device.
 *
 * Copyright 1992 Xerox Corp.  All rights reserved.
 */ ifndef _NPENFILES
define _NPENFILES

/*
 * TABLE_FILE contains the compressed calibration table data.
 * BUTTON_FILE contains the normalization factors used when a button
 *      is pressed.
 * NORM_FILE contains the general normalization factors used to adjust
 *      for long-term drifts in the pen electronics
 * THRESH_FILE has the voltage values for different button states.
 */
#define TABLE_FILE      "compressed-data"
#define BUTTON_FILE     "button-norm"
#define NORM_FILE       "general-norm"
#define THRESH_FILE     "thresh-data"

#endif /* not _NPENFILES */

/*
 * npen.c --
 *      Access routines for the 3rd generation livboard pen device (npen)
 *
 * Copywrite 1992 Xerox Corp.  All rights reserved.
 */
#include <stdio.h>
#include "npen.h"

static struct termios term;        /* Shared by NpenOpen and NpenClose */ static float npenTrackingVolts = 0;      /* Used to calibrate button states */

/*
 * Open and condition the serial line for input from the device.
 * The DSP sets up its serial line peripheral with 10-bit chacters:
 * 1 start, 8 data, 1 stop bit.  9600 baud.  No parity bit.
 * This routine also fiddles with the non-blocking paramters.
 */
NpenOpen(devname)
    char *devname;
{
    int dummy = 0;
    int fd;

fd = open(devname, 0 /* O_RDONLY */);
    if (fd < 0) {
        fprintf (stderr, " Can't open npen device %s.\n", devname);
        return -1;
    };

if(ioctl(fd, TCGETS, &term) == -1) {
        perror("ioctl");
        close(fd);
        return -1;
    }

/* 1 stop bits, 8 data bits */
    term.c_cflag = B9600|CREAD|CS8;

term.c_iflag = 0;

term.c_lflag = 0;

/* read returns after receiving at least 1 char */
    term.c_cc[VMIN] = 1;
    /* read returns after at most .4 secs */
    term.c_cc[VTIME] = 4;

if(ioctl(fd, TCSETS, &term) == -1) {
        perror("ioctl");
        exit(2);
    }
    ioctl (fd, TCFLSH, 2);

return fd;
```

```
}
/*
 * NpenClose --
 */
int
NpenClose(fd)
    int fd;
{
    /*
     * Reset parameters before close in order to prevent hanging.
     */
    term.c_cc[VMIN] = 0;
    term.c_cc[VTIME] = 0;
    if (fd >= 0) {
        if(ioctl(fd, TCSETS, &term) == -1) {
            perror("NpenClose TCSETS ioctl");
        }
        close(fd);
    }
}
/*
 * Read a sample from the device.  This requires syncing up with the
 * sample and extracting the sensor values from the bytes.
 *
 * Returns 1 if it got an ok sample, 0 for low readings (no pen)
 */
int
NpenReadOne (penFD, samplePtr, debug)
    int penFD;
    Sample *samplePtr;
    int debug;
{
    int count, n, nbytes;
    unsigned char c;
    int readMask;
    double t;
    struct timeval timeout;
    long thresh0, thresh1, thresh2, thresh3;
    char buf[1024];

FlushInput(penFD);

while (1) {
        if (! NpenSync(penFD) ) {
            continue;
        }
        n = NpenReadSample(penFD, buf);
        if (n == 0) {
            continue;
        }
        /*
         * The button state is in the low order 4 bits of the high byte.
         * In the first DSP word the index bits are 0, so the button bits
         * are all alone in the high byte of the first word, or buf[2]
         */
        if (debug) {
            printf("buttons 1x%02x\n", buf[2] & 0xFF);
            /*
             * The A/D outputs are 14 bits.  They range in magnitude from
             * 0 to 16383, corresponding to voltage ranges of -10 to +10 volts.
             */ samplePtr->xplus =  ((buf[1] & 0x3F) << 8) | (buf[0] & 0xFF);
            samplePtr->xminus = ((buf[4] & 0x3F) << 8) | (buf[3] & 0xFF);
            printf("raw xplus %6d raw xminus %6d\n",
                    samplePtr->xplus, samplePtr->xminus);

samplePtr->yplus =  ((buf[7] & 0x3F) << 8) | (buf[6] & 0xFF);
            samplePtr->yminus = ((buf[10] & 0x3F) << 8) | (buf[9] & 0xFF);
            printf("raw yplus %6d raw yminus %6d\n",
                    samplePtr->yplus, samplePtr->yminus);

samplePtr->thresh = ((buf[13] & 0x3F) << 8) | (buf[12] & 0xFF);
            printf("Raw Threshold: %04x\n", samplePtr->thresh);
        }
        if (! NpenConvert(buf, samplePtr)) {
            if (debug) {
                fprintf(stderr, "Low reading (xplus %d yplus %d) pen battery low?\n",
                    samplePtr->xplus, samplePtr->yplus);
            }
            return 0;
        }
        /*
         * Map integer ranges to volts.
         */
```

```
            if (debug) {
                printf("vlt xplus %.3f    xminus %.3f ratio %3.3f\n",
                        (t = samplePtr->xplus)/819.2,
                        (t = samplePtr->xminus)/819.2,
                        (t = samplePtr->xminus)/ samplePtr->xplus);

printf("vlt yplus %.3f    yminus %.3f ratio %3.3f\n",
                        (t = samplePtr->yplus)/819.2,
                        (t = samplePtr->yminus)/819.2,
                        (t = samplePtr->yminus)/ samplePtr->yplus);

printf("Button Threshold: %.3f\n", (t = samplePtr->thresh) / 819.2);
            }
            return 1;
        }
    }

/*
 * NpenReadAll --
 *
 * Read the calibration pen and get readings for all button states.
 */
void NpenReadAll (penFD, rawPtr, statArray, diagFile, x, y)
    int penFD;
    RawData *rawPtr;           /* Converted samples in all states */
    DataStats *statArray;      /* Array of statistics for each state */
    FILE *diagFile;            /* If non-NULL, raw data dumped here */
    int x, y;                  /* For diagnostics output */
{
    char buf[1024];            /* For reading and discarding input */
    int i;                     /* Safety counter */
    int processing;            /* True after we start processing samples */
    int b, lastB;              /* Current and last button state */
    int stateMask;             /* Remember what states we've seen */
    DataStats *statPtr;        /* Statistics for current state */
    int *iPtr;
    Sample current;

FlushInput(penFD);
    /*
     * Sync up by looking for the high byte of the last word.
     */
    while (! NpenSync(penFD) ) {
        ;
    } stateMask = 0;
    lastB = 0;
    processing = 0;
    for (i=0 ; i<4 ; i++) {
        statArray[i].num = -1;
    }
    /*
     * Read the device repeatedly, watching the button state change
     * as the calibration pen emits different frequencies.
     */
    for (i = 0 ; i<500 ; i++ ) {
        int n;
        n = NpenReadSample(penFD, buf);
        if (n == 0) {
            while (! NpenSync(penFD) ) {
                ;
            }
            continue;
        }
        iPtr = (int *)buf;      /* for gdb */
        if (! NpenConvert(buf, &current)) {
            fprintf(stderr, "Low reading (xplus %d yplus %d) pen battery low?\n",
                current.xplus, current.yplus);
            NpenClose(penFD);
            exit(1);
        } b = NpenButton(&current);
        if (b == 0) {
            /*
             * No button, or we haven't seen enough to deduce
             * different state voltages.
             */
            continue;
        } if (b == lastB) {
            if (!processing) {
```

```
                continue;
            } else {
                /*
                 * Sum samples and remember outliers.
                 */
                NpenTakeOneStat(statPtr, &current);
                if (diagFile != NULL) {
                    NpenPrintOne(diagFile, &current, x, y);
                }
            }
        } else if (b != lastB) {
            if (processing && statPtr->num > 12) {
                /*
                 * Average result and save it.
                 */
                NpenSumStats(statPtr);

switch (lastB) {
                    case 0x4:    /* Left */
                        stateMask |= 0x1;
                        Save(&rawPtr->left1, &statPtr->mean); break;
                    case 0x5:    /* Right */
                        stateMask |= 0x2;
                        Save(&rawPtr->right1, &statPtr->mean); break;
                    case 0x7:    /* Middle */
                        stateMask |= 0x4;
                        Save(&rawPtr->middle1, &statPtr->mean); break;
                    case 0xf:    /* Tracking */
                        stateMask |= 0x8;
                        Save(&rawPtr->track1, &statPtr->mean); break;
                    default:
                        printf("unexpected button state %x at stateMask %x\n",
                            lastB, stateMask);
                }
                if (stateMask == 0xf) {
                    return;
                }
            }

/*
             * Advance to next state.
             */
            switch (b) {
                case 0x4:        /* Left */
                    statPtr = &statArray[0]; break;
                case 0x5:        /* Right */
                    statPtr = &statArray[2]; break;
                case 0x7:        /* Middle */
                    statPtr = &statArray[1]; break;
                case 0xf:        /* Tracking */
                    statPtr = &statArray[3]; break;
                default:
                    printf("unexpected button state %x at stateMask %x\n",
                        b, stateMask);
            }
            processing = 1;
            if (statPtr->num < 0) {
                NpenInitStats(statPtr, b);
            }
        }
        lastB = b;
    }
    printf("Not using special calibration pen (stateMask %x)\n", stateMask);
    {
        int bit, state;
        bit = 0x1;
        for (state=0 ; state<4 ; state++, bit <<= 1) {
            if ((stateMask & bit) == 0) {
                printf("Missed bit %x ", bit);
                switch(state) {
                    case 0: printf(" LEFT\n"); break;
                    case 1: printf(" MIDDLE\n"); break;
                    case 2: printf(" RIGHT\n"); break;
                    case 3: printf(" TRACKING\n"); break;
                }
            }
        }
    }
    exit (1);
}
/*
 * NpenReadSample --
 *
 *      Read one sample from the device into a raw buffer.
 *      No interpretation is done here, other that consistency checking.
 *      The raw npen device returns 5 word samples that have
 *      the voltage values for the one pen, plus a button state
```

```
 *      threashold voltage.
 *
 * Word 0:      X plus
 *      1:     X minus
 *      2:     Y plus
 *      3:     Y minus
 *      4:     button threashold
 */
int
NpenReadSample(fd, buf)
    int fd;
    char *buf;

int nbytes, n;
    /*
     * 10 byte samples have 2 bytes for each of 5 voltages.
     * 7 bits of A/D output are in each byte.  The *last* byte
     * of the 10 has the 8th bit turned on as a trailing sync byte.
     */
#undef NUM_BYTES
#define NUM_BYTES       10
    nbytes = 0;
    while (nbytes < NUM_BYTES) {
        int readMask;

n = Select(fd, NULL);
        if (n == 0) {
            continue;
        }
        n = Read(fd, &buf[nbytes], NUM_BYTES-nbytes);
        if (n == 0) {
            continue;
        } else {
            nbytes += n;
        }
    }
    /*
     * Verify trailing sync bit.
     */
    if (buf[NUM_BYTES-1] & 0x80) {
        return 1;
    } else {
        return 0;
    }
}
/*
 * NpenConvert --
 *      Here is the device-specific conversion from the output of the
 *      A/D converter to voltage values.
 *      The A/D outputs are 14 bits.  They range in magnitude from
 *      0 to 16383, corresponding to voltage ranges of -10 to +10 volts.
 */
int
NpenConvert(buf, samplePtr)
    char *buf;
    Sample *samplePtr;
{
    /*
     * Each DSP word is two bytes, in order low, high.
     * 7 bits of voltage are in each byte.
     */
    samplePtr->xplus  = ((buf[1] & 0x7F) << 7) | (buf[0] & 0x7F);
    samplePtr->xminus = ((buf[3] & 0x7F) << 7) | (buf[2] & 0x7F);
    /*
     * Complementing the bits is negation of the 1's complement A/D output.
     */
    samplePtr->xplus  = ~(samplePtr->xplus)  & 0x3FFF;
    samplePtr->xminus = ~(samplePtr->xminus) & 0x3FFF;
    /*
     * Now scale the results so 0 volts is at 0, not 8192.
     * The plus voltage is negated so it is always positive.
     * The minus voltage can be left alone.
     */
    samplePtr->xminus = samplePtr->xminus - 8192;
    samplePtr->xplus  = -(samplePtr->xplus - 8192);
    /*
     * Repeat for Y
     */
    samplePtr->yplus  = ((buf[5] & 0x7F) << 7) | (buf[4] & 0x7F);
    samplePtr->yminus = ((buf[7] & 0x7F) << 7) | (buf[6] & 0x7F);

samplePtr->yplus  = ~(samplePtr->yplus)  & 0x3FFF;
    samplePtr->yminus = ~(samplePtr->yminus) & 0x3FFF;
```

```c
        samplePtr->yminus = samplePtr->yminus - 8192;
        samplePtr->yplus = -(samplePtr->yplus - 8192);
        /*
         * Convert and print threshold voltages returned in the last
         * part of the sample.
         */
        samplePtr->thresh = ((buf[9] & 0x7F) << 7) | (buf[8] & 0x7F);
        samplePtr->thresh = -samplePtr->thresh & 0x3FFF;
        samplePtr->thresh = samplePtr->thresh - 8192;

if (samplePtr->xplus < 400 || samplePtr->yplus < 400) {
            return 0;
        } else {
            return 1;
        }
}
/*
 * NpenButton --
 *      The thresh voltage has 4 baseline values that indicate 4 different
 *      button states.  They will drift a little around these baselines,
 *      plus they will move from one to the other when a button is
 *      pressed or released, so we could catch it somewhere in the middle.
 *      While the actual baselines may vary from device to device, the
 *      difference between the 4 voltages is quite steady.
 */
int
NpenButton(samplePtr)
    Sample *samplePtr;
{
#define DELTA           0.029
#define TOLERANCE       0.006
    int i;
    float delta;
    float thresh;
    float v;
    static FILE *debugFile = NULL;
    static float maxThresh = 0.0;
    static int state = 0;
    static int button[4] = { 0x4,      /* left, lowest voltage */
                             0x5,      /* right */
                             0x7,      /* middle */
                             0xF,      /* Tracking, highest voltage */
                           };

if (debugFile == NULL) {
        fprintf(stderr, "Logging button stuff to \"button-debug\"\n");
        debugFile = fopen("button-debug", "w");
    }
    thresh = (float)(samplePtr->thresh) / 819.2;
    if (npenTrackingVolts == 0) {
        /*
         * Deduce tracking voltage by watching for different values.
         */
        fprintf(debugFile, "Thresh? %.3f\n", thresh);
        if (thresh > maxThresh) {
            fprintf(debugFile, "Max\n");
            maxThresh = thresh;
            state = 0;
        }
        for (v = maxThresh - 3. * DELTA, i=0 ;
             i<4 ;
             v += DELTA, i++) { delta = thresh - v;
            if (delta < 0.) delta = -delta;

if (delta < TOLERANCE) {
                fprintf(debugFile, "State %d\n", i);
                state |= (1 << i);
            }
        }
        if (state == 0xF) {
            npenTrackingVolts = maxThresh;
            fprintf(stderr, "NpenButton: Tracking volts %.3f\n", maxThresh);
            fprintf(debugFile, "NpenButton: Tracking volts %.3f\n", maxThresh);
        }
    } else {
        fprintf(debugFile, "Thresh %.3f\t", thresh);
        for (v = npenTrackingVolts - 3. * DELTA, i=0 ;
             i<4 ;
             v += DELTA, i++) { delta = thresh - v;
            if (delta < 0.) delta = -delta;
```

```
                if (delta < TOLERANCE) {
                    fprintf(debugFile, "Button %x\n", button[i]);
                    return button[i];
                }
            }
            fprintf(debugFile, "(no button)\n");
        }
        return 0;
    }
    /*
     * NpenSync --
     *     Sync up by looking for a sync bit in the 8th bit of the *last*
     *     byte in a sample.  This should change, but lots of things expect
     *     to sync up on the last byte.  This works with the 11-byte output
     *     format of the raw sample..
     */
    int
    NpenSync(penFD)
        int penFD;
    {
        struct timeval timeout;
        int n;
        char c;

timeout.tv_sec = 1;
        timeout.tv_usec = 0;

Select(penFD, &timeout);
        n = Read(penFD, &c, 1);
        if ((c & 0x80) != 0x80) {   /* Sync bit in 8'th bit */
            return 0;
        } else {
            return 1;
        }
    }
    /*
     * Labels for output file
     */
    char *labels[] = {
        "left1",
        "right1",
        "middle1",
        "track1",
    };

/*
     * NpenPrint --
     *     Print out a raw sample for later post-processing.
     */
    NpenPrint(output, rawPtr, x, y)
        FILE *output;
        RawData *rawPtr;
        int x, y;
    {
        Sample *sPtr;
        float t;
        int s;

sPtr = &rawPtr->left1;
        for (s=0 ; s<4 ; s++) {
            fprintf(output, "%-8s ", labels[s]);
            NpenPrintOne(output, sPtr, x, y);
            sPtr--;
        }
    }
    /*
     * NpenPrintButtonVoltages --
     *     Print out the voltages that identify button states.
     */
    NpenPrintButtonVoltages(output, left_v, middle_v, right_v, tracking_v)
        FILE *output;
        unsigned int left_v, middle_v, right_v, tracking_v;
    {
        fprintf(output, "%-8s %d\n", "left1", left_v);
        fprintf(output, "%-8s %d\n", "middle1", middle_v);
        fprintf(output, "%-8s %d\n", "right1", right_v);
        fprintf(output, "%-8s %d\n", "track1", tracking_v);
    }
    /*
     * NpenReadButtonVoltages --
     *     Read out the voltages that identify button states.
     */
    NpenReadButtonVoltages(input, left_v, middle_v, right_v, tracking_v)
        FILE *input;
        unsigned int *left_v, *middle_v, *right_v, *tracking_v;
```

```
    int n;
    n = fscanf(input, "left1 %d\n", left_v);
    n = fscanf(input, "middle1 %d\n", middle_v);
    n = fscanf(input, "right1 %d\n", right_v);
    n = fscanf(input, "track1 %d\n", tracking_v);
    if (n != 1) {
        fprintf(stderr, "NpenReadButtonVoltages: bad input\n");
        return 0;
    } else {
        return 1;
    }
}
/*
 * NpenPrintOne
 */
NpenPrintOne(output, sPtr, x, y)
    FILE *output;
    Sample *sPtr;
{
    float t;

fprintf(output, "%6d %6d : ", x, y);
    fprintf(output, " %6d %6d %6d %6d %6d ",
        sPtr->xplus, sPtr->xminus,
        sPtr->yplus, sPtr->yminus,
        sPtr->thresh);
    /*
     * Really having a struggle printing negative floats
     */
    t = (float)sPtr->xminus / (float)sPtr->xplus ;
    if (sPtr->xminus < 0) {
        t = -t;
        fprintf(output, " -%.4f", t);
    } else {
        fprintf(output, " %.4f", t);
    }
    t = (float)sPtr->yminus / (float)sPtr->yplus ;
    if (sPtr->yminus < 0) {
        t = -t;
        fprintf(output, " -%.4f", t);
    } else {
        fprintf(output, " %.4f", t);
    }
    fprintf(output,"\n");
}
/*
 * NpenInitStats
 */
NpenInitStats(statPtr, state)
    DataStats *statPtr;
    int state;
{
    bzero(statPtr, sizeof(DataStats));
    statPtr->high.xplus = statPtr->high.xminus =
        statPtr->high.yplus = statPtr->high.yminus =
            statPtr->high.thresh = -8192;
    statPtr->low.xplus = statPtr->low.xminus =
        statPtr->low.yplus = statPtr->low.yminus =
            statPtr->low.thresh = 8192;
    statPtr->num = 0;
}
/*
 * NpenTakeOneStat
 */
NpenTakeOneStat(statPtr, samplePtr)
    DataStats *statPtr;
    Sample *samplePtr;
{
#define TakeStats(statPtr, cPtr, field) \
        statPtr->sum.field += (cPtr)->field ; \
        if ((cPtr)->field > statPtr->high.field) { \
            statPtr->high.field = (cPtr)->field; \
        } \
        if ((cPtr)->field < statPtr->low.field) { \
            statPtr->low.field = (cPtr)->field; \
        }
    statPtr->num++;
    TakeStats(statPtr, samplePtr, xplus);
    TakeStats(statPtr, samplePtr, xminus);
    TakeStats(statPtr, samplePtr, yplus);
    TakeStats(statPtr, samplePtr, yminus);
    TakeStats(statPtr, samplePtr, thresh);
}
```

```
/*
 * NpenSumStats
 */
NpenSumStats(statPtr)
    DataStats *statPtr;
{
#   define SumStats(statPtr, field) \
            (statPtr)->mean.field = \
                ((statPtr)->sum.field - \
                    statPtr->low.field - statPtr->high.field) / \
                ((statPtr)->num-2);

if (statPtr->num < 4) {
        fprintf(stderr, "NpenSumStats: too few points\n");
        exit(1);
    }
    SumStats(statPtr, xplus);
    SumStats(statPtr, xminus);
    SumStats(statPtr, yplus);
    SumStats(statPtr, yminus);
    SumStats(statPtr, thresh);
}
/*
 * NpenPrintVariance
 */
NpenPrintVariance(output, statPtr, samples, N)
    FILE *output;
    DataStats *statPtr;
    Sample *samples;
    int N;
{
    int i;
    double sqrt(), abs(), x, t;

#   undef SumStats
#   define SumStats(statPtr, field) \
            (statPtr)->mean.field = \
                ((statPtr)->sum.field) / ((statPtr)->num);

#   define SumVar(statPtr, samplePtr, field) \
            (statPtr)->variance.field += \
                (samplePtr)->field - (statPtr)->mean.field;

SumStats(statPtr, xplus);
    SumStats(statPtr, xminus);
    SumStats(statPtr, yplus);
    SumStats(statPtr, yminus);
    SumStats(statPtr, thresh);

for (i=0 ; i<N ; i++) {
        SumVar(statPtr, &samples[i], xplus);
        SumVar(statPtr, &samples[i], xminus);
        SumVar(statPtr, &samples[i], yplus);
        SumVar(statPtr, &samples[i], yminus);
        SumVar(statPtr, &samples[i], thresh);
    }
#define Variance(statPtr, field) \
        (double)(statPtr->variance.field) / (N - 1.)

#define PrintIt(statPtr, field) \
    x = Variance(statPtr, field); \
    if (x < 0.) x = -x ; \
    fprintf(output, "%-8s %5d %5d %5d %5.2f %5.2f %5.3f %5.5f\n", \
            "field", statPtr->low.field, statPtr->mean.field, \
            statPtr->high.field, x, sqrt(x), \
            t = (double)statPtr->mean.field / 819.2, \
            sqrt(x) / 819.2);

PrintIt(statPtr, xplus);
    PrintIt(statPtr, xminus);
    PrintIt(statPtr, yplus);
    PrintIt(statPtr, yminus);
    PrintIt(statPtr, thresh);
}
/*
 * NpenPrintStats --
 */
int
NpenPrintStats(output, statPtr)
    FILE *output;
    DataStats *statPtr; /* Array of statistics for each button state */
{
    Sample *sPtr;
    int s;
```

```
        printf("\n");
        for (s=0 ; s<4 ; s++, statPtr++) {
            NpenPrintOneStat(output, statPtr, labels[s]);
        }
}
/*
 * NpenPrintOneStat --
 */
NpenPrintOneStat(output, statPtr, label)
    FILE *output;
    DataStats *statPtr;
    char *label;
{
    fprintf(output, "%s %d samples\n", label, statPtr->num);
    fprintf(output, "\t%8s %8s %8s %8s %8s\n",
        "xplus", "xminus", "yplus", "yminus", "thresh");
#define PrintField(statPtr, output, field) \
    fprintf(output, "%8s %8d %8d %8d %8d\n", \
        "field", statPtr->field.xplus, statPtr->field.xminus, \
        statPtr->field.yplus, statPtr->field.yminus, statPtr->field.thresh);
    PrintField(statPtr, output, mean);
    PrintField(statPtr, output, high);
    PrintField(statPtr, output, low);
    PrintField(statPtr, output, sumsquare);
    PrintField(statPtr, output, variance);

printf("\n");
}
/*
 * Select --
 */
int
Select(fd, timeoutPtr)
    int fd;
    struct timeval *timeoutPtr;
{
    unsigned int readMask;
    int count;

readMask = 1 << fd;
    count = select(32, &readMask, NULL, NULL, timeoutPtr);
    if (count < 0) {
        perror("select failed");
        exit(1);
    } else if ((count == 0) && (timeoutPtr != NULL)) {
        fprintf(stderr, "Select timeout - is the pen on?\n");
        exit(1);
    }
    return count;
}
/*
 * Read --
 */
Read(fd, buf, count)
    int fd;
    char *buf;
    int count;
{
    int n;
    n = read (fd, buf, count);
    if (n < 0) {
        perror ("NpenRead");
        exit(1);
    }
    return n;
}
/*
 * FlushInput --
 */
int
FlushInput(fd)
    int fd;
{
    int count;
    char buf[1024];

for ( ; ; ) {
        /*
         * Discard pending input
         */
        ioctl (fd, FIONREAD, &count);
        if (count < 1)
            break;
        count = read (fd, buf, (count > sizeof(buf)) ? sizeof(buf) : count);
        if (count < sizeof(buf)) {
```

```
            break;
        }
    }
    return 1;
}
/*
 * NpenSync15Byte --
 *      Sync up by looking for the index byte of the last DSP word.
 *      The high byte has index in the top 4 bits and the button
 *      state in the low four bits.  The low and mid bytes capture
 *      the output from the 14-bit A/D converter.  The high byte is
 *      read last, so we look for the highest index byte.
 */
int
NpenSync15Byte(penFD)
    int penFD;
{
    struct timeval timeout;
    int n;
    char c;
    timeout.tv_sec = 1;
    timeout.tv_usec = 0;

Select(penFD, &timeout);
    n = Read(penFD, &c, 1);
    if ((c & 0xF0) != 0x40) {   /* 5 words in raw sample, 0 to 4 */
        return 0;
    } else {
        return 1;
    }
}
/*
 * NpenRead15ByteSample --
 *      Read one sample from the device into a raw buffer.
 *      No interpretation is done here, other that consistency checking.
 *      The raw npen device returns 5 word samples that have
 *      the voltage values for the one pen, plus a button state
 *      threashold voltage.  There are (were) 3 bytes per DSP word.
 *
 * Word 0:      X plus
 *      1:      X minus
 *      2:      Y plus
 *      3:      Y minus
 *      4:      button threashold
 */
int
NpenRead15ByteSample(fd, buf)
    int fd;
    char *buf;
{
    int nbytes, n;
    /*
     * A sample looks like this:
     * DSP word0: low, mid, high byte    XPLUS
     * DSP word1: low, mid, high byte    XMINUS
     * DSP word2: low, mid, high byte    YPLUS
     * DSP word3: low, mid, high byte    YMINUS
     */
#define NUM_BYTES       15
    nbytes = 0;
    while (nbytes < NUM_BYTES) {
        int readMask;

n = Select(fd, NULL);
        if (n == 0) {
            continue;
        }
        n = Read(fd, &buf[nbytes], NUM_BYTES-nbytes);
        if (n == 0) {
            continue;
        } else {
            int i;
            nbytes += n;
            /*
             * Verify that we are still synced up.  Each DSP word
             * has its own index in the high 4 bits of the high byte.
             */
            for (i=0 ; i<5 ; i++) {
                if (nbytes >= (i+1) * 3) {
                    if ((buf[i*3 +2] & 0xF0) != (i << 4)) {
                        return 0;
                    }
                }
            }
        }
```

```
        }
        return 1;
}
/*
 * NpenConvert15Byte --
 *      Here is the device-specific conversion from the output of the
 *      A/D converter to voltage values.
 *      The A/D outputs are 14 bits.  They range in magnitude from
 *      0 to 16383, corresponding to voltage ranges of -10 to +10 volts.
 */
int
NpenConvert15Byte(buf, samplePtr)
    char *buf;
    Sample *samplePtr;
{
    /*
     * Each DSP word is three bytes, in order low, mid, high.
     * The voltages are in the low 14 bits.
     * The high four bits of the high byte are a mux index.
     * The low four bits of the high byte are the button state.
     */
    samplePtr->xplus  = ((buf[1] & 0x3F) << 8) | (buf[0] & 0xFF);
    samplePtr->xminus = ((buf[4] & 0x3F) << 8) | (buf[3] & 0xFF);
    /*
     * Complementing the bits is negation of the 1's complement A/D output.
     */
    samplePtr->xplus  = ~(samplePtr->xplus)  & 0x3FFF;
    samplePtr->xminus = ~(samplePtr->xminus) & 0x3FFF;
    /*
     * Now scale the results so 0 volts is at 0, not 8192.
     * The plus voltage is negated so it is always positive.
     * The minus voltage can be left alone.
     */
    samplePtr->xminus = samplePtr->xminus - 8192;
    samplePtr->xplus  = -(samplePtr->xplus - 8192);
    /*
     * Repeat for Y
     */
    samplePtr->yplus  = ((buf[7]  & 0x3F) << 8) | (buf[6] & 0xFF);
    samplePtr->yminus = ((buf[10] & 0x3F) << 8) | (buf[9] & 0xFF);

samplePtr->yplus  = ~(samplePtr->yplus)  & 0x3FFF;
    samplePtr->yminus = ~(samplePtr->yminus) & 0x3FFF;

samplePtr->yminus = samplePtr->yminus - 8192;
    samplePtr->yplus  = -(samplePtr->yplus - 8192);
    /*
     * Convert and print threshold voltages returned in the upper
     * part of the sample.
     */
    samplePtr->thresh = ((buf[13] & 0x3F) << 8) | (buf[12] & 0xFF);
    samplePtr->thresh = ~samplePtr->thresh & 0x3FFF;
    samplePtr->thresh = samplePtr->thresh - 8192;

if (samplePtr->xplus < 400 || samplePtr->yplus < 400) {
        return 0;
    } else {
        return 1;
    }
}
/*
 * usage: table file gridsize screenwidth screenheight [verbose]
 *
 * reads data from file, writes a table on stdout.  It typically
 * takes several minutes to run.  The input file should have
 * lines of the format
 *
 *      screenx screeny penx peny
 *
 * and the x coordinate should vary fastest, that is, the first
 * few lines have the same screeny coord, but increasing screenx
 * coords.  The default for xpixels is 20, thus the table will be
 * 56 by 39 (for the hitachi display)
 */
#include <stdio.h>
#include <math.h>
#include "spline.h"

int verbose = 0;

int screenwidth;
int screenheight;

main(argc, argv)
    char **argv;
```

```c
{
    float x[MAXN], y[MAXM];
    float z1[MAXN][MAXM], z2[MAXN][MAXM];
    float b1[MAXN][MAXM], c1[MAXN][MAXM], d1[MAXN][MAXM];
    float b2[MAXN][MAXM], c2[MAXN][MAXM], d2[MAXN][MAXM];
    int n, m;
    int i, j;
    int res;
    float u, v, w1, w2, z;
    char *file;
    float z1min, z1max, z2min, z2max;
    float z1inc, z2inc;
    int nx, ny, xpixels, ypixels;

if (argc < 5) {
        fprintf(stderr, "Usage: %s file grid width height [verbose]\n", argv[0]);
        exit(1);
    }
    file = argv[1];
    ypixels = xpixels = atoi(argv[2]);
    screenwidth = atoi(argv[3]);
    screenheight = atoi(argv[4]);
    if (argc > 5)
            verbose = 1;
    /*
     * Return in x and y the cooridinates at the input grid points.
     * Return in z1 the X volts ratio at the input grid points.
     * Return in z2 the Y volts ratio at the input grid points.
     */
    readfile(file, &n, &m, x, y, z1, z2);
    nx = screenwidth/xpixels;
    ny = screenheight/ypixels;
    /* -1 in what follows because spline arrays are 1 based */
    if (n >= MAXN-1 || m >= MAXM-1) {
        fprintf(stderr, "(n=%d, m=%d) exceeds max of (%d,%d)\n",
                n, m, MAXN, MAXM);
        exit(1);
    }

/* get max, min values of z1, z2 */
    z1min = z2min = 1.0e10;
    z1max = z2max = -1.0e10;
    /*
     * Do a spline fit along columns in the Y direction,
     * computing the spline coefficients b1, c1, and d1 (for X volts)
     */
    spline2(n, m, x, y, z1, b1, c1, d1);
    spline2(n, m, x, y, z2, b2, c2, d2);
    /*
     * Evaluate the spline fit at each point on a grid, looking for max, min.
     */
    /* the increments in this search doesn't have to be xpixels */
    for (i = 0; i <= screenwidth; i += xpixels) {
        for (j = 0; j <= screenheight; j += ypixels) {
            u = i;
            v = j;
            w1 = seval2(n, m, u, v, x, y, z1, b1, c1, d1);
            w2 = seval2(n, m, u, v, x, y, z2, b2, c2, d2);
            if (w1 < z1min) z1min = w1;
            if (w1 > z1max) z1max = w1;
            if (w2 < z2min) z2min = w2;
            if (w2 > z2max) z2max = w2;
        }
    } z1inc = (z1max - z1min)/nx;
    z2inc = (z2max - z2min)/ny;
    printf("%f %f %d\n", z1min, z1max, nx);
    printf("%f %f %d\n", z2min, z2max, ny);
    /*
     * precompute determines how the sensor values change from + to -
     */
    precompute(n, m, b1, c1, d1, b2, c2, d2, x, y, z1, z2);
    /*
     * Now do the inserse of the spline fit.  We now have spline fits of
     * the voltages to a grid on the screen.  We need, instead, the values
     * of the X, Y for each point on a grid in sensor values.
     */
    for (i = 0; i <= nx; i++) {
        for (j = 0; j <= ny; j++) {
            w1 = z1min + z1inc*i;
            w2 = z2min + z2inc*j;
            invertit(&u, &v, w1, w2, n, m, b1, c1, d1, b2, c2, d2,
                    x, y, z1, z2);
            /* printf("F(%f %f) = (%f %f)\n", u, v, w1, w2);*/
```

```c
            printf("%d %d\n", irint(u), irint(v));
        }
        fflush(stdout);
    }
}
include <stdio.h>
#include "spline.h"

readfile(file, np, mp, xarr, yarr, zarr1, zarr2)
    char *file;
    int *np, *mp;
    float xarr[], yarr[];
    float zarr1[][MAXM], zarr2[][MAXM];
{
    int cnt, n, m, res;
    int xin[MAXPTS], yin[MAXPTS];
    int x[MAXPTS], y[MAXPTS];
    float fx[MAXPTS], fy[MAXPTS];
    int i, j, ii, jj;
    FILE *fp;

fp = fopen(file, "r");
    if (fp == NULL) {
        fprintf(stderr, "can't open %s\n", file);
        exit(1);
    } cnt = 0;
    while (1) {
        res = fscanf(fp, "%d %d %f %f", &xin[cnt], &yin[cnt], &fx[cnt],
                    &fy[cnt]);
        if (res == EOF) break;
        cnt++;
        if (cnt >= MAXPTS) {
            fprintf(stderr, "more than %d pts\n", MAXPTS);
            exit(1);
        }
    }

/* input coords in file are
     * (x[1], y[1]), (x[2], y[1]), ..., (x[n], y[1])
     * (x[1], y[2]), (x[2], y[2]), ..., (x[n], y[2])
     * ...
     * (x[1], y[m]), ...
     */

/*
     * Return in x and y the grid points found in the input, xin and yin.
     * n = 9, x[] = (0, 10, 87, 164, 241, 318, 395, 472, 549, 626.
     * m = 7, y[] = (0, 10, 86, 162, 238, 314, 390, 466)
     */
    n = gridvals(cnt, xin, x);
    m = gridvals(cnt, yin, y);

ii = jj = 1;
    for (i = 0; i < cnt; i++) {
        if (xin[i] != x[ii] || yin[i] != y[jj]) {
            fprintf(stderr, "input not in a regular grid\n");
            exit(1);
        }
        if (ii == n) {
            ii = 1;
            jj++;
            continue;
        }
        ii++;
    }
    *np = n;
    *mp = m;
    for (i = 1; i <= n; i++) {
        xarr[i] = x[i]; /* convert int to float */
    }
    for (j = 1; j <= m; j++) {
        yarr[j] = y[j]; /* convert int to float */
    }
    /*
     * Rearrange inputs into 2-D tables.
     * zarr1[] is the X volts ratio for the first column of input data points.
     * zarr2[] is the Y volts ratio for the first column ...
     */
    for (i = 1; i <= n; i++) {
        for (j = 1; j <= m; j++) {
            zarr1[i][j] = fx[(i-1) + (j-1)*n];
            zarr2[i][j] = fy[(i-1) + (j-1)*n];
```

```
        }
    }
} gridvals(n, xin, x)
    int xin[], x[];
{
    int k, i;

k = 1;
    x[k] = xin[0];
    for (i = 0; i < n; i++) {
        if (i > 0 && xin[i] < xin[i-1]) break;
        if (xin[i] != x[k]) {k++; x[k] = xin[i];}
    }
    return(k);
}
include <stdio.h>
#include "spline.h"

/* 2-d spline */

/*
 * x[i] 1 <= i <= n
 * y[j] 1 <= j <= m
 * z[i,j] = z(x[i], y[j])
 *
 *  z[1,1] z[1,2] z[1,3] ... z[1,m]
 *  z[2,1] z[2,2] z[2,3] ... z[2,m]
 *
 *  .....                    ....
 *
 *  z[n,1] z[n,2] z[n,3] ... z[n,m]
 *
 * first compute splines for each row.  Then take one pt from
 * each of these splines to compute a final spline
 */

/*
 * this call sets things up by initializing b,c,d.  These arrays
 * are then passed as arguments into seval2
 */ float
spline2(n, m, x, y, z, b, c, d)
    int n;       /* input is x[1] thru x[n] */
    float x[], y[]; /* input - coords at input data points */
    float z[][MAXM]; /* input - sensor values (X or Y) for input data points */
    float b[][MAXM], c[][MAXM], d[][MAXM]; /* output */
{
    int i;

/*
     * Each z[i] corresponds to a vertical column of input data.
     * Spline fit along the Y grid points.
     */
    for (i = 1; i <= n; i++) {
        spline1(m, y, z[i], b[i], c[i], d[i]);
    }
}

/*
 * Evaluate 2-d spline at the point (u,v).
 * x, y, z, b, c, d are values previously computed by spline2
 */
float
seval2(n, m, u, v, x, y, z, b, c, d)
    float u, v;
    float x[], y[];              /* Coordinates at input grid locations */
    float z[][MAXM];             /* Sensor values at input grid */
    float b[][MAXM], c[][MAXM], d[][MAXM];    /* Spline coefs */
{
    int i;
    float zz[MAXN], b1[MAXN], c1[MAXN], d1[MAXN];

for (i = 1; i <= n; i++) {
        zz[i] = seval1(m, v, y, z[i], b[i], c[i], d[i]);
    }
    spline1(n, x, zz, b1, c1, d1);
    return(seval1(n, u, x, zz, b1, c1, d1));
} include <stdio.h>
```

```c
/* 1-d spline */

/*
 * from "Computer Methods for Mathematical Computations"
 * by Forsythe, malcolm, moler
 */

/* return 0 if OK */ spline1(n, x, z, b, c, d)
    int n;          /* input is x[1] thru x[n] */
    float x[], z[]; /* input */
    float b[], c[], d[]; /* output */
{
    int nm1, i, ib;
    float t;

nm1 = n-1;
    if (n < 3) {fprintf(stderr, "too few pts\n"); return(1);}

/* setup tri-diagonal system */
    d[1] = x[2] - x[1];
    c[2] = (z[2] - z[1])/d[1];
    for (i = 2; i <= nm1; i++) {
        d[i] = x[i+1] - x[i];
        b[i] = 2.0*(d[i-1] + d[i]);
        c[i+1] = (z[i+1] - z[i])/d[i];
        c[i] = c[i+1] - c[i];
    }

/* end conditions:  use divided differences */
    b[1] = -d[1];
    b[n] = -d[n-1];
    c[1] = 0;
    c[n] = 0;
    c[1] = c[3]/(x[4] - x[2]) - c[2]/(x[3] - x[1]);
    c[n] = c[n-1]/(x[n] - x[n-2]) - c[n-2]/(x[n-1] - x[n-3]);
    c[1] = c[1]*d[1]*d[1]/(x[4] - x[1]);
    c[n] = -c[n]*d[n-1]*d[n-1]/(x[n] - x[n-3]);

/* forward elimination */
    for (i = 2; i <= n; i++) {
        t = d[i-1]/b[i-1];
        b[i] = b[i] - t*d[i-1];
        c[i] = c[i] - t*c[i-1];
    }

/* back substitution */
    c[n] = c[n]/b[n];
    for (ib = 1; ib <= nm1; ib++) {
        i = n - ib;
        c[i] = (c[i] - d[i]*c[i+1])/b[i];
    }

/* c[i] is sigma of text, compute poly coeffs */
    b[n] = (z[n] - z[nm1])/d[nm1] + d[nm1]*(c[nm1] + 2.0*c[n]);
    for (i = 1; i<=nm1; i++) {
        b[i] = (z[i+1] - z[i])/d[i] - d[i]*(c[i+1] + 2.0*c[i]);
        d[i] = (c[i+1] - c[i])/d[i];
        c[i] = 3.0*c[i];
    }
    c[n] = 3.0*c[n];
    d[n] = d[n-1];
    return(0);
}

/* evaluate spline at the value u */ float
seval1(n, u, x, z, b, c, d)
    float u;
    float x[], z[], b[], c[], d[];
{
    static int i = 1;
    float dx;
    int j, k;

if (i >= n) i = 1;
    if (u < x[i] || u > x[i+1]) {
        i = 1;
        j = n+1;
        do {
            k = (i+j)/2;
```

```
            if (u < x[k]) j = k;
            if (u >= x[k]) i = k;
        } while (j > i+1);

dx = u - x[i];
    return(z[i] + dx*(b[i] + dx*(c[i] + dx*d[i])));
} include <math.h>
include <stdio.h>
#include "spline.h"

define NOFFS 9 struct foo {
    float val;
    float offx, offy;
} dinit[NOFFS] = {      {0.0,   0.0,   0.0},
                        {0.0,   0.0,   1.0},
                        {0.0,   0.0,  -1.0},
                        {0.0,   1.0,   0.0},
                        {0.0,   1.0,   1.0},
                        {0.0,   1.0,  -1.0},
                        {0.0,  -1.0,   0.0},
                        {0.0,  -1.0,   1.0},
                        {0.0,  -1.0,  -1.0},
};

compar(p1, p2)
    struct foo *p1, *p2;
{
    if (p1->val > p2->val) return(1);
    else if (p1->val < p2->val) return(-11);
    else return(0);
} static int dir1, dir2; /* booleans */

/*
 * precompute directions dir1, dir2 for invertit.
 * These indicate the direction of + to - sensor values.
 */
precompute(n, m, b1, c1, d1, b2, c2, d2, x, y, z1, z2)
    float b1[][MAXM], c1[][MAXM], d1[][MAXM];
    float b2[][MAXM], c2[][MAXM], d2[][MAXM];
    float x[], y[];
    float z1[][MAXM], z2[][MAXM];
{
    float u, v;
    float uleft, uright, vtop, vbottom;
    float w1, w2;

uleft = 0;
    uright = screenwidth;
    vtop = 0;
    vbottom = screenheight;
    u = (uleft + uright)/2.0;
    v = (vtop + vbottom)/2.0;

w1 = seval2(n, m, uleft,  v, x, y, z1, b1, c1, d1);
    w2 = seval2(n, m, uright, v, x, y, z1, b1, c1, d1);
    if (w2 > w1)
        dir1 = 1;
    else
        dir1 = 0;

w1 = seval2(n, m, u, vbottom, x, y, z2, b2, c2, d2);
    w2 = seval2(n, m, u, vtop,    x, y, z2, b2, c2, d2);
    if (w2 > w1)
        dir2 = 1;
    else
        dir2 = 0;
}

/*
 * Compute the inverse of the spline functions. Given a point on a grid
 * in sensor values (i.e., lines of constant X volts ratio and lines of
 * constant Y volts ratio), determine the screen point that it corresponds to.
 *
 * The inputs are the sensor values on a grid in screen X and Y.
 * The outputs are the X, Y values on a grid in sensor values.
 *
 * want eval(u, v) to be (w1, w2)
 */
invertit(up, vp, w1, w2, n, m, b1, c1, d1, b2, c2, d2, x, y, z1, z2)
```

```
    float *up, *vp;              /* Results, screen X and Y */
    float w1, w2;                /* Inputs, sensor values */
    float b1[][MAXM], c1[][MAXM], d1[][MAXM];  /* Spline coefs for z1 (X) */
    float b2[][MAXM], c2[][MAXM], d2[][MAXM];  /* Spline coefs for z2 (Y) */
    float x[], y[];              /* Coordinates at spline grid points */
    float z1[][MAXM], z2[][MAXM];    /* Sensor values at spline grid points*/
{
    struct foo d[NOFFS];
    int i, cnt;
    float u, v;
    float uleft, uright, vtop, vbottom;
    float w1tmp, w2tmp;
    float ui, vi, w1p, w2p;
    float oldui, oldvi;
    int myhandler;

uleft = 0;
    uright = screenwidth;
    vtop = 0;
    vbottom = screenheight;

/* first use binary search */
    if (verbose)
        fprintf(stderr, "=> ");
    for (i = 0; i < 12; i++) {
        u = (uleft + uright)/2.0;
        v = (vtop + vbottom)/2.0;
        if (verbose)
            fprintf(stderr, "(%.1f %.1f) ", u, v);
        w1tmp = seval2(n, m, u, v, x, y, z1, b1, c1, d1);
        if ((w1tmp > w1 && dir1) || (w1tmp < w1 && !dir1))
            uright = u;
        else
            uleft = u;
        w2tmp = seval2(n, m, u, v, x, y, z2, b2, c2, d2);
        if ((w2tmp > w2 && dir2) || (w2tmp < w2 && !dir2))
            vtop = v;
        else
            vbottom = v;
    }
    if (verbose)
        fprintf(stderr, "\n");

/* then hill climbing */
    ui = rint(u);
    vi = rint(v);
    oldui = oldvi = -200.0;  /* any negative number will do */
    cnt = 0; /* for monitoring performance */
    if (verbose)
        fprintf(stderr, "==> ");
    while (1) {
        if (verbose)
            fprintf(stderr, "(%d %d) ", irint(ui), irint(vi));
        for (i = 0; i < NOFFS; i++) {
            d[i] = dinit[i];
            w1p = seval2(n, m, ui + d[i].offx, vi+d[i].offy,
                    x, y, z1, b1, c1, d1);
            w2p = seval2(n, m, ui+d[i].offx, vi+d[i].offy,
                    x, y, z2, b2, c2, d2);
            d[i].val = fabs(w1p - w1) + fabs(w2p - w2);
        }
        qsort(d, NOFFS, sizeof(struct foo), compar);
        cnt++;
        ui = ui + d[0].offx;
        vi = vi + d[0].offy;

/* now a special test to see if we ran off the end of the screen */
#ifdef notdef
        /*
         * Actually it is good for the screen values on the boundary lines to
         * be off screen.  This way the linear interpolation between the
         * lines of constant voltage will correctly map to screen coordinates
         * near the edge.
         */
        if (ui < 0)
            ui = 0.0;
        if (ui > screenwidth)
            ui = screenwidth;
        if (vi < 0)
            vi = 0.0;
        if (vi > screenheight)
            vi = screenheight;
#endif
```

```
            if (oldui == ui && oldvi == vi) {
                break;
            }
            oldui = ui;
            oldvi = vi;
        }
        if (verbose)
            fprintf(stderr, "\n");
        *up = ui;
        *vp = vi;
    } define MAXN  20
define MAXM  16
define MAXPTS 300 extern int screenwidth;
extern int screenheight;

float seval1(), seval2();

int verbose;

#include <stdio.h>
#include <math.h>

/*
 * delta
 *
 *      takes calibration-data on stdin, write compressed (binary)
 *      file on stdout.  Use undelta to reverse process
 */
int verbose;

main(argc, argv)
    char **argv;
{
    int i, j;
    float minx, maxx, miny, maxy;
    float xvolts, yvolts, xinc, yinc;
    short nx, ny;
    int arrx[500], arry[500];

verbose = argc > 1;

scanf("%f %f %hd\n", &minx, &maxx, &nx);

fwrite(&minx, 1, sizeof(float), stdout);
    fwrite(&maxx, 1, sizeof(float), stdout);
    fwrite(&nx, 1, sizeof(short), stdout);

xinc = (maxx - minx) / nx;

scanf("%f %f %hd\n", &miny, &maxy, &ny);

fwrite(&miny, 1, sizeof(float), stdout);
    fwrite(&maxy, 1, sizeof(float), stdout);
    fwrite(&ny, 1, sizeof(short), stdout);

yinc = (maxy - miny) / ny;

for (j = 0, xvolts=minx; j <= nx; j++, xvolts += xinc) {
        for (i = 0; i <= ny; i++) {
            if (scanf("%d %d", &arrx[i], &arry[i]) != 2) {
                fprintf(stderr, "Help! %d %d\n", i, j);
                exit(1);
            }
        }
        if (verbose) {
            fprintf(stderr, "Xvolts = %.3f I = %d, X: ", xvolts, j);
        }
        zz(arrx, ny);
        if (verbose) {
            fprintf(stderr, " Y: ");
        }
        zz(arry, ny);
        if (verbose) {
            fprintf(stderr, "\n");
        }
    }
} zz(arr, n)
    int arr[];
{
```

```
    int i;
    char bits, bits2;
    char *mem;
    int ln;
    int delta, maxdelta, mindelta;
    short shortbuf;
    char charbuf;
    mindelta = 1000;
    maxdelta = -1000;
    for (i = 1; i <= n; i++) {
        delta = arr[i] - arr[i-1];
        if (delta < mindelta) mindelta = delta;
        if (delta > maxdelta) maxdelta = delta;
    }
    shortbuf = arr[0];
    fwrite(&shortbuf, 1, sizeof(short), stdout);
    charbuf = -mindelta;
    fwrite(&charbuf, 1, sizeof(char), stdout);
    bits = nbits(maxdelta - mindelta);
    bits2 = nbits(-mindelta);
    if (bits2 > bits) {
        bits = bits2;
    }
    /*
     * Special hack to ease alignment into DSP 24 bit words.  Bit slices
     * of size 1, 2, 3, 4, 6, and 8 fit nicely, so 5 and 7 are rounded up.
     * Screens with big pixels (i.e., VGA) often have deltas larger
     * that 8 bits, so we have to allow for that, too.
     */
    if (bits == 5) bits = 6;
    if (bits == 7) bits = 8;
    if (bits > 12) {
        fprintf(stderr, "delta: bits %d too big\n", bits);
        exit(1);
    }
    fwrite(&bits, 1, sizeof(char), stdout);
    /* XXX: should use mmap */
    ln = (bits*(n+1) + 7)/8;
    mem = (char *)malloc(ln);
    /*
     * Pack mindelta into the zero'th slice so an algorithm that starts
     * at zero (not one) will correctly compute the zero'th row element value.
     * The undelta program ignores this slice, but the DSP program uses it.
     */
    pack(mem, 0, bits, -mindelta);
    if (verbose) {
        fprintf(stderr, "mindel %d maxdel %d bits %d len %d",
                mindelta, maxdelta, bits, ln);
    }
    for (i = 1; i <= n; i++) {
        delta = arr[i] - arr[i-1] - mindelta;
        pack(mem, i*bits, bits, delta);
    }
    fwrite(mem, 1, ln, stdout);
}

/* pack the ln bit quantity in p starting at bit offset 'start' */
pack(p, start, ln, val)
        char *p;
{
    int i;

for (i = 0; i < ln ; i++) {
        set(p, start + i, (val >> (ln - i - 1))&1);
    }
}

/* set the i-th bit of p to val */
int mask[8] = {0x80, 0x40, 0x20, 0x10, 0x08, 0x04, 0x02, 0x01};
set(p, i, val)
      char *p;
{
    int n;

n = i/8;
    if (val)
        p[n] = p[n] | mask[i%8];
    else
        p[n] = p[n] & (~mask[i%8]);
}

/* return nbits need to represent numbers <= x */
nbits(x)
{
    int cnt;
```

```c
        cnt = 0;
        while (xi != 0) {xi = xi >>1; cnt++;}
        return(cnt);
    }
    #include <stdio.h>

/*
     * read in file written by delta on stdin, write a standard
     * calibration-data file on stdout
     */
    int verbose;

main(argc, argv)
        char **argv;
    {
        float minx, maxx, miny, maxy;
        short nx, ny;
        int i, j;
        int arrx[500], arry[500];

verbose = argc > 1;

fread(&minx, sizeof(float), 1, stdin);
        fread(&maxx, sizeof(float), 1, stdin);
        fread(&nx, sizeof(short), 1, stdin);
        printf("%f %f %d\n", minx, maxx, nx);

fread(&miny, sizeof(float), 1, stdin);
        fread(&maxy, sizeof(float), 1, stdin);
        fread(&ny, sizeof(short), 1, stdin);
        printf("%f %f %d\n", miny, maxy, ny);

for (j = 0; j <= nx; j++) {
            zz(arrx, ny);
            zz(arry, ny);
            for (i = 0; i <= ny; i++) {
                printf("%d %d\n", arrx[i], arry[i]);
            }
        }
    } zz(arr, n)
        int arr[];
    {
        int i, d;
        char bits;
        int ln;
        char *mem;
        short first;
        char mindelta1;
        int mindelta;

fread(&first, 1, sizeof(short), stdin);
        fread(&mindelta1, 1, sizeof(char), stdin);
        mindelta = -mindelta1;
        fread(&bits, 1, sizeof(char), stdin);
        ln = (bits*(n+1) - 1)/8;
        mem = (char *)malloc(ln);
        fread(mem, 1, ln, stdin);

arr[0] = first;
        for (i = 1; i <= n; i++) {
            d = unpack(mem, i*bits, bits);
            arr[i]  arr[i-1] + (d + mindelta);
        }
    }

/*
     * unpack the ln bit quantity in p starting at 'start'
     */
    unpack(p, start, ln)
        char *p;
    {
        int i;
        int val, val1;

val = 0;
        for (i = 0; i < ln ; i++) {
            val1 = get(p, start - i);
            if (val1)
                val |= (1 << ln - i - 1);
        }
        return(val);
    }
```

```c
/* get the i-th bit of p to val */
int mask[8] = {0x80, 0x40, 0x20, 0x10, 0x08, 0x04, 0x02, 0x01};
get(p, i)
    char *p;
{
    int n;

n = i/8;
    return(p[n] & mask[i%8]);
}
/*
 * npensetup.c --
 *
 *     Program  wnload the configuration tables to the DSP device.
 *
 *     This merges the functionality of the bootstrap program and mpen_setup.c
 *
 * Copywrite 1992 Xerox Corp.  All rights reserved.
 */
#include <stdio.h>
#include <stdlib.h>
#include <string.h>
#include <errno.h>
#include <termios.h>
#include <sys/file.h>
#include <sys/time.h>
include <sundev/vuid_event.h> include "serial.h"
include "comptable.h"
#include "npenFiles.h"
/*
 * After downloading we can JMP or JSR to a routine.
 */
int JmpAddr = -1;
int JsrAddr = -1;
/*
 * For future stuff with multi-pens.
 */
int multi = 0;

unsigned int FloatToFractional();

main(argc, argv)
    int argc;
    char *argv[];
{
    struct termios term;
    int fd;
    char *file = NULL;
    Segment *segPtr;
    char *arg;

fd = DspOpen("/dev/ttyb");
    if (fd < 0) {
        exit(1);
    }

/*
     * Loop through arguments, taking action in the order specified.
     */
    for (argc--, argv++; argc > 0 ; argc--, argv++) {
        arg = argv[0];
        if (arg[0] != '-') {
            segPtr = DspParseFile(arg);
            WacomReset(fd, 1);
            DspDownload(fd, segPtr, 0);
            DownloadVersion(fd, arg);
        } else if (strcmp(arg, "-jsr") == 0) {
            if (argc > 1) {
                JsrAddr = strtol(argv[1], (char **)NULL, 0);
                argc--, argv++;
                DspJsr(fd, JsrAddr);
            }
        } else if (strcmp(arg, "-jmp") == 0) {
            if (argc > 1) {
                JmpAddr = strtol(argv[1], (char **)NULL, 0);
                argc--, argv++;
                DspJmp(fd, JmpAddr);
            }
        } else if (strcmp(arg, "-poke") == 0) {
            DspPoke(fd, 1);
        } else if (strcmp(arg, "-break") == 0) {
            DspBreak(fd);
```

```
            , printf("sent break\n");
        } else if (strcmp(arg, "-reset") == 0) {
            WacomReset(fd, 1);
            printf("ok\n");
        } else if (strcmp(arg, "-crash") == 0) {
            DspCrash(fd);
        } else if (strcmp(arg, "-jitter") == 0) {
            DownloadJitterTable(fd);
        } else if (strcmp(arg, "-jitter2") == 0) {
            DownloadSevereJitterTable(fd);
        } else if (strcmp(arg, "-directory") == 0) {
            if (argc <= 1) {
                fprintf(stderr, "-directory option needs pathname argument\n");
            } else {
                LoadAll(fd, argv[1]);
                argc--, argv++;
            }
        } else if (strcmp(arg, "-buttons") == 0) {
            if (argc <= 1) {
                fprintf(stderr, "-buttons option needs pathname argument\n");
            } else {
                if (chdir(argv[1]) < 0) {
                } else {
                    LoadAllNorms(fd, BUTTON_FILE, NORM_FILE, THRESH_FILE, 0);
                }
                argc--, argv++;
            }
        } else if (strcmp(arg, "-sleep") == 0) {
            if (argc > 1) {
                double time, atof();
                time = atof(argv[1], (char **)NULL, 0);
                argc--, argv++;
                Sleep(time);
            }
        } else if (arg[0] == '-') {
            /*
             * Treat argument as a Wacom-style command and feed it to
             * the device.
             */
            WacomCmd(fd, &arg[1]);
        }
    }
    exit(0);
}
/*
 * WacomCmd --
 *      Stuff a command string at the device.
 */
WacomCmd(serial, string)
    int serial;
    char *string;       /* Command string */
{
    char *newstr;
    int len = strlen(string);

newstr = (char *)malloc(len+1);
    strcpy(newstr, string);
    newstr[len] = '\015';
    WriteSerial(serial, newstr, len+1);
}
/*
 * WacomReset --
 *      Bring the device into bootstrapping state.
 */
WacomReset(serial, print)
    int serial;
    int print;
{
    int ok, pokes;
    ok = 0;
    for (pokes=0 ; !ok && pokes < 8 ; pokes++) {
        switch(DspPoke(serial, print)) {
            case POKE_BOOT:
                ok = 1;
                break;  /* Ready for downloading */
            case POKE_IDLE: {
                char buf[100];
                WacomCmd(serial, "!");
                ReadSerial(serial, buf, 100);
                break;
            }
            case POKE_FAILED:
            case POKE_ACTIVE:
                WacomCmd(serial, "SP");
                DspFlush(serial);
```

```c
            sleep(1);
            break;
        }
    }
    if (!ok) {
        fprintf(stderr, "Cannot reset pen device\n");
        exit(1);
    }
}
/*
 * DspBonk --
 *      Experimental routine to blast lots of stuff at the device.
 *      It has an 80 character input buffer that wraps around on itself.
 *      The reset command is written in such a way that evenutally it will
 *      wind up in the position examined by the input handler.
 */
DspBonk(serial)
    int serial;
{
    char *newstr;
    int i;

newstr = (char *)malloc(160);
    for (i=0 ; i<84 ;) {
        int y;
        for (y=i; y<i+5 ; y++) {
            newstr[i] = '\015';        /* Command delimiter */
        }
        i += 5;
        for (y=i; y<i+6 ; y++) {
            newstr[i] = '\041';        /* '!' - reset command */
        }
        i += 6;
    }
    WriteSerial(serial, newstr, 84);
    free(newstr);
}
/*
 * LoadAll --
 *      Load all parameters onto the DSP board.
 */
int
LoadAll(serial, directory)
    int serial;         /* I/O descriptor for serial line */
    char *directory;    /* Directory containing tables */
{
    int dspAddr;
    int t;

if (chdir(directory) < 0) {
        fprintf(stderr, "Can't chdir to ");
        perror(directory);
        exit(1);
    }
    if (multi) {
        char tableFile[128];
        char buttonFile[128];
        char normFile[128];
        char threshFile[128];
        char digit[3];
        digit[0] = '.';
        digit[2] = '\0';
        for (t=1 ; t<=3 ; t++) {
            int tmpAddr;
            digit[1] = '0' + t;
            strcpy(tableFile, TABLE_FILE);
            strcat(tableFile, digit);
            strcpy(normFile, NORM_FILE);
            strcat(normFile, digit);
            strcpy(buttonFile, BUTTON_FILE);
            strcat(buttonFile, digit);
            strcpy(threshFile, THRESH_FILE);
            strcat(threshFile, digit);
            tmpAddr = LoadTable(serial, tableFile, t);
            if (tmpAddr > 0) {
                LoadAllNorms(serial, buttonFile, normFile, threshFile, t);
                dspAddr = tmpAddr;
            }
        }
    } else {
        dspAddr = LoadTable(serial, TABLE_FILE, 0);
        LoadAllNorms(serial, BUTTON_FILE, NORM_FILE, THRESH_FILE, 0);
    }
    return dspAddr;
}
```

```c
}
/*
 * LoadTable --
 *      Load the compressed conversion table onto the DSP.  There are three
 *      tables.  The 3 table headers are kept in an array.  The rows are
 *      variable sized so a free pointer is maintained.  The actual address
 *      of the first row of each table is written into a well known place.
 */
int
LoadTable(serial, tablefile, pen)
        int serial;             /* I/O descriptor for serial line */
        char *tablefile;
        int pen;                /* 1, 2, 3 - indexed at 1 for human readability */
{
    FILE *fp;
    float Xmin, Xmax, Ymin, Ymax;
    short width, height;
    short first;
    char mindelta;
    char bits;
    int DSPaddr;
    static freeRow1 = 0;
    unsigned int data;
    int j, b;
    int numBytes;
    int numWords;
    int single = 0;
    int ok, pokes;
    char words[256];

if (pen == 0) {
        /* Single pen device - optimize some placements */
        pen = 1;
        single = 1;
    }
    fp = fopen(tablefile, "r");
    if (fp == NULL) {
        perror(tablefile);
        return 0;
    }
    /*
     * Bonk the DSP program, flushing any pending output.  This gets the
     * device into a state where we can download new tables.
     */
    WacomReset(serial, 0);
    printf("Table \"%s\" ...", tablefile); fflush(stdout);

fread(&Xmin, sizeof(float), 1, fp);
    fread(&Xmax, sizeof(float), 1, fp);
    fread(&width, sizeof(short), 1, fp);

fread(&Ymin, sizeof(float), 1, fp);
    fread(&Ymax, sizeof(float), 1, fp);
    fread(&height, sizeof(short), 1, fp);

if (width+1 >= PEN_CORR_WIDTH ||
        height+1 >= PEN_CORR_HEIGHT) {
        fprintf(stderr, "table \"%s\" <%d,%d> too big, max is <%d,%d>\n",
                tablefile,
                width, height,
                PEN_CORR_WIDTH, PEN_CORR_HEIGHT);
        exit(1);
    } define DSP_PUT_Y(serial, addr, data) \
    if (DspPutY(serial, addr, data) <= 0) { \
        fprintf(stderr, "DspPutY(dsp, %x, %x) failed\n", addr, data); \
        exit(1); \
    }
    /*
     * Download a tiny table that maps from NUMBITS to SLICES per DSP word.
     */
    DSPaddr = MPEN_SLICE_ADDR;
    data = 0;                           /* SLICE[0] = 0, not used */
    DSP_PUT_Y(serial, DSPaddr++, data);
    data = 24;                          /* SLICE[1] = 24 */
    DSP_PUT_Y(serial, DSPaddr++, data);
    data = 12;                          /* SLICE[2] = 12 */
    DSP_PUT_Y(serial, DSPaddr++, data);
    data = 8;                           /* SLICE[3] = 8 */
    DSP_PUT_Y(serial, DSPaddr++, data);
    data = 6;                           /* SLICE[4] = 6 */
    DSP_PUT_Y(serial, DSPaddr++, data);
    data = 0;                           /* SLICE[5] = 0, not used */
    DSP_PUT_Y(serial, DSPaddr++, data);
```

```
    data = 4;                              /* SLICE[6] = 4 */
    DSP_PUT_Y(serial, DSPaddr++, data);
    data = 0;                              /* SLICE[7] = 0, not used */
    DSP_PUT_Y(serial, DSPaddr++, data);
    data = 3;                              /* SLICE[8] = 3 */
    DSP_PUT_Y(serial, DSPaddr++, data);
    data = 2;                              /* SLICE[9] = 2 */
    DSP_PUT_Y(serial, DSPaddr++, data);
    data = 2;                              /* SLICE[10] = 2 */
    DSP_PUT_Y(serial, DSPaddr++, data);
    data = 2;                              /* SLICE[11] = 2 */
    DSP_PUT_Y(serial, DSPaddr++, data);
    data = 2;                              /* SLICE[12] = 2 */
    DSP_PUT_Y(serial, DSPaddr++, data);

DownloadJitterTable(serial);
    /*
     * Download the primary conversion table.
     */
    if (single) {
        DSPaddr = MPEN_TABLE;
    } else {
        DSPaddr = MPEN_TABLE_ADDR + (pen-1) * MPEN_TABLE_HDR_SIZE;
    }
    data = FloatToFractional(Xmin, 1);
    DSP_PUT_Y(serial, DSPaddr++, data);
    data = FloatToFractional(Xmax, 1);
    DSP_PUT_Y(serial, DSPaddr++, data);
    data = FloatToFractional((Xmax - Xmin)/width, 1);
    DSP_PUT_Y(serial, DSPaddr++, data);
    data = FloatToFractional(Ymin, 1);
    DSP_PUT_Y(serial, DSPaddr++, data);
    data = FloatToFractional(Ymax, 1);
    DSP_PUT_Y(serial, DSPaddr++, data);
    data = FloatToFractional((Ymax - Ymin)/height, 1);
    DSP_PUT_Y(serial, DSPaddr++, data);
    data = width + 1;
    DSP_PUT_Y(serial, DSPaddr++, data);
    data = height + 1;
    DSP_PUT_Y(serial, DSPaddr++, data);

/*
     * Choose location for the table rows and save a pointer to them.
     */
    if (freeRow1 == 0) {
        DSPaddr = MPEN_ROW_1_FREE;
    } else {
        DSPaddr = freeRow1;
    }
    if (single) {
        DSP_PUT_Y(serial, MPEN_ROW_1, DSPaddr);
    } else {
        DSP_PUT_Y(serial, MPEN_ROW_1_P + pen-1, DSPaddr);
    }

/*
     * Download each row
     */
    printf("\n");
    for (j = 0; j < 2*(width+1); j++) {
        fread(&first, 1, sizeof(short), fp);
        fread(&mindelta, 1, sizeof(char), fp);
        fread(&bits, 1, sizeof(char), fp);
        if (bits == 5 || bits == 7 || bits > 12) {
            fprintf(stderr, "Bit slice odd size %d - setup broken\n", bits);
        }
        numBytes = (bits*(height+1) + 7)/8;
        numWords = (numBytes + 2)/3;       /* round up */
        numWords += 3;                     /* account for header */
        DSP_PUT_Y(serial, DSPaddr++, numWords);

DSP_PUT_Y(serial, DSPaddr++, first);

data = mindelta << 16 | bits;
        DSP_PUT_Y(serial, DSPaddr++, data);

fread(words, 1, numBytes, fp);
        bzero(&words[numBytes], 256-numBytes);  /* Ensure zeros at end */ for (b=0 ; b<numBytes ; b += 3) {
            data = (words[b] & 0xff)    << 16 |
                   (words[b+1] & 0xff) << 8 |
                   (words[b+2] & 0xff);
```

```
            data = Repack(data, bits);
            DSP_PUT_Y(serial, DSPaddr++, data);
        }
        printf("%c", '0' + (j % 10)); fflush(stdout);
    }
    printf(" <%x DSP words>\n", DSPaddr);
    freeRow1 = DSPaddr + 1;
    return DSPaddr ;
}
/*
 * DownloadJitterTable
 */
DownloadJitterTable(serial)
    int serial;
{
    unsigned int DSPaddr;
    int j;

WacomReset(serial, 1);
    /*
     * Download the jitter smoothing table.
     * DELTA:  0 1 2 3 4 5 6 7 8 9 10 11 12 13 14 15 16 17 18
     * ACTUAL: 0 0 1 1 2 3 4 5 6 8 9  10 11 12 13 14 15 16 18
     *
     * So, if the last, smoothed point we reported was at X=10
     * and the device now reports that X=13, then the delta is 3
     * and the smoothed delta is Jitter[3] = 1. We report X=11.
     * If the next device report is X=15, then delta is 5, we report X=14
     */
    DSPaddr = MPEN_JITTER_ADDR;
    for (j=0 ; j<2 ; j++) {
        DSP_PUT_Y(serial, DSPaddr++, 0);         /* Jitter[0] = Jitter[1] = 0 */
    }
    for (j=2 ; j<4 ; j++) {
        DSP_PUT_Y(serial, DSPaddr++, 1);         /* Jitter[2] = Jitter[3] = 1 */
    }
    for (j=4 ; j<9 ; j++) {
        DSP_PUT_Y(serial, DSPaddr++, j-2);       /* Jitter[4-8] = Delta - 2 */
    }
    for (j=9 ; j<18 ; j++) {
        DSP_PUT_Y(serial, DSPaddr++, j-1);       /* Jitter[9-17] = Delta - 1 */
    }
    DSP_PUT_Y(serial, DSPaddr++, 18);            /* Jitter[18->] = Delta */
}
/*
 * DownloadSevereJitterTable
 */
DownloadSevereJitterTable(serial)
    int serial;
{
    unsigned int DSPaddr;
    int j;

WacomReset(serial, 1);
    /*
     * Download the jitter smoothing table.
     * DELTA:  0 1 2 3 4 5 6 7 8 9 10 11 12 13 14 15 16 17 18
     * ACTUAL: 0 0 0 1 1 2 3 4 6 8 9  10 11 12 13 14 15 16 18
     *
     */
    DSPaddr = MPEN_JITTER_ADDR;
    for (j=0 ; j<3 ; j++) {
        DSP_PUT_Y(serial, DSPaddr++, 0);
    }
    for (j=3 ; j<5 ; j++) {
        DSP_PUT_Y(serial, DSPaddr++, 1);
    }
    for (j=5 ; j<8 ; j++) {
        DSP_PUT_Y(serial, DSPaddr++, j-3);
    }
    for (j=8 ; j<14 ; j++) {
        DSP_PUT_Y(serial, DSPaddr++, j-2);
    }
    for (j=14 ; j<18 ; j++) {
        DSP_PUT_Y(serial, DSPaddr++, j-1);
    }
    DSP_PUT_Y(serial, DSPaddr++, 18);            /* Jitter[18->] = Delta */
}
/*
 * DownloadVersion --
 *      Store a version string in DSP memory so it is aligned for output later.
 */
DownloadVersion(serial, filename)
```

```c
    int serial;
    char *filename;
{
    char *newstr;
    int len;
    int extra, i;
    char *cPtr, *buf;
    unsigned int word;
    unsigned int DSPaddr;
    struct stat statBuf;
    struct tm *tmPtr;

/*
     * Get date stamp.
     */
    if (stat(filename, &statBuf) < 0) {
        perror(filename);
        exit(1);
    }
    tmPtr = localtime(&statBuf.st_mtime);
    /*
     * Trim .lod off of file name.
     */
    cPtr = strstr(filename, ".lod");
    if (cPtr != NULL) {
        *cPtr = '\0';
    }
    /*
     * Reduce to the last pathname component.
     */
    cPtr = strrchr(filename, '/');
    if (cPtr != NULL) {
        filename = cPtr + 1;
    } len = strlen(filename);
    len += strlen(" MM/DD/YY");
    /*
     * Round length up to multiple of 3 bytes and null pad it.
     */
    extra = len % 3;
    len += (3 - extra);
    newstr = (char *)malloc(len);
    bzero(newstr, len);
    sprintf(newstr, "%s %d/%d/%d", filename,
        tmPtr->tm_mon+1, tmPtr->tm_mday, tmPtr->tm_year);
    if (len > 24) {
        fprintf(stderr, "Version string length %d > 24 \"%s\"\n",
            len, newstr);
        exit(1);
    }
    /*
     * Compute DSP address so the string end at address XXX7.
     */
    DSPaddr = (MPEN_VRS_STRING_MAX - len) / 3 + MPEN_VRS_STRING_BASE;

DSP_PUT_Y(serial, MPEN_VRS_STRING_PTR, DSPaddr);
    for (i=0 ; i<len ; i+= 3) {
        word = (newstr[i+2] << 16) | (newstr[i+1] << 8) | newstr[i];
        DSP_PUT_Y(serial, DSPaddr++, word);      /* Store string */
    }
}
/*
 * Repack --
 *      Rearrange the _ slices in a 24 bit word. This works well if
 *      the number of bits in each slice is 1, 2, 3, or 4.
 */
int
Repack(data, bits)
    unsigned int data;
    int bits;
{
    unsigned int newdata = 0;
    unsigned int mask = (1 << bits) - 1;
    int numSlices = 24 / bits;
    int slice;
    int Lshift = 24 - bits;
    int Rshift = 0;

for (slice=0 ; slice<numSlices ; slice--) {
        newdata |= ((data & mask) >> Rshift) << Lshift;
        mask = (mask << bits) & ~mask;
        Lshift -= bits;
        Rshift += bits;
    }
    return newdata;
}
```

```
/*
 * LoadAllNorms --
 *      Load the button normalization factors from a file.  This routine
 *      combines the general and button-specific normalization factors as
 *      it loads them in order to save the DSP an extra division.
 *      It also converts the floating point values to
 *      DSP fractions, scaling by 1/2 to guarantee that the factors range
 *      between -1 and +1.
 */
LoadAllNorms(serial, buttonFile, normFile, threshFile, pen)
    int serial;
    char *buttonFile;
    char *normFile;
    char *threshFile;
    int pen;
{
    FILE *fp;
    int s;
    float gen_x, gen_y;
    float x, y;
    int single = 0;              /* Single pen setup ? */
    unsigned int data;
    unsigned int DSPaddr;

fp = fopen(normFile, "r");
    if (fp == NULL) {
        perror(normFile);
        return;
    }
    if (pen == 0) {
        single = 1;
        pen = 1;
    }
    /*
     * It is well known that the normalization factors are stored as
     * General  X, Y
     * Left     X, Y
     * Middle   X, Y
     * Right    X, Y
     */ s = fscanf(fp, "%f\n%f", &gen_x, &gen_y);
    if (s != 2) {
        fprintf(stderr, "%s: garbled <x, y> for general normalization\n",
                normFile);
        return;
    }
    if (single) {
        /*
         * Load the factors directly into working memory.
         */
        DSPaddr = MPEN_NORM;
    } else {
        /*
         * Load the factors into the array.
         */
        DSPaddr = MPEN_NORM_ADDR + (pen-1) * MPEN_NORM_SIZE;
    }
    data = FloatToFractional(gen_x, 1);
    DspPutY(serial, DSPaddr++, data);
    data = FloatToFractional(gen_y, 1);
    DspPutY(serial, DSPaddr++, data);

fp = fopen(buttonFile, "r");
    if (fp == NULL) {
        perror(buttonFile);
        return;
    }
    s = fscanf(fp, "%f\n%f", &x, &y);
    if (s != 2) {
        fprintf(stderr, "%s: garbled <x, y> for Left button\n", buttonFile);
        return;
    }
    data = FloatToFractional(x * gen_x, 1);
    DspPutY(serial, DSPaddr++, data);
    data = FloatToFractional(y * gen_y, 1);
    DspPutY(serial, DSPaddr++, data);

s = fscanf(fp, "%f\n%f", &x, &y);
    if (s != 2) {
        fprintf(stderr, "%s: garbled <x, y> for Middle button\n", buttonFile);
        return;
    }
    data = FloatToFractional(x * gen_x, 1);
    DspPutY(serial, DSPaddr++, data);
```

```c
        data = FloatToFractional(y * gen_y, 1);
        DspPutY(serial, DSPaddr++, data);

s = fscanf(fp, "%f\n%f", &x, &y);
        if (s != 2) {
            fprintf(stderr, "%s: garbled <x, y> for Right button\n", buttonFile);
            return;
        }
        data = FloatToFractional(x * gen_x, 1);
        DspPutY(serial, DSPaddr++, data);
        data = FloatToFractional(y * gen_y, 1);
        DspPutY(serial, DSPaddr++, data);

/*
         * Read the voltage thresholds and download the one for the
         * tracking state so the DSP can deduce button states.
         *
         * NOT GENERALIZED TO THE MULTIPEN DEVICE.
         */
        fp = fopen(threshFile, "r");
        if (fp == NULL) {
            fprintf(stderr, "Warning, LoadAllNorms cannot open button voltage file \"%s\"\n", threshFile)
;
            return;
        } else {
            unsigned int voltT, voltL, voltM, voltR;

s = fscanf(fp, "left1 %d\n", &voltL);
            s = fscanf(fp, "middle1 %d\n", &voltM);
            s = fscanf(fp, "right1 %d\n", &voltR);
            s = fscanf(fp, "track1 %d\n", &voltT);
            if (s != 1) {
                fprintf(stderr, "Threshold data file bad\n"); return;
            }
            DspPutY(serial, MPEN_TRACKING_VOLTS, voltT);
            DspPutY(serial, MPEN_MIDDLE_VOLTS, voltM);
            DspPutY(serial, MPEN_RIGHT_VOLTS, voltR);
            DspPutY(serial, MPEN_LEFT_VOLTS, voltL);

DspPutY(serial, MPEN_TRACKING_BITS_ADDR, MPEN_TRACKING_BITS);
            DspPutY(serial, MPEN_MIDDLE_BITS_ADDR, MPEN_MIDDLE_BITS);
            DspPutY(serial, MPEN_RIGHT_BITS_ADDR, MPEN_RIGHT_BITS);
            DspPutY(serial, MPEN_LEFT_BITS_ADDR, MPEN_LEFT_BITS);

}
}
/*
 * This is going to convert a float to a fraction between -1 and 1. A scale
 * parameter is required because the xminus/xplus ratio is close, but
 * not always, between -1 and 1.
 * The Sun floating point format is 1 sign bit,
 * 8 bits of exponent, and 23 bits of mantissa. The magnitude is
 * 2 ^ (exp-127) if exp != 0, or 2 ^ -126 if exp = 0. The number is
 * 1.mantissa in the first case, or 0.mantissa in the second case.
 * The conversion algorithm is to take the mantissa and shift it right by
 * (127+scale-exp) bits. Then the 1. is or'd in. If the shift distance
 * is greater than 22 then the number is too close to zero to represent
 * right, so we return 0.
 * Finally, if the number is negative, then complement the bits.
 */
unsigned int
FloatToFractional(x, scale)
    float x;
    int scale;  /* number of bits to shift right */
{
    union {
        float f;
        unsigned int i;
    } cheat;
    int exponent;
    int sign;
    int mantissa;
    int bias;

cheat.f = x;
    exponent = (cheat.i & 0x7F800000) >> 23;
    sign =     (cheat.i & 0x80000000) ;
    mantissa = (cheat.i & 0x007FFFFF) ;

bias = 127 + scale;

if (exponent > bias) {
        printf("FloatToMantissa: number unexpectedly large <%x> exp %d scale %d\n",
               cheat.i, exponent, scale);
        mantissa = cheat.i;
```

```
    } else if (exponent <= (bias - 23)) {
        /* The number is too close to zero to represent */
        mantissa = 0;
    } else {
        mantissa |= (1 << 23);
        mantissa = (mantissa >> (bias - exponent));
    } if (sign) {
        mantissa = -mantissa;
    }
    return mantissa;
}
/*
 * serial.h --
 *
 * Copyright 1992 Xerox Corp.  All rights reserved.
 */ ifndef _SERIAL
define _SERIAL typedef struct Segment {
    int size;
    int origin;
    char space;
    int *words;
    struct Segment *next;
} Segment;

/*
 * Values returned by DspPoke.  These represent the bootstrap mode,
 * the idle Wacom command mode, or the active (raw or X, Y) mode.
 */
#define POKE_BOOT       1
#define POKE_IDLE       2
#define POKE_ACTIVE     3
define POKE_FAILED     0 int DspOpen();          /* Open the serial line hooked to the DSP */

Segment *DspParseFile();/* Parse a compiled .lod file */
void DspDownload();     /* Download the segments returned from DspParseFile */
int DspPutY();          /* Stuff a word into Y memory */
int DspPutX();          /* Stuff a word into X memory */
int DspPutP();          /* Stuff a word into Program memory */
int DspJsr();           /* Jump to subroutine at a location */
int DspJmp();           /* Branch to location */
int DspPoke();          /* Poke at the boot PROM monitor */
int DspCrash();         /* Download the illegal instruction */
int Sleep();            /* Pause for a given time */ endif /* not _SERIAL */
/*
 * serial.c --
 *
 *      Utility routines to control the DSP via the serial line interface..
 *      This goes with the serial.boot.asm DSP program that simply executes
 *      and instruction stream that is fed to the serial line.
 *
 * Copywrite 1991 Xerox Corp.  All rights reserved.
 */
#include <stdio.h>
#include <errno.h>
#include <termios.h>
#include <sys/file.h>
#include <sys/time.h>
include <sys/filio.h> include "serial.h"

int verbose = 1;        /* Echo feedback from the device */

/*
 * DspOpen --
 *      Opens the serial line an conditions it for communication with the DSP.
 *      Returns a file descriptor for use with calls to DspJsr, etc.
 *      Returns -1 upon error.
 */
int
DspOpen(device)
    char *device;               /* Serial line device */
{
    struct termios term;
    int fd;
```

```
        fd = open("/dev/ttyb", O_RDWR);
        if (fd < 0) {
            perror("open /dev/ttyb");
            return fd;
        } bzero((char *)&term, sizeof(struct termios));
        term.c_iflag = BRKINT;      /* Interrupt on break */
        term.c_cflag = B9600|CS8|CREAD ;
        /*
         * Setup the serial line timeout so that at least 5 characters are
         * read, or that the read returns if more characters don't arrive
         * in 1 * 0.1 seconds.  In otherwords, a short burst will be returned
         * in one read, and the burst is terminated by an idle time of 0.1 seconds.
         */
        term.c_cc[VMIN] = 5;        /* 5 character response from device */
        term.c_cc[VTIME] = 1;       /* 0.1 seconds intercharacter timer */ if (tcsetattr(fd, TCSANOW, &term) < 0) {
            perror("tcsetattr");
            close(fd);
            fd = -1;
        }
        return fd;
}

/*
 * DspParseFile --
 *      Parse a .lod file containing a compiled DSP program.
 *      The output is in ascii, thank god!
 */ typedef enum State { IN_SEGMENT, OUT_SEGMENT, SYMBOL } State;

Segment *
DspParseFile(file)
    char *file;
{
    Segment *segPtr = NULL;
    Segment *firstSegPtr = NULL;
    Segment *newSegPtr = NULL;
    char space[10];
    char line[128];
    FILE *f;
    int n;
    int index, limit;
    int origin, value;
    State state = OUT_SEGMENT;

f = fopen(file, "r");
    if (f == NULL) {
        fprintf(stderr, "Cannot open %s: ", file);
        perror("");
        exit(1);
    }
    while (!feof(f)) {
        n = (int)fgets(line, 128, f);
        if (n == NULL) {
            break;
        }
        n = sscanf(line, "_DATA %s %x", space, &origin);
        if (n == 2) {
            if (state == IN_SEGMENT) {
                    segPtr->size = index;
            }
            newSegPtr = (Segment *)malloc(sizeof(Segment));
            bzero((char *)newSegPtr, sizeof(Segment));
            if (segPtr == NULL) {
                firstSegPtr = newSegPtr;
                segPtr = newSegPtr;
            } else {
                segPtr->next = newSegPtr;
                segPtr = newSegPtr;
            }
            segPtr->space = space[0];
            segPtr->origin = origin;
            segPtr->words = (int *)malloc(100 * sizeof(int));
            limit = 100;
            index = 0;
            state = IN_SEGMENT;
            continue;
        }
        n = sscanf(line, "_END %x", &value);
        if (n == 1) {
            if (state == IN_SEGMENT) {
```

```
                    segPtr->size = index;
                }
                break;
            }
            n = sscanf(line, "_SYMBOL %s", space);
            if (n == 1) {
                if (state == IN_SEGMENT) {
                    segPtr->size = index;
                }
                state = SYMBOL;
                continue;
            }
            if (state == IN_SEGMENT) {
                n = sscanf(line, "%x %x %x %x %x %x %x %x %x %x",
                    &segPtr->words[index],
                    &segPtr->words[index+1],
                    &segPtr->words[index+2],
                    &segPtr->words[index+3],
                    &segPtr->words[index+4],
                    &segPtr->words[index+5],
                    &segPtr->words[index+6],
                    &segPtr->words[index+7],
                    &segPtr->words[index+8],
                    &segPtr->words[index+9]);
                if (n >= 1) {
                    index += n;
                    if (index + 10 > limit) {
                        int *newWords, j;
                        limit *= 2;
                        newWords = (int *)malloc(limit * sizeof(int));
                        bzero((char *)newWords, limit * sizeof(int));
                        for (j=0 ; j<index ; j++) {
                            newWords[j] = segPtr->words[j];
                        }
                        free(segPtr->words);
                        segPtr->words = newWords;
                    }
                } else {
                    fprintf(stderr, "sscanf failed on line <%s>\n", line);
                    exit(1);
                }
                continue;
            }
            if (state == SYMBOL) {
                char symbol[80];
                char type[10];
                int value;

n = sscanf(line, "%s %s %x", symbol, type, &value);
                if (n == 3) {
/*                  printf("Symbol: %s %s at %x\n",
                        symbol, type, value); */
                    continue;
                } else {
                    fprintf(stderr, "Unhandled input <%s>", line);
                    exit(1);
                }
            }
        }
    }
    return firstSegPtr;
}
/*
 * DspDownload --
 *      Download a program via the serial line bootstrap monitor.
 */
void
DspDownload(serial, segPtr, printOnly)
    int serial;         /* fd to serial line device */
    Segment *segPtr;    /* List of segments to load */
    int printOnly;
{
    int i;
    int (*put)();

if (printOnly) {
        for ( ; segPtr != NULL ; segPtr = segPtr->next) {
            printf("\nSegment origin %x size %d space %c\n",
                segPtr->origin, segPtr->size, segPtr->space);
            for (i=0 ; i<segPtr->size ; ) {
                printf("%06x ", segPtr->words[i]);
                i++;
                if ((i % 10) == 0) {
                    printf("\n");
                }
            }
```

```
        }
    } else {
        /*
         * load segments into memory
         */
        for ( ; segPtr != NULL ; segPtr = segPtr->next) {
            int origin = segPtr->origin;
             switch(segPtr->space) {
                case 'P':
                    put = DspPutP;
                    /*
                     * HACK TO DEAL WITH ADDRESSING SNAFU
                     */
                    if (origin >= 0x200) {
                        put = DspPutX;
                    }
                    break;
                case 'X':
                    put = DspPutX;
                    break;
                case 'Y':
                    put = DspPutY;
                    break;
                default:
                    fprintf(stderr, "DspDownload: unknown space %c\n",
                        segPtr->space);
                    exit(1);
            }
            printf("Segment at %c:%x size %d\n",
                segPtr->space, segPtr->origin, segPtr->size);
            for (i=0 ; i<segPtr->size ; ) {
                if (! (*put)(serial, origin, segPtr->words[i])) {
                    fprintf(stderr, "DspDownload failed at %c:%x\n",
                        segPtr->space, origin);
                    exit(1);
                };
                origin++;
                i++;
            }
        }
    }
}
/*
 * DspPutY --
 *      Download a word into Y memory.  We need to arrange for the following
 *      instruction sequence to be executed:
 *
 *      move    addr,r6
 *      move    value,X0
 *      move    X0,y:(r6)
 */
int
DspPutY(serial, addr, value)
    int serial; /* Serial line I/O descriptor */
    int addr;   /* 24 bit address in Y memory */
    int value;  /* 24 bit value */
{
    char cmdbuf[64];
    int n;
    u_int inst1;
    u_int ext1;
    u_int inst2;
    u_int ext2;
    u_int inst3;

/* move    #$addr,r6 */
    inst1 = 0x66F400;
    ext1 = addr & 0xFFFFFF;

/* move    #$value,X0 */
    inst2 = 0x44F400;
    ext2 = value & 0xFFFFFF;

/* move    X0,y:(r6) */
    inst3 = 0x4C6600;

Pack(inst1, &cmdbuf[0]);
    Pack(ext1, &cmdbuf[3]);
    Pack(inst2, &cmdbuf[6]);
    Pack(ext2, &cmdbuf[9]);
    Pack(inst3, &cmdbuf[12]);
    WriteSerial(serial, cmdbuf, 15);
    return ReadAck(serial);
}
/*
 * DspPutX --
```

```
 *      Download a word into Y memory.  We need to arrange for the following
 *      instruction sequence to be executed:
 *
 *      move    addr,r6
 *      move    value,X0
 *      move    X0,x:(r6)
 */
int
DspPutX(serial, addr, value)
    int serial;  /* Serial line I/O descriptor */
    int addr;    /* 24 bit address in X memory */
    int value;   /* 24 bit value */
{
    char cmdbuf[64];
    int n;
    u_int inst1;
    u_int ext1;
    u_int inst2;
    u_int ext2;
    u_int inst3;

/* move    #$addr,r6 */
    inst1 = 0x66F400;
    ext1 = addr & 0xFFFFFF;

/* move    #$value,X0 */
    inst2 = 0x44F400;
    ext2 = value & 0xFFFFFF;

/* move    X0,x:(r6) */
    inst3 = 0x446600;

Pack(inst1, &cmdbuf[0]);
    Pack(ext1, &cmdbuf[3]);
    Pack(inst2, &cmdbuf[6]);
    Pack(ext2, &cmdbuf[9]);
    Pack(inst3, &cmdbuf[12]);
    WriteSerial(serial, cmdbuf, 15);
    return ReadAck(serial);
}
/*
 * DspPutP --
 *      Download a word into P memory.  We need to arrange for the following
 *      instruction sequence to be executed:
 *
 *      move    addr,r6
 *      move    value,X0
 *      move    X0,p:(r6)
 */
int
DspPutP(serial, addr, value)
    int serial;  /* Serial line I/O descriptor */
    int addr;    /* 24 bit address in P memory */
    int value;   /* 24 bit value */
{
    char cmdbuf[64];
    int n;
    u_int inst1;
    u_int ext1;
    u_int inst2;
    u_int ext2;
    u_int inst3;

/* move    #$addr,r6 */
    inst1 = 0x66F400;
    ext1 = addr & 0xFFFFFF;

/* move    #$value,X0 */
    inst2 = 0x44F400;
    ext2 = value & 0xFFFFFF;

/* move    X0,p:(r6) */
    inst3 = 0x076684;

Pack(inst1, &cmdbuf[0]);
    Pack(ext1, &cmdbuf[3]);
    Pack(inst2, &cmdbuf[6]);
    Pack(ext2, &cmdbuf[9]);
    Pack(inst3, &cmdbuf[12]);
    WriteSerial(serial, cmdbuf, 15);
    return ReadAck(serial);
}
/*
 * DspJsr --
```

```
 *      Cause the DSP to branch to a subroutine at a particular location.
 *
 *      jsr     Absolute
 */
int
DspJsr(serial, addr)
    int serial; /* Serial line I/O descriptor */
    int addr;   /* 24 bit address in P memory */
{
    char cmdbuf[64];
    u_int inst1;
    u_int ext1;

printf("JSR to 0x%x\n", addr);

/* jsr     absolute */
    inst1 = 0x0BF080;
    ext1 = addr & 0xFFFFFF;

Pack(inst1, &cmdbuf[0]);
    Pack(ext1, &cmdbuf[3]);
    /* XXX */
    {
        u_int extra = 0xC;      /* RTS instruction */
        u_int nop = 0;          /* NOP instruction */
        Pack(extra, &cmdbuf[6]);
        Pack(nop, &cmdbuf[9]);
    }
    WriteSerial(serial, cmdbuf, 12);
    return ReadAck(serial);
}
/*
 * DspJmp --
 *      Cause the DSP to begin execution at a particular location.
 *
 *      jmp     Absolute
 */
int
DspJmp(serial, addr)
    int serial; /* Serial line I/O descriptor */
    int addr;   /* 24 bit address in P memory */
{
    char cmdbuf[64];
    u_int inst1;
    u_int ext1;

printf("JMP to 0x%x\n", addr);
    /* jmp     absolute */
    inst1 = 0x0AF080;
    ext1 = addr & 0xFFFFFF;

Pack(inst1, &cmdbuf[0]);
    Pack(ext1, &cmdbuf[3]);
    return WriteSerial(serial, cmdbuf, 6);
    /*
     * Don't read reply because the program is doing something unknown.
     */
}
/*
 * Pack --
 *      Assemble a value into a character buffer in such a way that it
 *      will end up looking right in DSP memory.  The device reads one
 *      character at a time a packs them into a DSP word low byte first,
 *      the middle byte, then high byte.
 */
static int
Pack(value, bufPtr)
    int value;
    char *bufPtr;
{
    *bufPtr++ = value & 0xFF;
    *bufPtr++ = (value & 0xFF00) >> 8;
    *bufPtr++ = (value & 0xFF0000) >> 16;
}
/*
 * DspFlush --
 *      Flush the input from the DSP and reset it to command mode.
 */
void
DspFlush(serial)
    int serial;
{
    int count, n;
    char buf[1024];
```

```
        while (1) {
            if (ioctl(serial, FIONREAD, &count) < 0) {
                perror("FIONREAD");
                exit(1);
            }
            if (count < 1) {
                break;
            }
            (void) read(serial, buf, (count > sizeof(buf)) ? sizeof(buf) : count);
        }
}
/*
 * DspBreak --
 *      Send a break to the DSP to get it to reset to bootstrap mode.
 */
void
DspBreak(serial)
    int serial;
{
    tcsendbreak(serial, 0);
}

/*
 * DspPoke - shove a nop instruction at the DSP.  Depending on the
 * input processing state the DSP will reply by echoing, if in command mode,
 * or with a newline, if in bootstrap mode.
 */
DspPoke(serial, print)
    int serial;
    int print;
{
    char buf[3], ack[1];
    int i;

buf[0] = buf[1] = buf[2] = ' ';
    for (i=0 ; i<2 ; i++) {
        int s, readMask;
        struct timeval timeout;

if (print) {
            printf("poke: ");
        }
        WriteSerial(serial, buf, 1);
        if (ReadReply(serial, buf, 1)) {
            if (buf[0] == 0xa) {
                if (print) {
                    printf("Bootstrap ready\n");
                }
                return POKE_BOOT;
            } else if (buf[0] == 0x0) {
                if (print) {
                    printf("Idle and ready\n");
                }
                return POKE_IDLE;
            } else {
                if (print) {
                    printf("Active\n");
                }
                return POKE_ACTIVE;
            }
        }
    }
    if (print) {
        printf("no response\n");
    }
    return POKE_FAILED;
}
/*
 * DspCrash  - shove an illegal instruction at the DSP.
 *      The illegal instruction handler doesn't get the right PC
 *      if you jump right to an illegal instruction, so we also
 *      stuff a nop.
 */
int
DspCrash(serial)
    int serial;
{
    char buf[6];
    u_int nop = 0x0;
    u_int illegal = 0x5;

Pack(nop, &buf[0]);
    Pack(illegal, &buf[3]);

return WriteSerial(serial, buf, 6);
```

```
}
/*
 * WriteSerial
 */
int
WriteSerial(serial, buf, size)
    int serial;
    char *buf;
    int size;
{
    int n = write(serial, buf, size);
    if (n < 0) {
        perror("Write error on serial device");
        exit(errno);
    }
    return n;
}

/*
 * ReadSerial -
 *      Read the serial line.
 */
int
ReadSerial(serial, buf, size)
    int serial; /* Serial line I/O descriptor */
    char *buf;
    int size;
{
    int readMask;
    int n;
    struct timeval timeout;
    int status = 0;
    int index = 0;

while (1) {
        timeout.tv_sec = 0.0;
        timeout.tv_usec = 100000;       /* 100 Msec */
        readMask = 1 << serial;
        n = select(32, &readMask, NULL, NULL, &timeout);
        if (n < 0) {
            perror("Read Serial, select failed");
            exit(1);
        } else if (n == 0) {
            if (index == 0) {
                printf("Read Serial timeout\n");
            }
            return index;
        }
        n = read(serial, &buf[index], size-index);
        if (n < 0) {
            perror("Read error on serial device");
            exit(errno);
        } else if (n == 0) {
            printf("ReadSerial Short reply\n");
            return 0;
        }
        index += n;
        if (index >= size) {
            return size;
        }
    }
}
/*
 * ReadAck --
 *      Read the response, if any, from the serial line.  This is dependent
 *      on the conditioning of the serial line done in main.  We expect
 *      the read to timeout after getting a few characters.
 */
static int
ReadAck(serial)
    int serial; /* Serial line I/O descriptor */
{
    struct timeval timeout;
    int n;
    int readMask = 0;
    int tries = 0;
    char buf[64];

while (1) {
        timeout.tv_sec = 0.0;
        timeout.tv_usec = 100000;       /* 100 Msec */
        readMask = 1 << serial;
        n = select(32, &readMask, NULL, NULL, &timeout);
        if (n < 0) {
            perror("Read Ack, select failed");
            exit(1);
```

```
            } else if (n == 0) {
                tries++;
                if (tries > 10) {
                    printf("Read Ack timeout\n");
                    return 0;
                } else {
                    continue;
                }
            }
            n = read(serial, buf, 1);
            if (n < 0) {
                perror("Read error on serial device");
                exit(errno);
            } else if (n == 0) {
                printf("Short reply\n");
                return 0;
            } else {
                if (buf[0] == 0x0a) {
                    return 1;
                } else if (buf[0] == 0x21) {          /* Illegal instruction */
                    printf("Illegal Instruction at PC "); fflush(stdout);
                    n = read(serial, buf, 2);
                    if (n < 0) {
                        perror("Read error on serial device");
                        exit(errno);
                    } else if (n == 0) {
                        printf("Short read\n");
                    } else {
                        printf("0x%02x%02x\n",
                                buf[1] & 0xFF, buf[0] & 0xFF);
                    }
                } else {
                    printf("Ack got 0x%02x\n", buf[0] & 0xFF);
                }
                return 0;
            }
        }
    }
}
/*
 * ReadReply --
 *      Read the response, if any, from the serial line. This is dependent
 *      on the conditioning of the serial line done in main. We expect
 *      the read to timeout after getting a few characters.
 */
static int
ReadReply(serial, buf, size)
    int serial;   /* Serial line I/O descriptor */
    char *buf;    /* Buffer for the returned information */
    int size;     /* Amount of data to expect in reply */
{
    struct timeval timeout;
    int n;
    int readMask = 0;
    int tries = 0;

while (1) {
        timeout.tv_sec = 0.0;
        timeout.tv_usec = 100000;        /* 100 Msec */
        readMask = 1 << serial;
        n = select(32, &readMask, NULL, NULL, &timeout);
        if (n < 0) {
            perror("Read Ack, select failed");
            exit(1);
        } else if (n == 0) {
            tries++;
            if (tries > 10) {
                printf("Read Reply timeout\n");
                return 0;
            } else {
                continue;
            }
        }
        n = read(serial, buf, size);
        if (n < 0) {
            perror("Read error on serial device");
            exit(errno);
        } else if (n == 0) {
            printf("Short reply\n");
            return 0;
        } else {
            if (buf[0] == 0x21) {          /* Illegal instruction */
                printf("Illegal Instruction at PC "); fflush(stdout);
                if (n < 3) {
                    n = read(serial, &buf[1], 3-n);
                    if (n < 0) {
                        perror("Read error on serial device");
```

```
            exit(errno);
        } else if (n == 0) {
            printf("Short read\n");
        }
    }
            printf("0x%02x%02x\n", buf[2] & 0xFF, buf[1] & 0xFF);
            return 0;
        }
        return n;
    }
  }
}

/*
 * Sleep --
 */
Sleep(time)
    double time;
{
    struct timeval tv;

if (time < 0.) {
        fprintf(stderr, "Sleep, bad time %f\n", time);
        return;
    }
    tv.tv_sec = 0; tv.tv_usec = 0;
    while (time >= 1.0) {
        tv.tv_sec += 1;
        time -= 1.0;
    }
    if (time > 0.0) {
        tv.tv_usec = (int) (time * 1000000.);
    }
    printf("Sleep <%d.%06d>\n", tv.tv_sec, tv.tv_usec);
    select(0, NULL, NULL, NULL, &tv);
}
```

What is claimed :

1. In a projection display system comprising a screen wherein computer generated information is projected upon one side of the screen and a user interacts with the computer by projecting a modifiable light image having one of a number of identifiable frequencies towards an input position upon the opposite side of the screen, a position location indicator representative of the input position is projected onto said one side by side computer, and further comprising an illumination detector which transmits pseudo image coordinates of the input position to said computer, a method of correcting the position of said pseudo image coordinates and closely conforming said position location indicator with said input position comprising steps of:
   detecting said pseudo image coordinates;
   adjusting said pseudo image coordinates to normalize for detector distortions due to frequency of said projected light image;
   adjusting said pseudo image coordinates to normalize for detector distortions due to electronic signal drift; and
   adjusting said pseudo image coordinates for detector distortions due to screen voltage grid distortion,
   wherein coordinates of said position location indicator are determined corresponding to said adjusted pseudo image coordinates.

2. The method of claim 1, wherein said voltage grid distortion adjusting step further comprises finding coordinates for said position location indicator corresponding to said adjusted pseudo image coordinates using a table of compressed calibration data.

3. The method of claim 2, wherein said voltage grid distortion adjusting step further comprises:
   finding calibrated coordinates surrounding said pseudo image coordinates in said table of compressed calibration data; and
   interpolating between said calibrated coordinates to said position location indicator coordinates.

4. In a projection display system comprising a screen wherein computer generated information is projected upon one side of the screen and a user interacts with the computer by projecting a modifiable light image having one of a number of identifiable frequencies towards an input position upon the opposite side of the screen, a position location indicator representative of the input position is projected onto said one side by said computer, and further comprising an illumination detector which transmits pseudo image coordinates of said input position to said computer, a method of correcting the position of said pseudo image coordinates and closely conforming a corrected position location indicator with the input position comprising steps of:
   detecting said pseudo image coordinates;
   adjusting said pseudo image coordinates to normalize for detector distortions due to frequency of said projected light image;
   adjusting said pseudo image coordinates to normalize for detector distortions due to electronic signal drift;
   adjusting said pseudo image coordinates for detector distortions due to screen voltage grid distortion;
   determining a magnitude of change in distance between said adjusted pseudo image coordinates and a previous position of said position location indicator; and
   adjusting said corrected position of said position location indicator based on said magnitude of change.

5. The method of claim 4, wherein said adjustment based on said magnitude of change in distance is smaller than said magnitude of change when said magnitude of change in distance is less than a change threshold distance, and said adjustment based on said magnitude of change is equal to said magnitude of change in distance when said magnitude of change in distance is greater than said change threshold distance.

6. In a projection display system comprising a screen wherein computer generated information is projected upon one side of the screen and a user interacts with the computer by projecting a light image at a function identifying frequency at an input position upon the opposite side of the screen, a position location indicator representative of the input position is projected onto said one side by said computer, and further comprising an illumination detector which transmits pseudo image coordinates of the input position to said computer, a method of correcting the position of said pseudo image coordinates and closely conforming said position location indicator with said input position comprising steps of:

entering data indicative of user input at locations in each of four corners of a large area display for a first frequency;

entering function identifying frequency data indicative of user input at locations in each of four corners of the large area display for the function identifying frequency;

determining a normalizing factor based on said first frequency data and said function identifying frequency data;

detecting pseudo image coordinates of an input position; and modifying said pseudo image coordinates in response to said normalizing factor to determine coordinates of said position location indicator.

7. In a projection display system comprising a screen wherein computer generated information is projected upon one side of the screen and a user interacts with the computer by projecting a modifiable light image at a second input position upon the opposite side of the screen, a position location indicator representative of a first input position is projected onto said one side at a first position by said computer, and further comprising an illumination detector which transmits pseudo image coordinates of said second input position to said computer, a method of correcting the position of said pseudo image coordinates and closely conforming said position location indicator with said second input position comprising steps of:

entering data indicative of the coordinates of said first position of the position location indicator representative of the first input position;

detecting pseudo image coordinates of said second input position;

determining magnitude of a difference in position between said pseudo image coordinates and coordinates of said first position of the position location indicator;

determining a change factor in response to said difference magnitude; and determining a second position of said position location indicator representative of said second input position according to said change factor.

8. The method of claim 7 wherein said step of determining a change factor comprises using an exponential function based on said difference magnitude.

9. In a projection display system comprising a screen wherein computer generated information is projected upon one side of the screen and a user interacts with the computer by projecting a modifiable light image at a second input location upon the opposite side of the screen, a position location indicator representative of a first input location is projected at a first position onto said one side, and further comprising an illumination detector which transmits pseudo image coordinates of the input position to said computer, a method of correcting the position of said pseudo image coordinates and closely conforming said position location indicator with said input position comprising steps of:

entering data indicative of the coordinates of said first position of the position location indicator representative of the first input location;

detecting pseudo image coordinates of the input position;

determining magnitude of difference in position between said pseudo image coordinates and coordinates of said first position of the position location indicator; and determining a change in the position of the position location indicator in response to said difference magnitude, wherein said change in position is smaller than said difference magnitude when said difference magnitude is less than a change threshold, and said change is equal to said difference magnitude when said difference magnitude is greater than said change threshold.

10. The method of claim 9 wherein said step of determining a change in the position of the position location indicator further comprises determining said change in position by an exponential function based on said difference magnitude, wherein said change threshold is based upon the difference magnitude which causes the value of the exponential function to equal approximately one.

11. In a projection display system comprising a screen wherein computer generated information is projected upon one side of the screen and a user interacts with the computer by projecting a light image at an input position upon the opposite side of the screen, a position location indicator representative of the input position is projected onto said one side by said computer, and further comprising an illumination detector which transmits pseudo image coordinates of the input position to said computer, a method of correcting the position of said pseudo image coordinates and closely conforming said position location indicator with said input position comprising steps of:

detecting said pseudo image coordinates;

adjusting said pseudo image coordinates to normalize for detector distortions due to electronic signal drift; and adjusting said pseudo image coordinates for detector distortions due to screen voltage grid distortion, wherein said screen voltage grid adjustment is determined by finding data point coordinates surrounding said pseudo image coordinates from a compressed table of data based on an inverse spline function fitted to a plurality of calibration data points, and interpolating to determine coordinates of the position of said position location indicator.

12. The projection display system of claim 11, wherein said compressed table of data further comprises a variably sized set of bit fields of packed integers, each value in the table representing a delta change in magnitude from one calibration point to the previous calibration point in the same row, each row size being determined by the maximum delta value in the row.

13. The projection display system of claim 12, wherein said compressed table of data further has rows describing horizontal coordinates values and rows describing vertical coordinate values that are interleaved.

* * * * *